(12) United States Patent
Yahata

(10) Patent No.: US 10,014,028 B2
(45) Date of Patent: Jul. 3, 2018

(54) RECORDING MEDIUM, PLAYBACK DEVICE, AND PLAYBACK METHOD

(71) Applicant: Panasonic Intellectual Property Corporation of America, Torrance, CA (US)

(72) Inventor: Hiroshi Yahata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/471,022

(22) Filed: Mar. 28, 2017

(65) Prior Publication Data

US 2017/0200467 A1    Jul. 13, 2017

Related U.S. Application Data

(63) Continuation of application No. PCT/JP2015/005000, filed on Oct. 1, 2015.
(Continued)

(30) Foreign Application Priority Data

Jul. 24, 2015  (JP) .................................. 2015-147218

(51) Int. Cl.
*H04N 5/84* (2006.01)
*H04N 5/89* (2006.01)
(Continued)

(52) U.S. Cl.
CPC .... *G11B 20/10527* (2013.01); *G11B 20/1217* (2013.01); *G11B 2220/2562* (2013.01)

(58) Field of Classification Search
USPC .................................................. 386/332–336
See application file for complete search history.

(56) References Cited

U.S. PATENT DOCUMENTS

| 5,881,032 A | 3/1999 | Ito et al. |
| 6,088,506 A | 7/2000 | Yoshio et al. |
| (Continued) | | |

FOREIGN PATENT DOCUMENTS

| JP | 9-282848 | 10/1997 |
| JP | 2006-120200 A | 5/2006 |
| (Continued) | | |

OTHER PUBLICATIONS

International Search Report of PCT application No. PCT/JP2015/005000 dated Dec. 22, 2015.
(Continued)

*Primary Examiner* — Nigar Chowdhury
(74) *Attorney, Agent, or Firm* — Greenblum & Bernstein, P.L.C.

(57) ABSTRACT

Data including a digital stream file obtained by encoding video information is recorded in a recording medium. A recording region of the recording medium has a first recording region where reading is performed at a first read rate, and a second recording region where reading is performed at a second read rate that is faster than the first read rate. The data includes a digital stream file having real-time attributes and a data file having non-real-time attributes. The data file to be read in during playback of the digital stream file is recorded in, of the first recording region and the second recording region, the same recording region where the digital stream file being played is recorded.

5 Claims, 48 Drawing Sheets

Related U.S. Application Data

(60) Provisional application No. 62/065,261, filed on Oct. 17, 2014.

(51) Int. Cl.
 *G11B 20/10* (2006.01)
 *G11B 20/12* (2006.01)

(56) References Cited

U.S. PATENT DOCUMENTS

| | | | |
|---|---|---|---|
| 2001/0018727 A1* | 8/2001 | Ando | G11B 20/1883 |
| | | | 711/112 |
| 2005/0025015 A1 | 2/2005 | Horibata | |
| 2009/0003172 A1* | 1/2009 | Yahata | G11B 19/10 |
| | | | 369/53.41 |
| 2011/0051589 A1 | 3/2011 | Kataoka et al. | |
| 2011/0187817 A1 | 8/2011 | Sasaki et al. | |
| 2012/0114304 A1* | 5/2012 | Mikawa | H04N 5/783 |
| | | | 386/248 |
| 2012/0177343 A1 | 7/2012 | Sasaki et al. | |

FOREIGN PATENT DOCUMENTS

| | | |
|---|---|---|
| JP | 2009-238372 A | 10/2009 |
| JP | 2010-118140 A | 5/2010 |
| JP | 2011-048884 A | 3/2011 |
| JP | 2011-250416 | 12/2011 |

OTHER PUBLICATIONS

The Extended European Search Report, dated Sep. 25, 2017 from the European Patent Office (EPO), for the related European Patent Application No. 15851329.1.

* cited by examiner

FIG. 24

| 0 | Language Code | 11 | Player audio mixing mode for Karaoke | 22 | reserved |
|---|---|---|---|---|---|
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

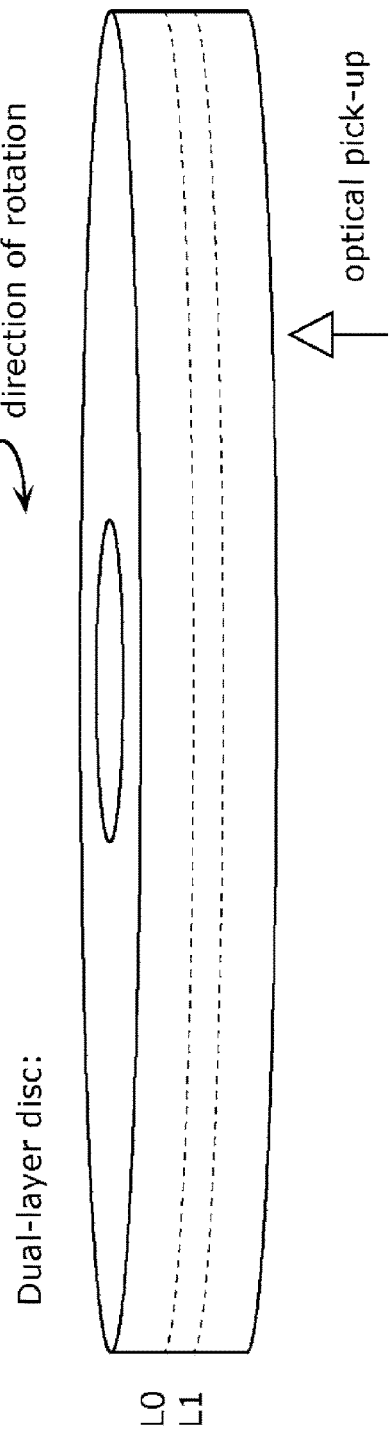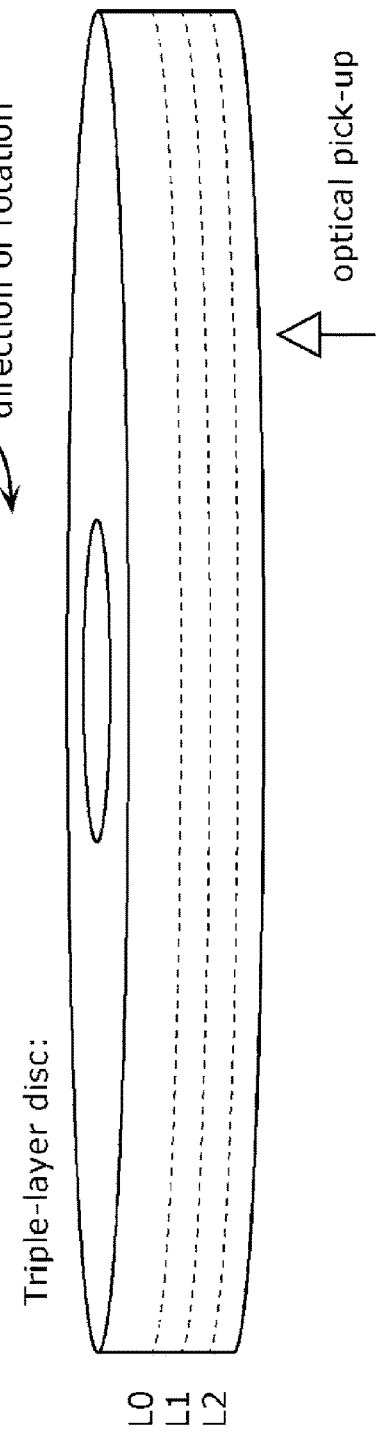

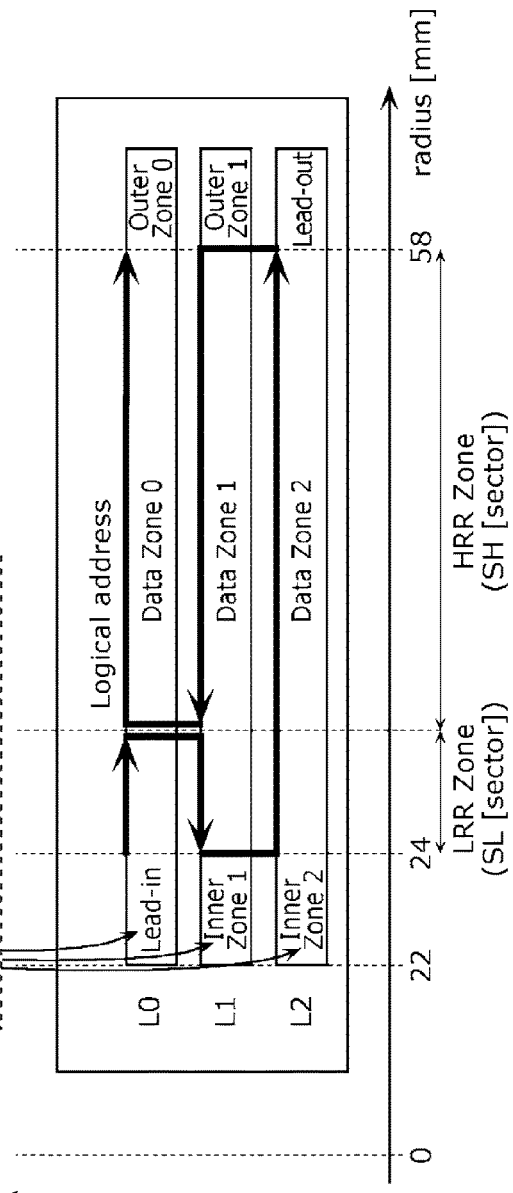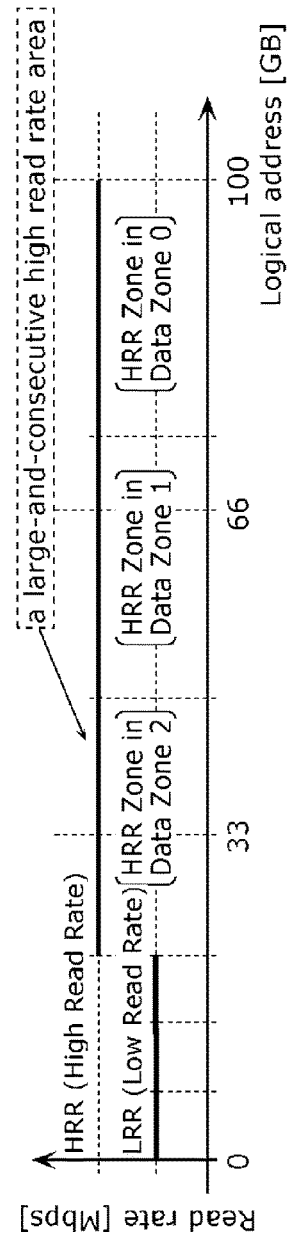
FIG. 34A
FIG. 34B

FIG. 46A

| Jump distance [sector] | 0 TO 10000 | 10001 TO 20000 | 20001 TO 50000 | 50001 TO 10000 |
|---|---|---|---|---|
| T$_{SEEK}$ [sec.] | 0.2 | 0.4 | 0.6 | 1.0 |

FIG. 46B

| Jump distance [stroke] | 1/10 stroke | 1/3 stroke | 1/2 stroke | Full stroke |
|---|---|---|---|---|
| T$_{SEEK}$ [sec.] | 1.5 | 2.0 | 2.5 | 3.0 |

RECORDING MEDIUM, PLAYBACK DEVICE, AND PLAYBACK METHOD

BACKGROUND

1. Technical Field

The present disclosure relates to a recording medium in which is recorded an encoded video stream, a playback device that plays the video stream recorded in the recording medium, and a playback method.

2. Description of the Related Art

Technology relating to digital versatile discs (DVD) has conventionally been disclosed (e.g., Japanese Unexamined Patent Application Publication No. 9-282848).

SUMMARY

In one general aspect, the techniques disclosed here feature a recording medium in which is recorded data including a digital stream obtained by encoding video information. A recording region of the recording medium has a first recording region where reading is performed at a first read rate, and a second recording region where reading is performed at a second read rate that is faster than the first read rate. The data includes a digital stream having real-time attributes and a data file having non-real-time attributes. The data file to be read in during playback of the digital stream is recorded in, of the first recording region and the second recording region, the same recording region as the recording region where the digital stream being played is recorded. According to the above form, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 24 is a diagram illustrating a list of system parameters (SPRM);

FIG. 29A illustrates the flow of processing relating to a time event in a BD-ROM player, and FIG. 29B illustrates the flow of processing relating to a user event in a BD-ROM player;

FIGS. 31A and 31B are diagrams for describing layouts of recording layers in large-capacity optical discs;

FIGS. 34A and 34B are diagrams for describing another example of a system of reading by switching the read rate from the disc;

FIGS. 46A and 46B are diagrams for describing the relationship between jump distance and seek time;

DETAILED DESCRIPTION

Underlying Knowledge Forming Basis of the Present Disclosure

However, further improvement was needed with the aforementioned Japanese Unexamined Patent Application Publication No. 9-282848. The present Inventors found that a problem occurs relating to the technology mentioned in the "Related Art". This problem will be described below in detail.

Most representative of information recording media recording video data is the DVD (hereinafter, may also be referred to as "Standard Definition" (SD-DVD). A conventional DVD will be described below.

Figure 1:
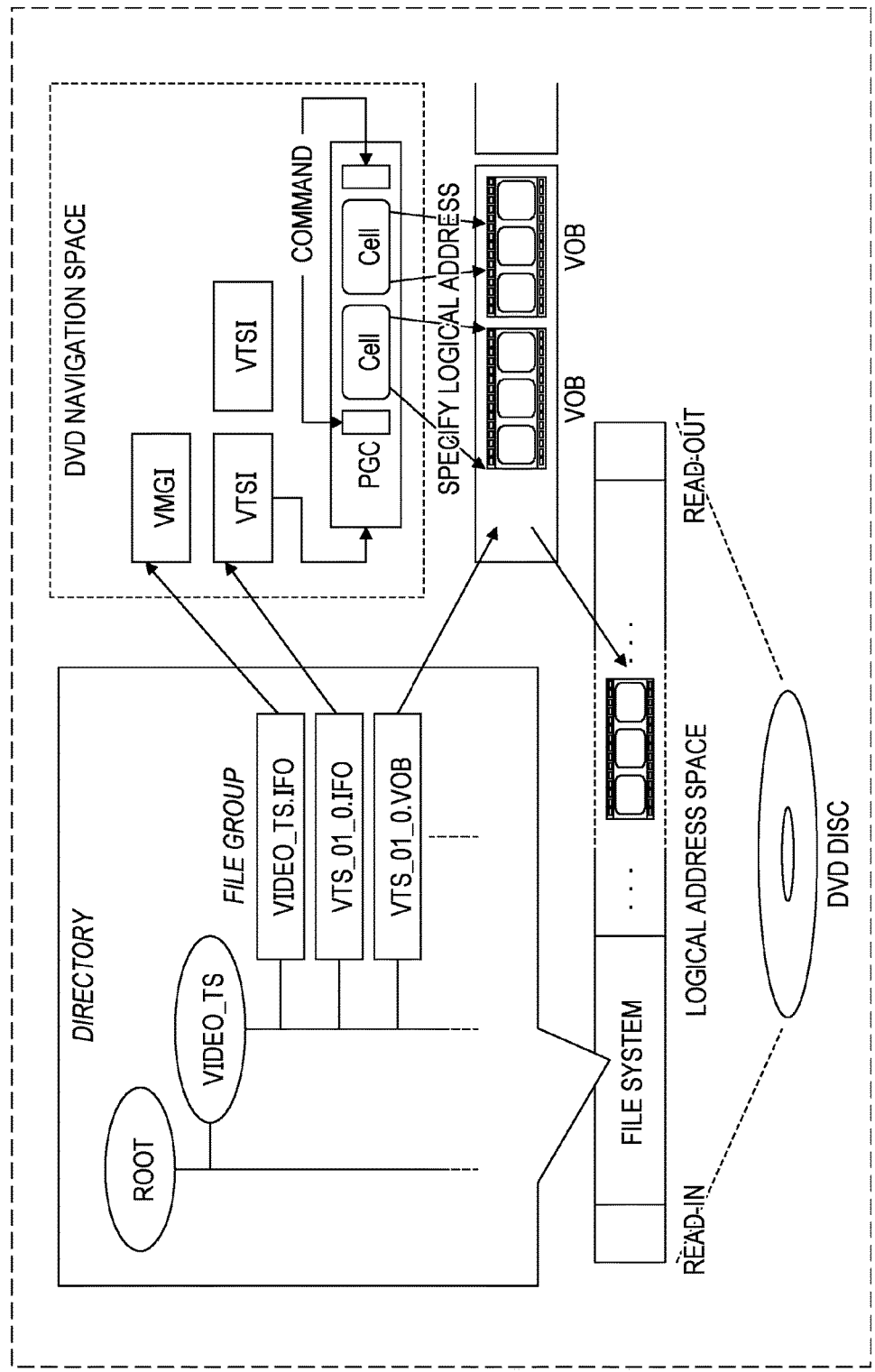
FIG. 1 is a diagram illustrating an SD-DVD structure.

FIG. 1 is a diagram illustrating the structure of an SD-DVD. As illustrated to the lower side of FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files. There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

| | |
|---|---|
| VIDEO_TS.IFO | Disc play control information file |
| VTS_01_0.IFO | Video title set #1 play control information file |
| VTS_01_0.VOB | Video title set #1 stream file |
| ... | |

As shown in the above example, two suffixes are stipulated. "IFO" is a suffix indicating that the file has play control information recorded therein, and "VOB" is a suffix indicating that the file has an MPEG stream, which is audiovisual (AV) data, recorded therein.

Play control information is information attached to the AV data, such as information to realize interactivity employed with the DVD (technology to dynamically change playing in response to user operations), metadata, and so forth. Play control information is commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD. Now, "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programming information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to JavaScript (a registered trademark) and so forth executed in browsers to display Web pages, for example. However, while JavaScript (registered trademark) performs window or browser control (e.g., opening a new browser window, etc.) besides logical operations, DVD command differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
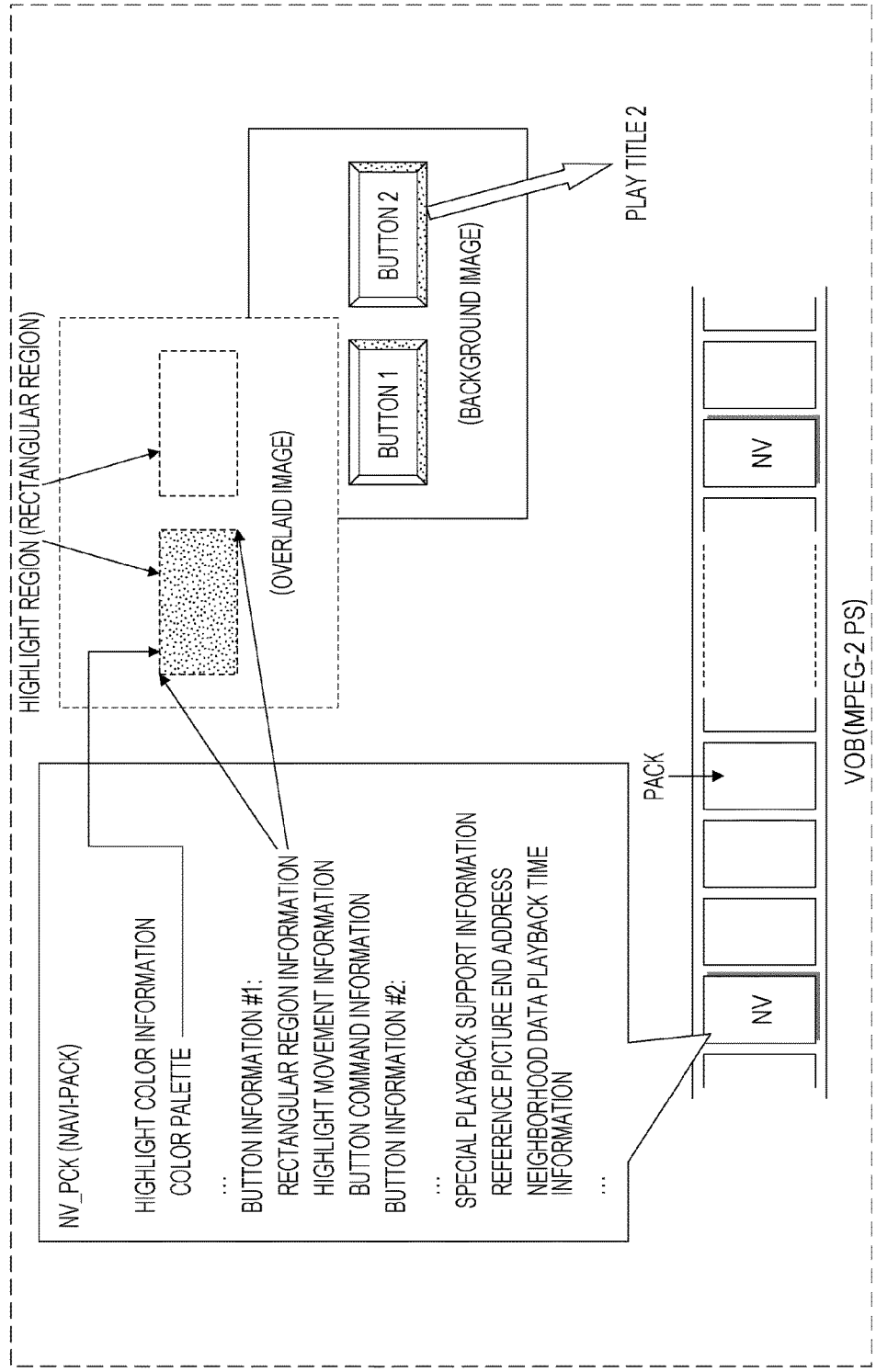
FIG. 2 is a schematic diagram for describing navigation information embedded in an MPEG stream, which is AV data.

FIG. 2 is an overview for describing navigation information embedded in an MPEG stream, which is AV data. Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller.

Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows. That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
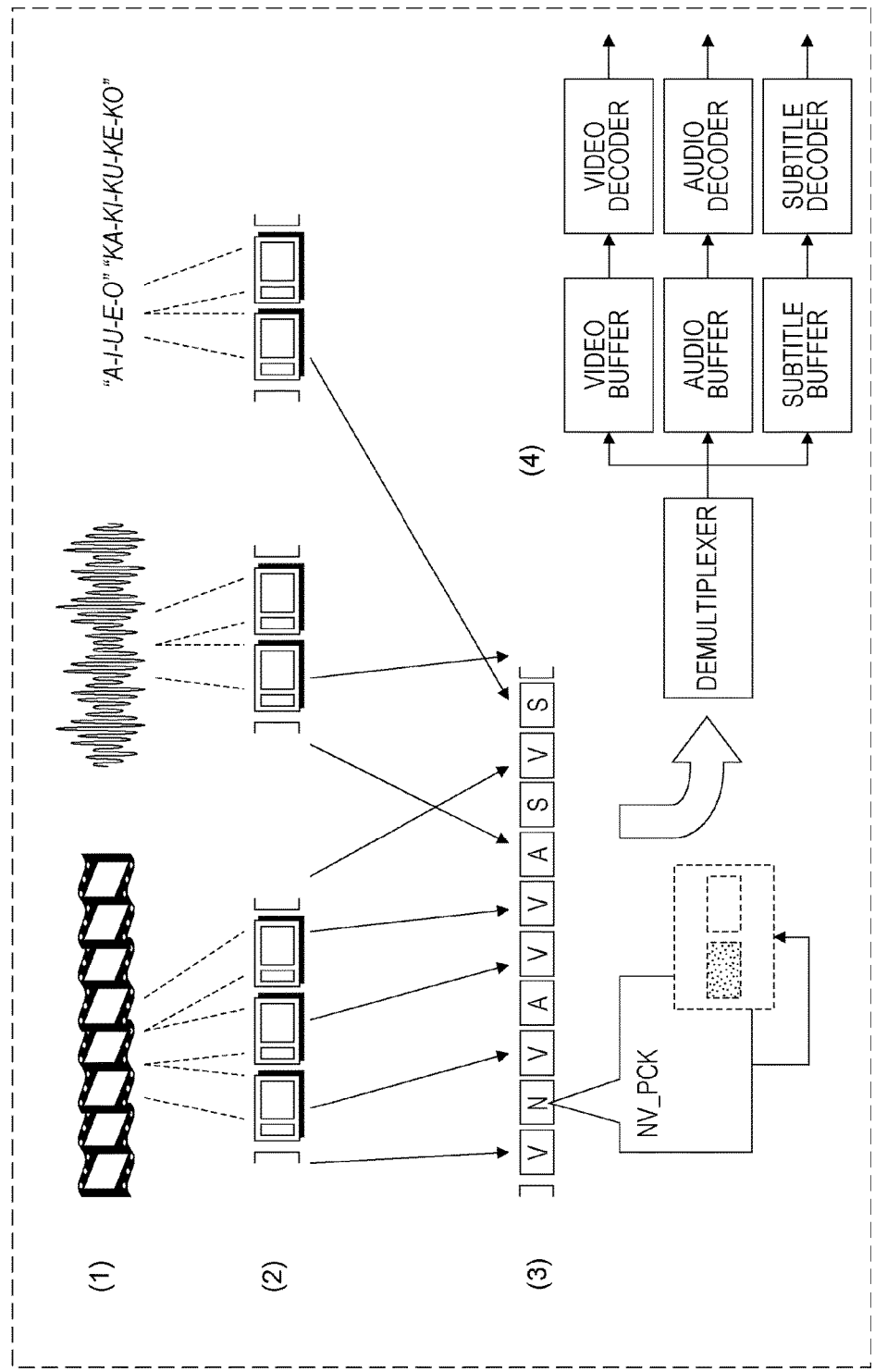
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing.

These decoder buffers have different sized according to each of the individual elementary streams, having 232 kB for video, 4 kB for audio, and 52 kB for subtitles. Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same time. Technology relating to DVDs such as described above is described in Japanese Unexamined Patent Application Publication No. 9-282848.

Now, consideration had not been given to jump rules enabling continuous playback even if branching in multiple angles while playing the video or switching between recording layers or the like occurring. Time during jumping is time when data reading cannot be performed, so the bitstream consumed for playback of video during that time needs to be buffered beforehand. Accordingly, there is a problem that the size of memory for buffer and so forth cannot be designed in the player unless there is an assumption of a predetermined maximum jump time (and maximum bitrate of the stream).

Now, in a large-capacity recording media such as a Blu-ray (registered trademark) Disc (BD), there is a possibility that extremely high-definition video information can be stored. For example, in a case of recording 4K (video information having resolution of 3840×2160 pixels) or HDR (high-luminance video information commonly called High Dynamic Range) in a recording medium, there are cases where an extremely high bitrate is necessary to obtain sufficient image quality, even if the newest high-compression-rate video encoding codec (HEVC or the like) is used. It is conceivable to use the disc as a multi-layer disc divided into a low-speed read zone (LRR Zone) and high-speed read zone (HRR Zone).

However, in a case of accessing a data file requested by the program at the same time as reading out such a high bitrate stream from a disc (called "Java (registered trademark) I/O during AV playback" or the like in Blu-ray discs), a large read buffer needs to be installed, since great rotational speed difference due to the optical pickup moving in the radial direction of the disc, and spherical aberration correction at each recording layer, take time. There also is a problem that, even if a large read buffer is installed, buffering to the read buffer task time, so it is difficult to provide functions where a program such as Java (registered trademark) accesses a data file while playing an AV stream, inexpensively and with good response. In light of the above studies, the Present Inventors studied the following improvement measures to solve the above problem.

A recording medium according to a first aspect of the present disclosure is a recording medium in which is recorded data including a digital stream obtained by encoding video information. A recording region of the recording medium has a first recording region where reading is performed at a first read rate, and a second recording region where reading is performed at a second read rate that is faster than the first read rate. The data includes a digital stream having real-time attributes and a data file having non-real-time attributes. The data file to be read in during playback of the digital stream is recorded in, of the first recording region and the second recording region, the same recording region as the recording region where the digital stream being played is recorded.

According to this arrangement, even in a case where there are two recording regions read in at different read rates, a data file can be accessed at the same time as playback of a digital stream without employed an extremely large read buffer.

Also, for example, the data file to be read in during playback of the digital stream further may be recorded in a region within ⅓ strokes from the recording region where the digital stream being played is recorded.

Also, for example, the recording medium may have a plurality of recording layers, and the data file to be read in during playback of the digital stream further may be recorded in the same recording layer as the recording layer where the digital stream being played is recorded.

Also, for example, the data of the file system may be UDF (Universal Disk Format), and the digital stream may be a file where a value of a filter type field of the digital stream is 249.

These general or specific aspects may be realized by a device, method, system, integrated circuit, computer program, or computer-readable recording medium such as a CD-ROM, and may be realized by any combination of a system, method, integrated circuit, computer program, and recording medium.

Preferred embodiments to carry out the present disclosure will be described below with reference to the attached drawings. It should be noted that the second embodiment is the closest to the disclosure in claim 1 of the present application, the basic configuration of the information recording medium and so forth in the second embedment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
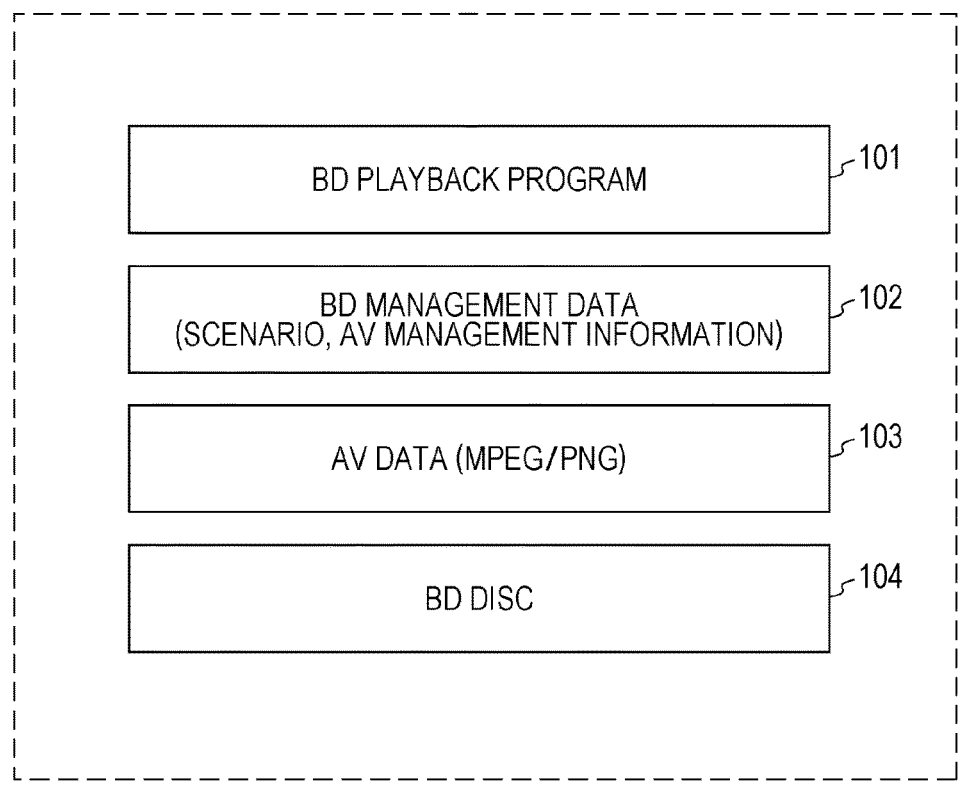
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CR-ROMs and DVD-ROMs, as a matter of course.

Figure 5:
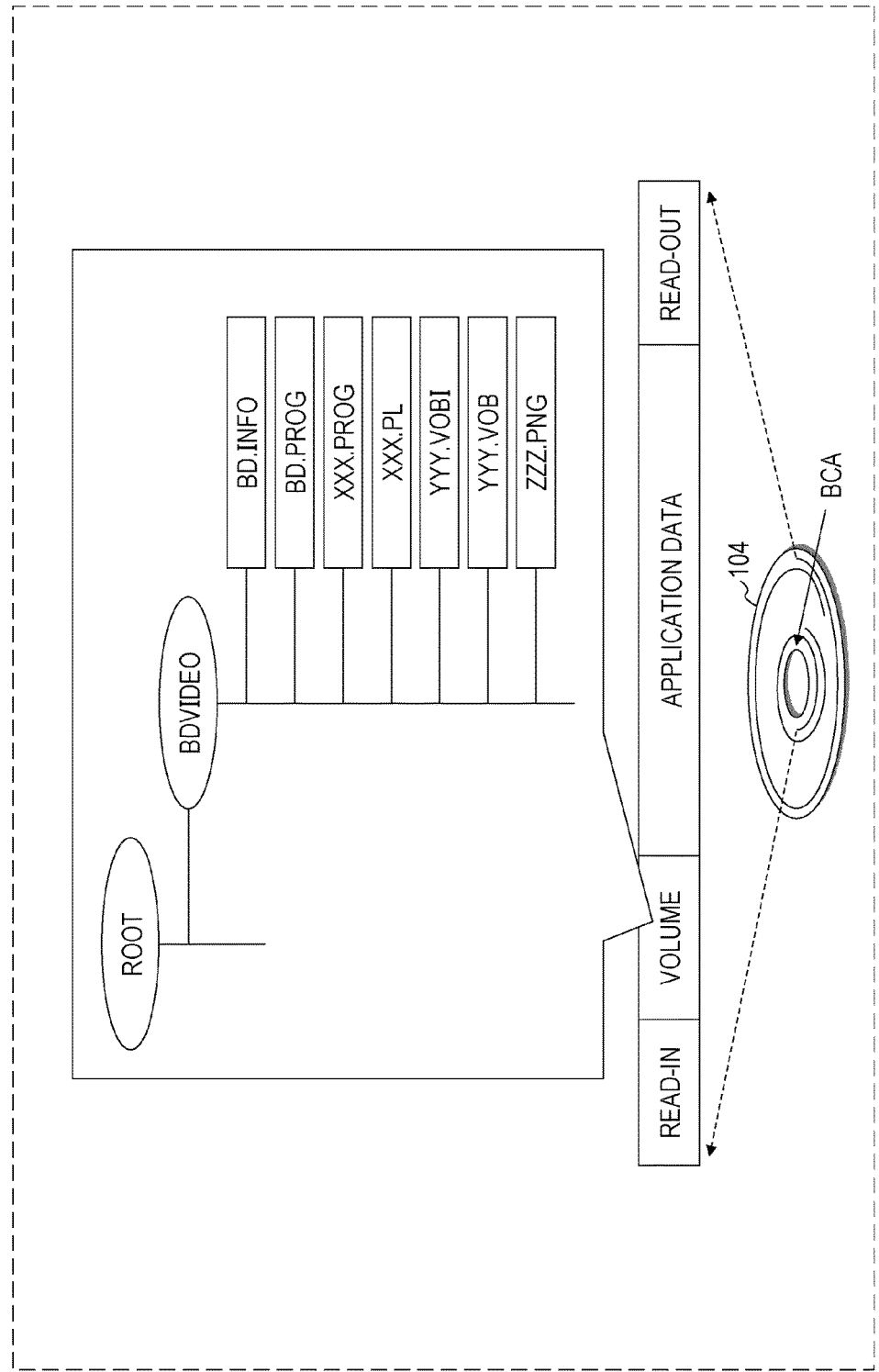
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BCA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded.

The following seven types of files are recorded beneath the BDVIDEO directory.

BD.INFO (fixed filename)

This is one of "BD management information", and is a file in which is recorded information relating to the entire BD-ROM. The BD-ROM player reads out this file first.

BD.PROG (fixed filename)

This is one of "BD playback programs", and is a file in which is recorded a program relating to the entire BD-ROM.

XXX.PL ("XXX" is variable, suffix "PL" is fixed)

This is one of "BD management information", and is a file in which is recorded playlist (Play List) information that records a scenario. Each playlist has one file.

XXX.PROG ("XXX" is variable, suffix "PROG" is fixed)

This is one of "BD playback programs", and is a file in which is recorded a program for each aforementioned playlist. The correlation to the playlist is identified by the file body name ("XXX" matches).

YYY.VOB ("YYY" is variable, suffix "VOB" is fixed)

This is one of "AV data", and is a file in which is recorded a VOB (the same as the VOB described in the example of the conventional art). One VOB corresponds to one file.

YYY.VOBI ("YYY" is variable, suffix "VOBI" is fixed)

This is one of "BD management information", and is a file in which is recorded management information relating to the VOB which is AV data. The correlation to the VOB is identified by the file body name ("YYY" matches).

ZZZ.PNG ("ZZZ" is variable, suffix "PNG" is fixed)

This is one of "AV data", and is a file in PNG (an image format standardized by the World Wide Web Consortium (W3C) and is pronounced "ping") which is image data for configuring subtitles and menu screens. One PNG image corresponds to one file.

Player Configuration

Figure 6:
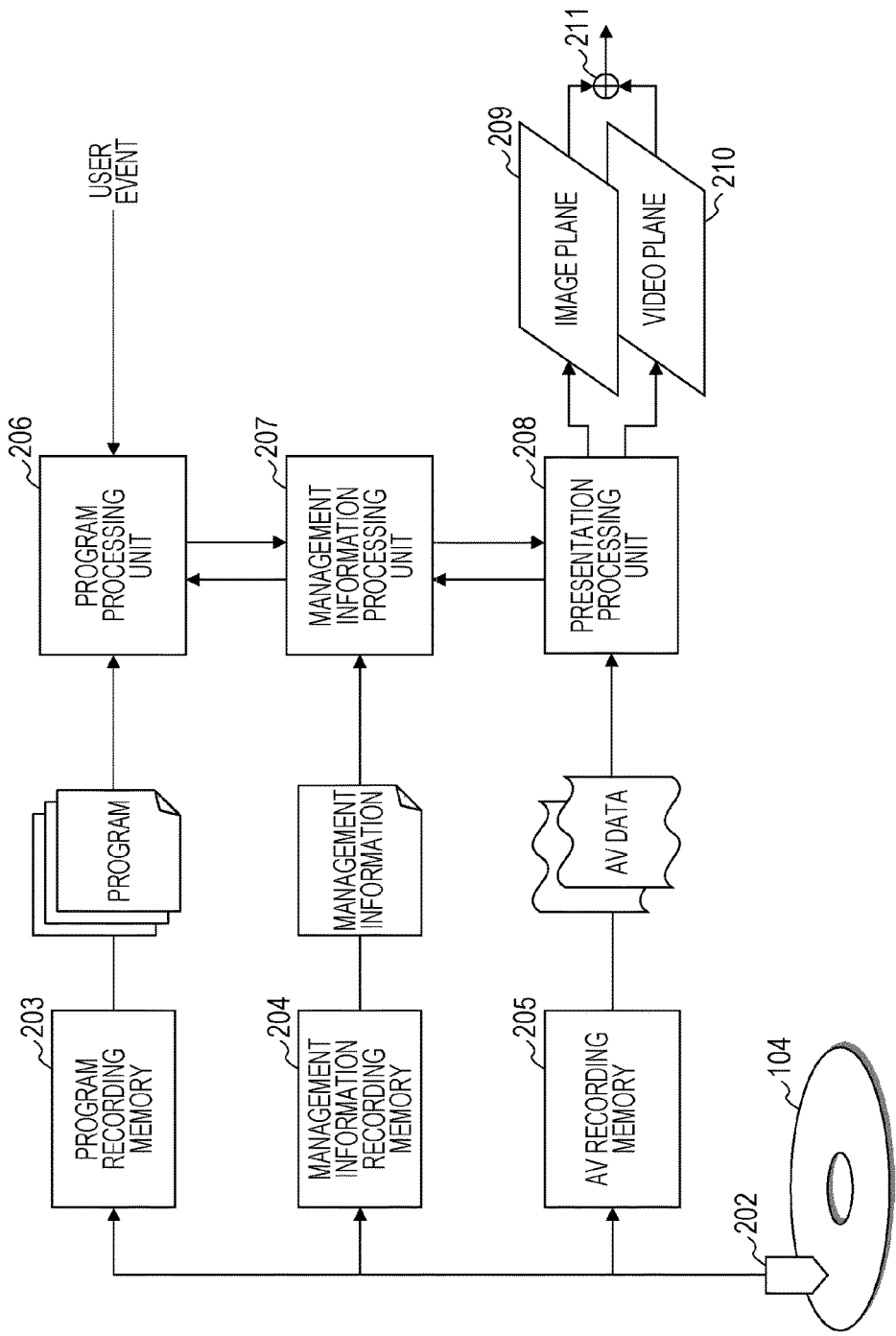
FIG. 6 is a diagram illustrating an overview of a basic configuration of a BD-ROM player that plays BD-ROMs.

Next, the configuration of a player that plays the BD-ROM 104 will be described with reference to FIGS. 6 and 7. FIG. 6 is a schematic diagram illustrating the basic configuration of a BD-ROM player that plays the BD-ROM 104. The BD-ROM player illustrated in FIG. 6 reads out data on the BD-ROM 104 via an optical pickup 202. The data that is read out is stored in dedicated memory in accordance with the type of each data.

The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, instructions of AV data to be played are given to the presentation processing unit 208.

The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a television (TV) or the like.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303.

The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308.

The demultiplexer 310 extracts VOB data recorded in the track buffer 309, based on the time obtained from the clock 307. Further, video data included in the VOB data is sent to the video processor 312, and the audio data to the sound processor 313.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX.PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to e handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX. PROG") is executed by the program processor 302. The program processor 302 processes a BD program in a case where an event has been sent from the scenario processor 305 or a case where an event has been sent from the UO manager 303. In a case where a request has been sent from the user by a remote controller key, the UO manager 303 generates an event corresponding to this request, and sends to the program processor 302. Playback of a BD-ROM is performed by the operations of the components as described above.

Application Space

Figure 8:
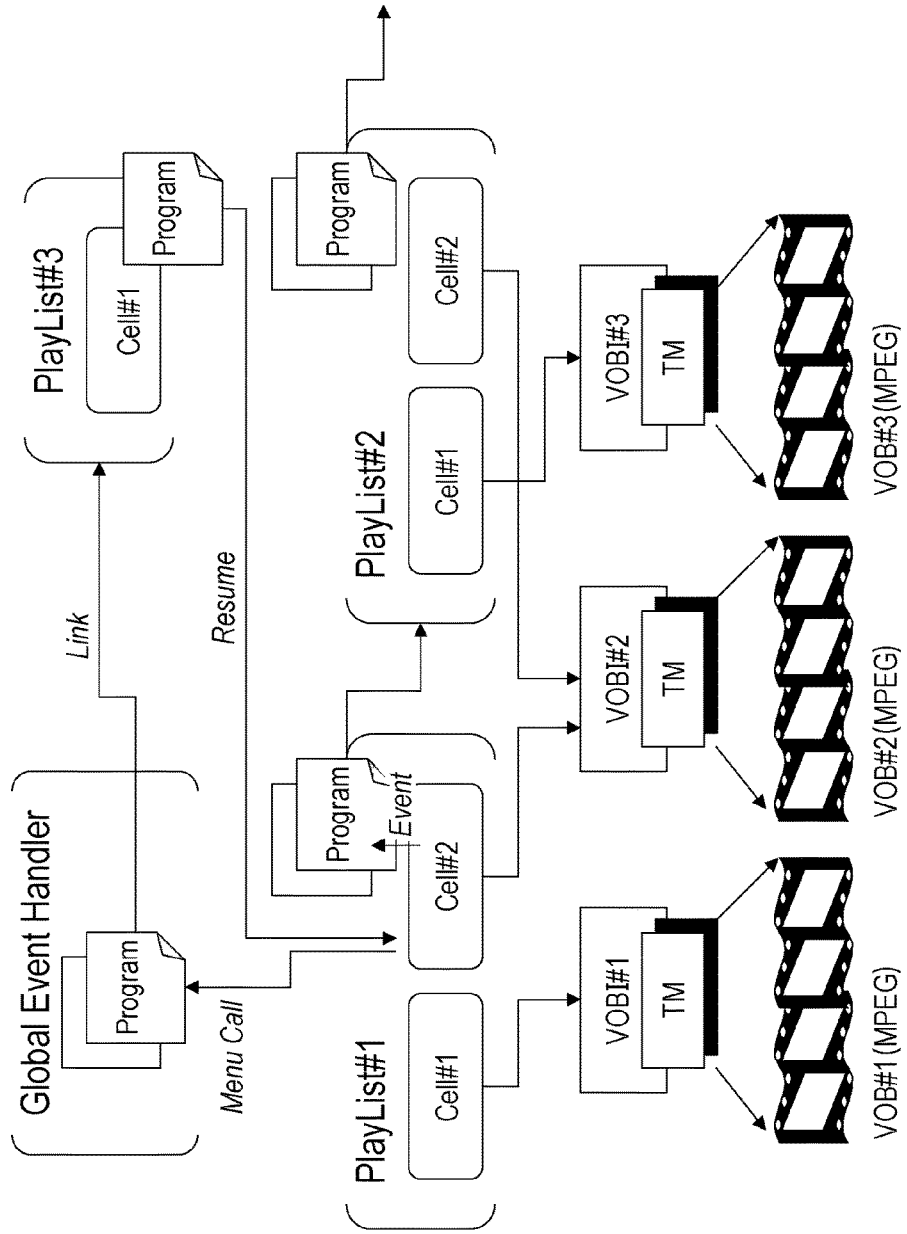
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program. As long as there is no dynamic scenario according to a program, the playlist is simply playing the individual cells in order, and playback of the playlist ends at the point that playback of all cells has ended.

On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point where the audio or subtitles was changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
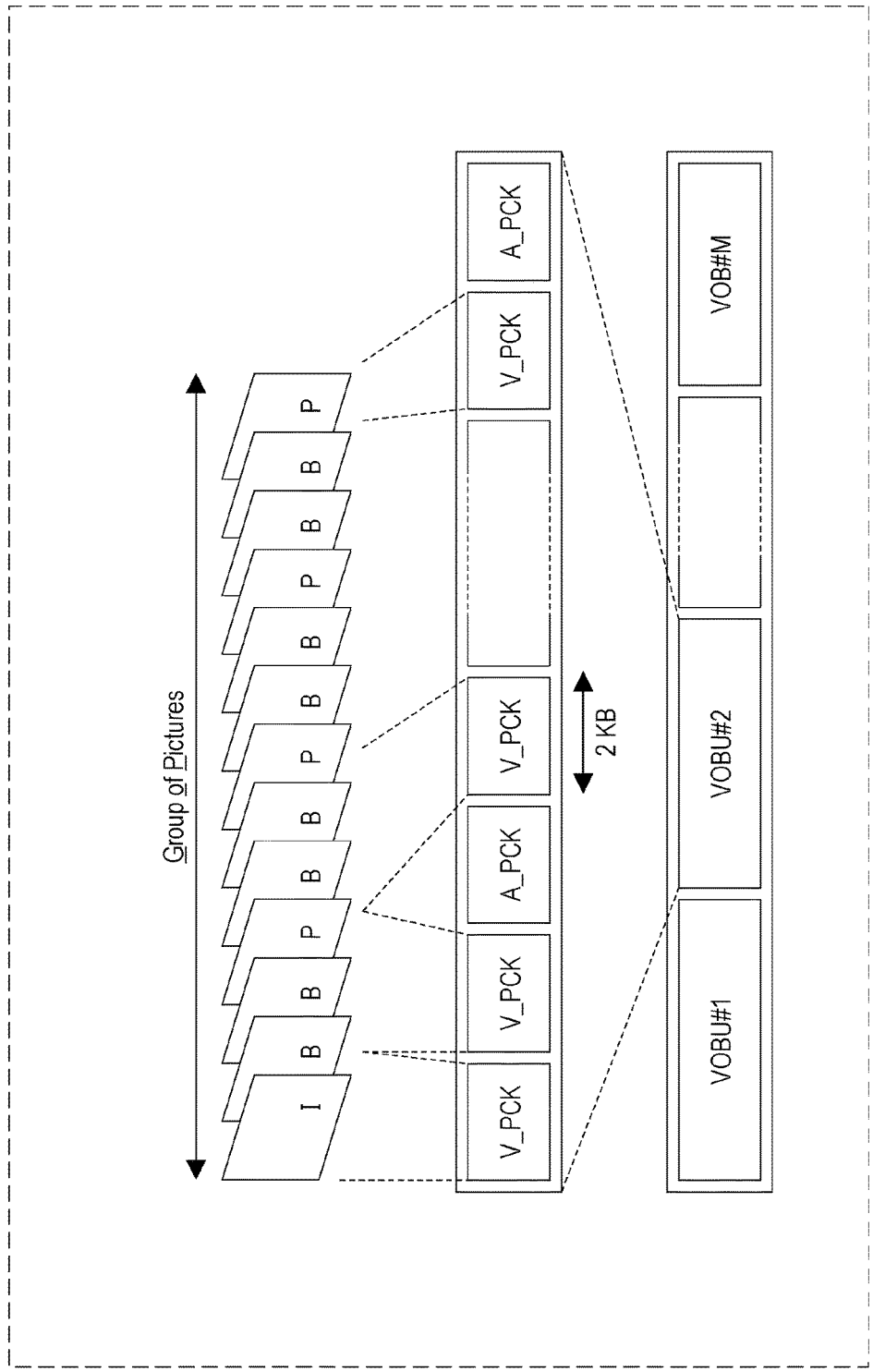
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
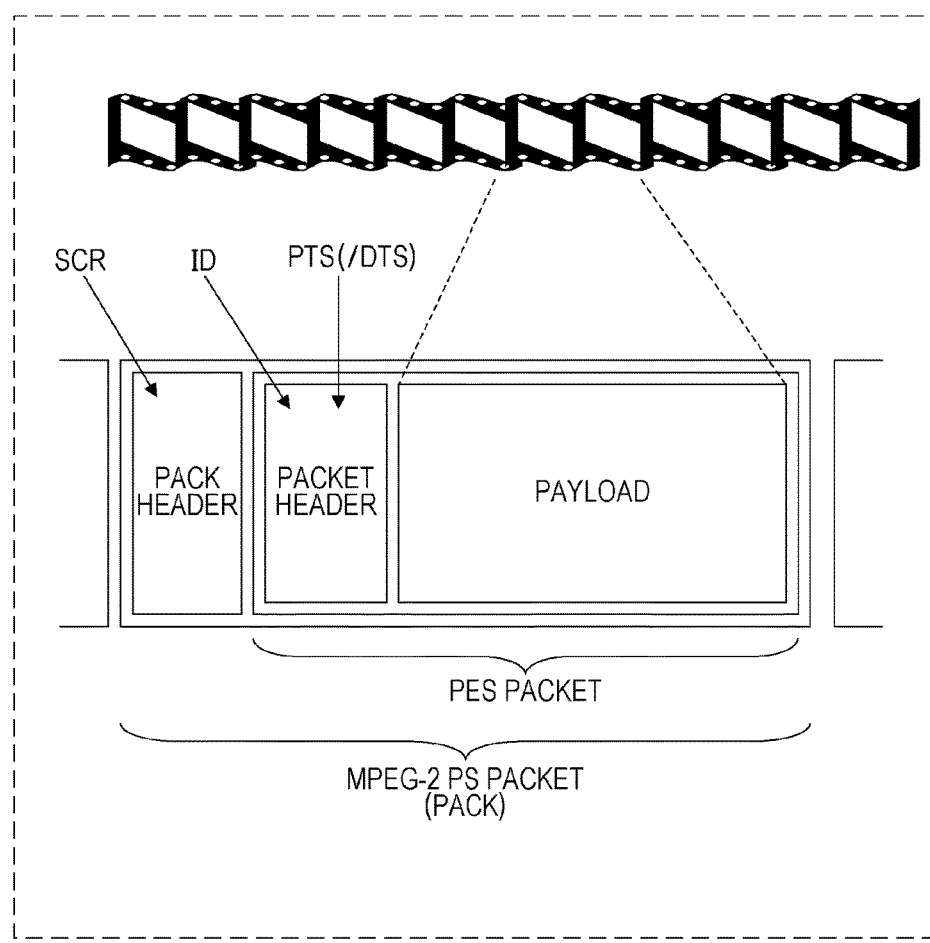
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet data is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams.

Interleaved Recording of VOB

Figure 11:
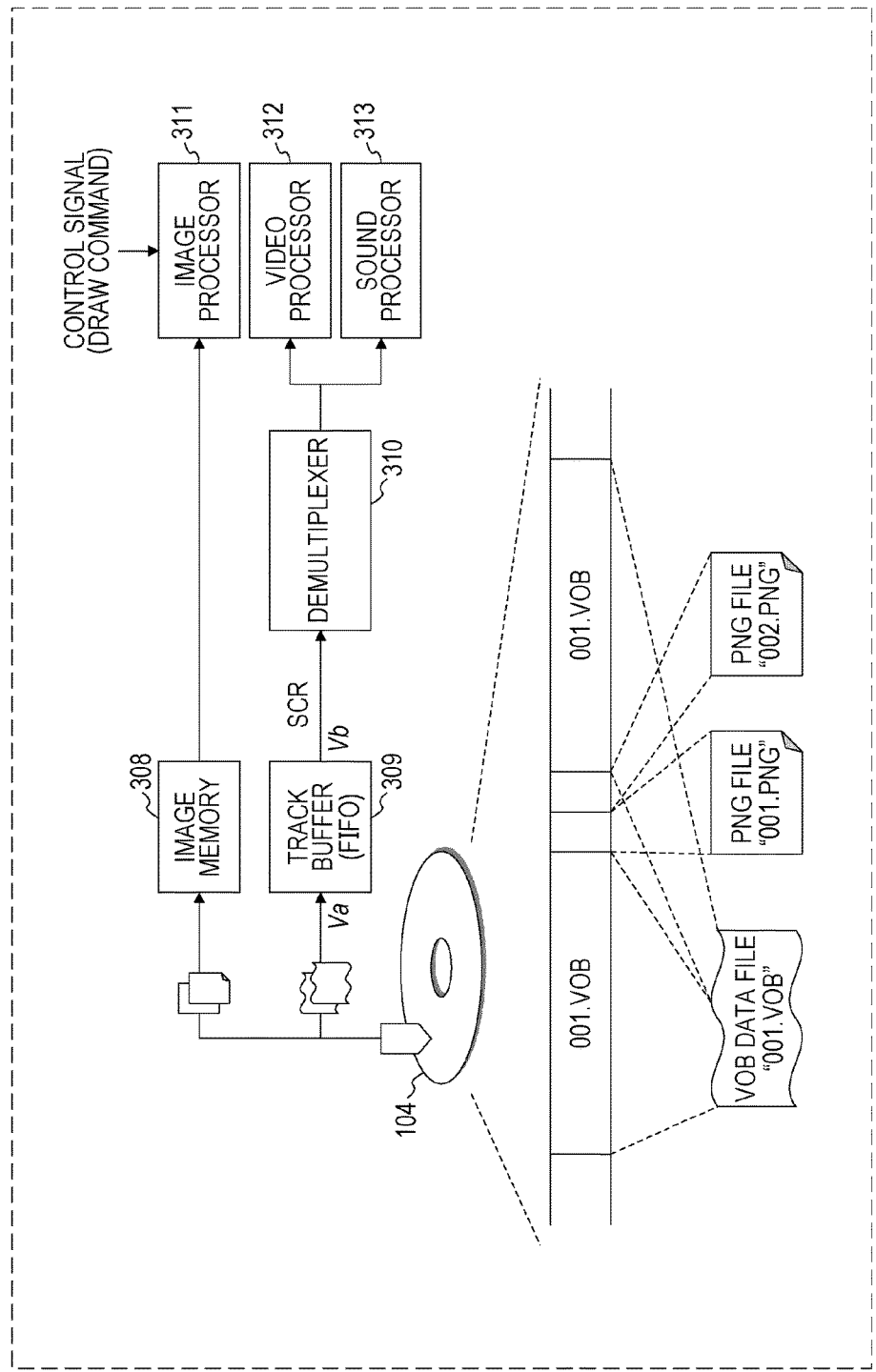
FIG. 11 is a diagram for describing the relationship between AV data and player configuration.

Interleaved recorded of VOB files will be described with reference to FIGS. 11 and 12. FIG. 11 is a diagram for describing the relationship between the AV data and the configuration of a BD-ROM player. Illustrated to the upper side of FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

Figure 7:
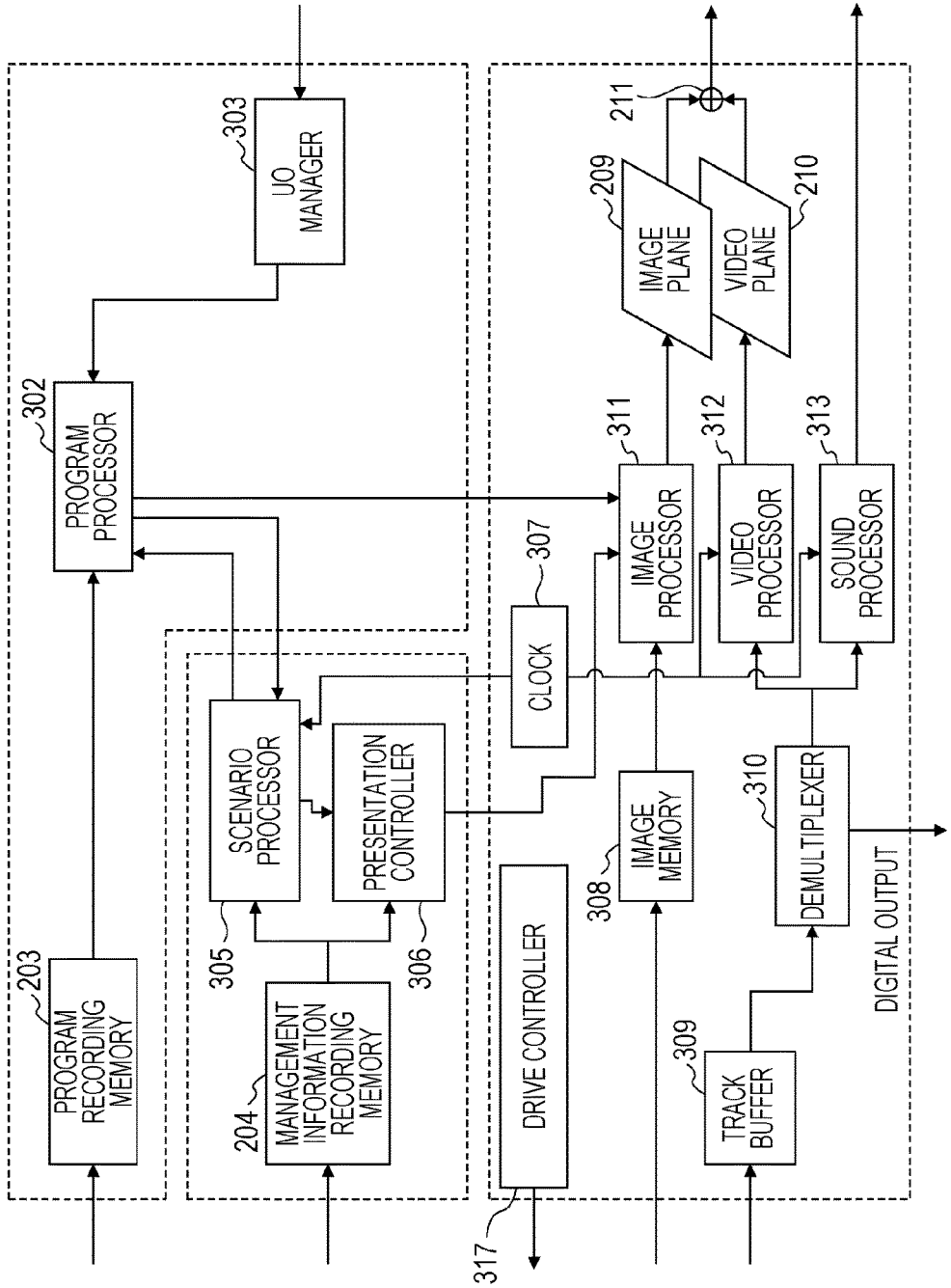
FIG. 7 is a block diagram where the configuration of the player illustrated in FIG. 6 is detailed.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

Illustrated to the lower side of FIG. 11 is interleaved recording of a VOB file and PNG files on the BD-ROM. Generally, in the case of a CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, a method where a VOB file is divided into several blocks, and the VOB file and image are subjected to interleaved recording is employed with the present embodiment.

Illustrated to the lower side of FIG. 11 is interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
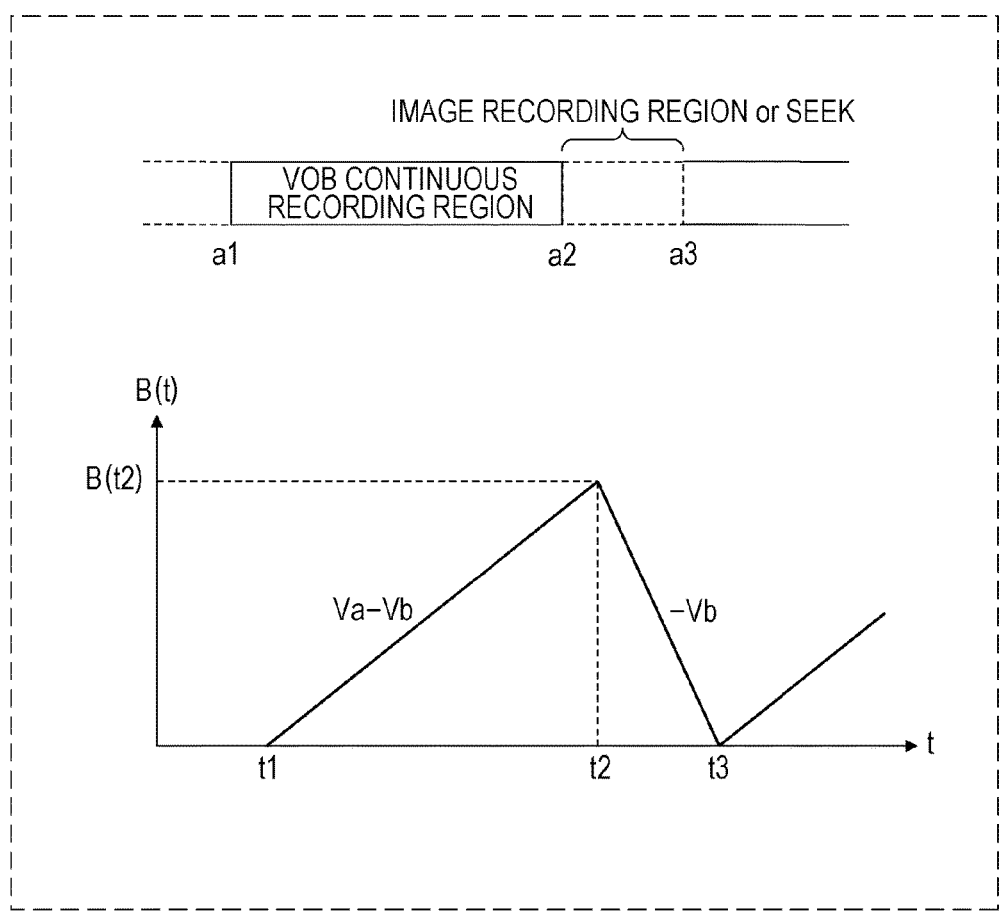
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. The continuous recording region of the VOB continues from "a1" to "a2" as illustrated to the upper side of FIG. 12. From "a2" to "a3" is a section where image data is recorded, so VOB data cannot be read out.

Illustrated to the lower side of in FIG. 12 is the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va−Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va−Vb from "t1" to "t2", and the data accumulation amount B(t2) at the time "t2" can be calculated by the following Expression (1).

$$B(t2)=(Va-Vb)\times(t2-t1) \qquad \text{Expression (1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following Expression (2).

$$B(t2)\geq -Vb\times(t3-t2) \qquad \text{Expression (2)}$$

That is to say, the array of image data should be decided so as to satisfy Expression (2).

Navigation Data Structure

Figure 13:
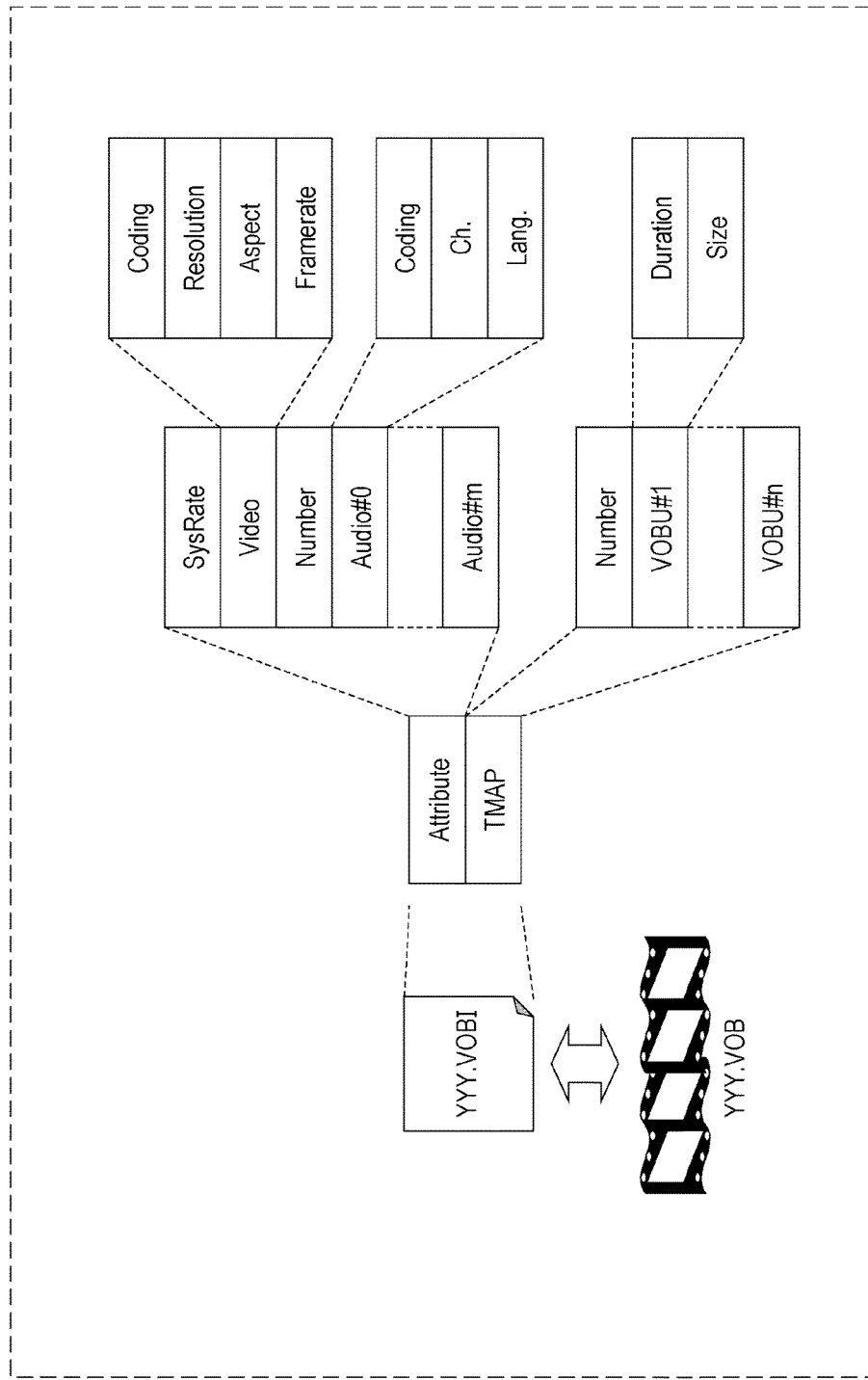
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB. The stream attribute information is of a configuration having video attributes (Video) and audio attributes (Audio#0 through Audio#m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
Compression Format (Coding):
MPEG1
MPEG2
MPEG4
Resolution (Resolution):
1920×1080
1280×720
720×480
720×565
Aspect Ratio (Aspect):
4:3
16:9
Frame Rate (Framerate):
60
59.94
50
30
29.97
25
24

The following are example of fields that the audio attributes (Audio) have, and values which each can have.
Compression Format (Coding):
AC3
MPEG1
MPEG2
LPCM
Number of Channels (Ch):
1 to 8
Language Attributes (Language):
JPN, ENG, . . . .

The time map (TMAP) is a table having information for each VOBU, and holds the number of VOBUs (Number) that the VOB has, and each VOBU information (VOBU#1 through VOBU#n). Each VOBU information has a playtime length (Duration) of the VOBU and data size (Size) of the VOBU.

Figure 14:
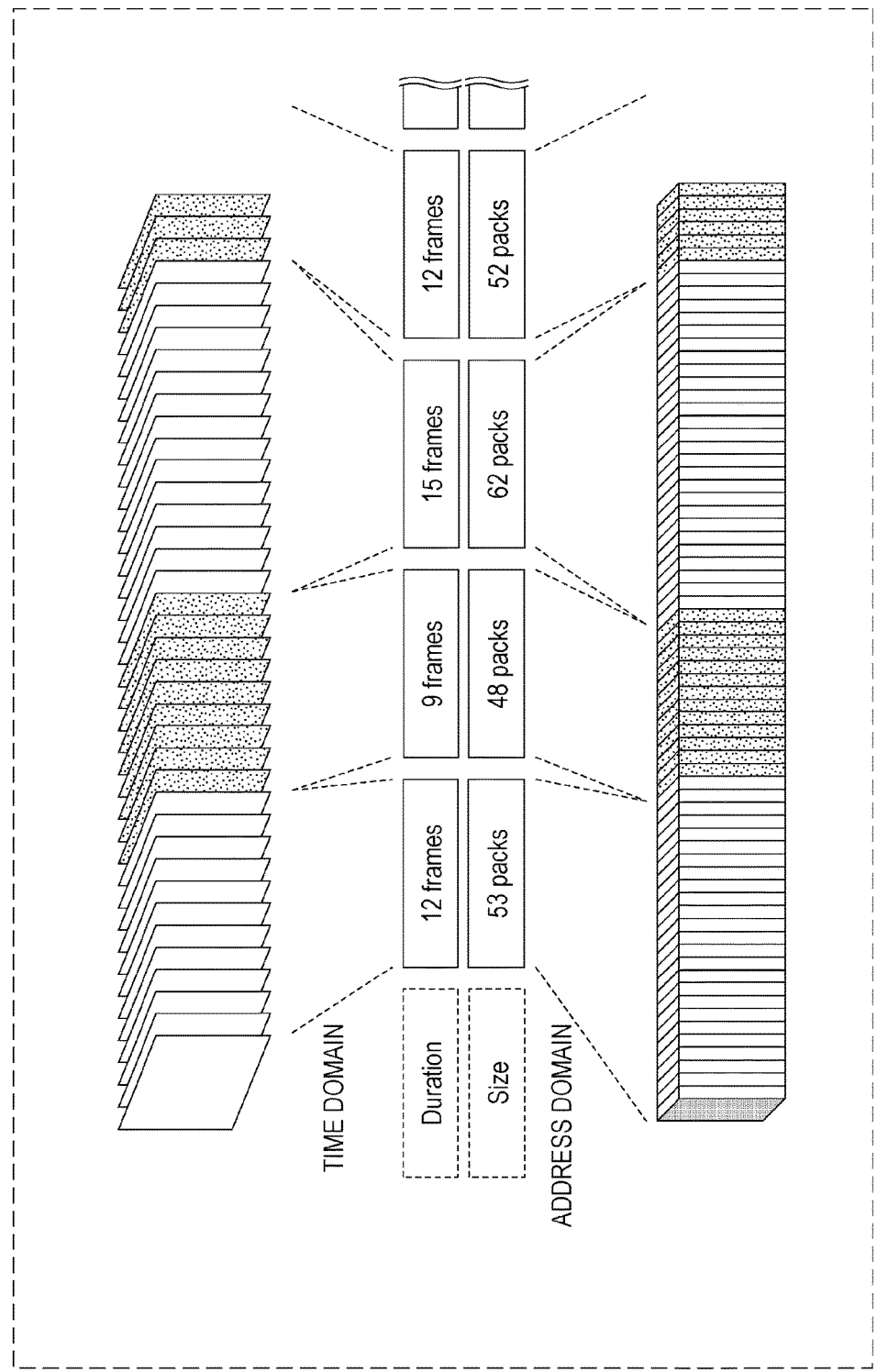
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression.

However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures.

Accordingly, it is impossible to express the relationship between time and address by a common expression in the case of MPEG video. As a matter of course, it is impossible to express the relationship between time and address by a common expression, with regard to an MPEG stream where MPEG video data has been multiplexed, i.e., a VOB, as well.

Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
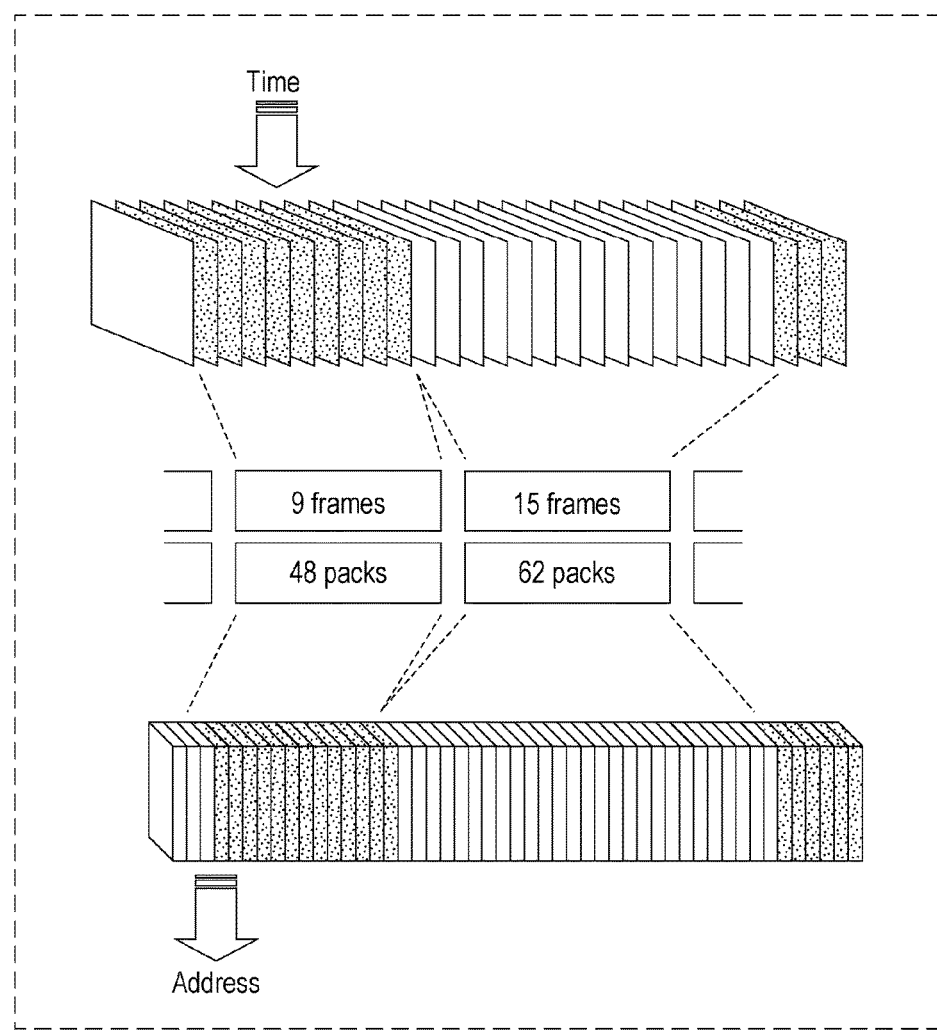
FIG. 15 is a diagram for describing an address information acquisition method using a time map.

How to use a time map (TMAP) will be described with reference to FIG. 15. FIG. 15 is a diagram for describing an address acquisition method using a time map. In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
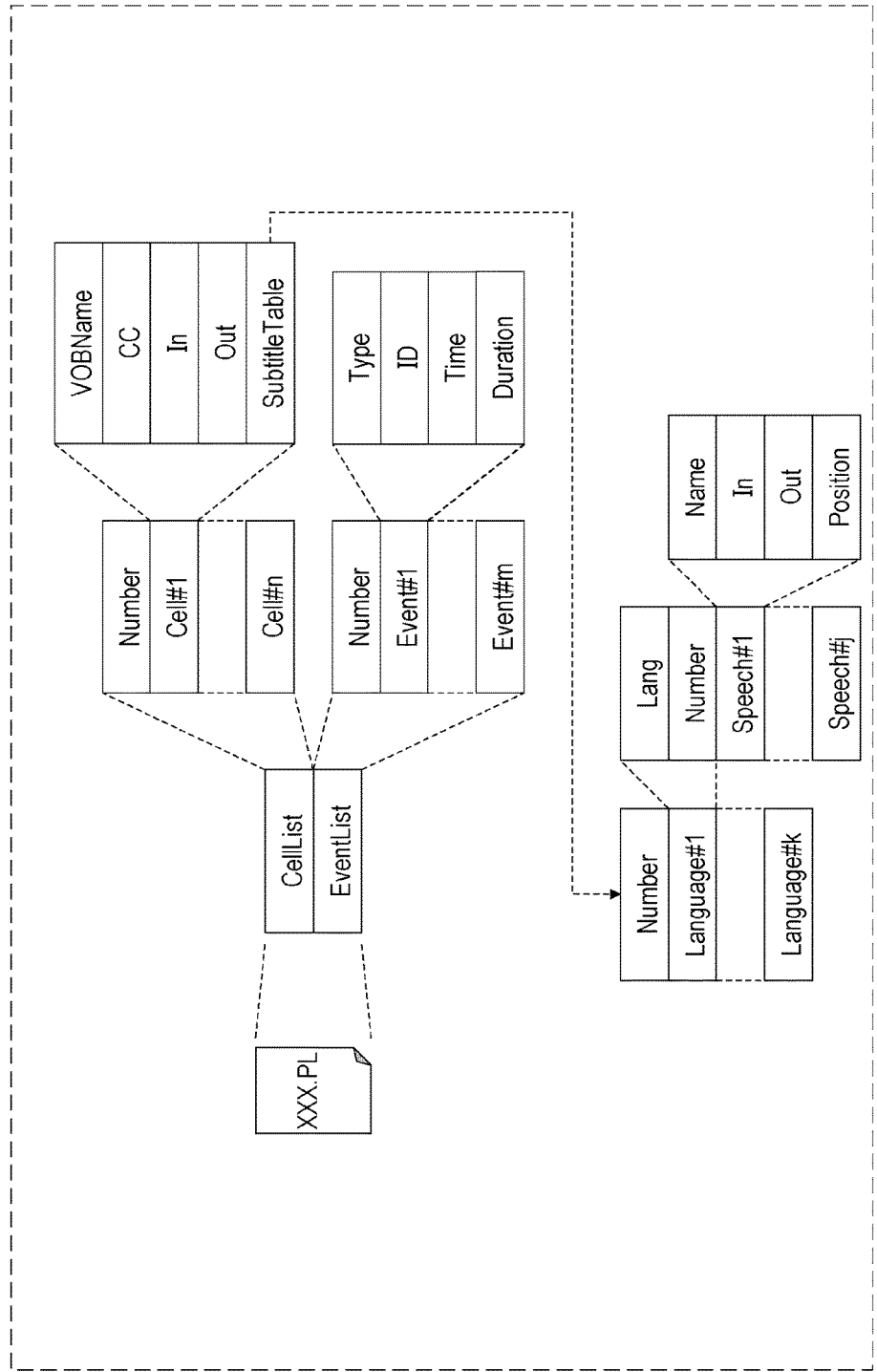
FIG. 16 is a diagram illustrating the configuration of a playlist.

Next, the internal structure of the playlist ("XXX.PL") will be described with reference to FIG. 16. FIG. 16 is a diagram illustrating the configuration of a playlist. A playlist is made up of a cell list (CellList) and event list (EventList).

A cell list (CellList) is information indicating the playback cell sequence within the playlist, and cells are played in the order of description in this list. The content of a cell list (CellList) is the number of cells (Number) and information of each cell (Cell#1 through Cell#n).

The information of each cell (Cell#1 through Cell#n) has the VOB filename (VOBName), the valid section start time (In) and valid section end time (Out) in this VOB, and a subtitle table (SubtitleTable). The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language#1 through Language#k).

The table for each language (Language#1 through Language#k) is made up of language information (Language), the number of pieces of subtitle information of the subtitles to be displayed (Number) The subtitle information of the subtitles to be displayed (Speech#1 through Speech#j). Each subtitle information (Speech#1 through Speech#j) is made up of a corresponding image data file-name (Name), subtitle display start time (In) and subtitle display end time (Out), and subtitle display position (Position).

The event list (EventList) is a table defining events occurring within this playlist. The event list is made up of the number of events (Number), and following this the individual events (Event#1 through Event#m), each event (Event#1 through Event#m) being made up of event type (Type), event ID (ID), event generation time (Time), and valid period (Duration).

Figure 17:
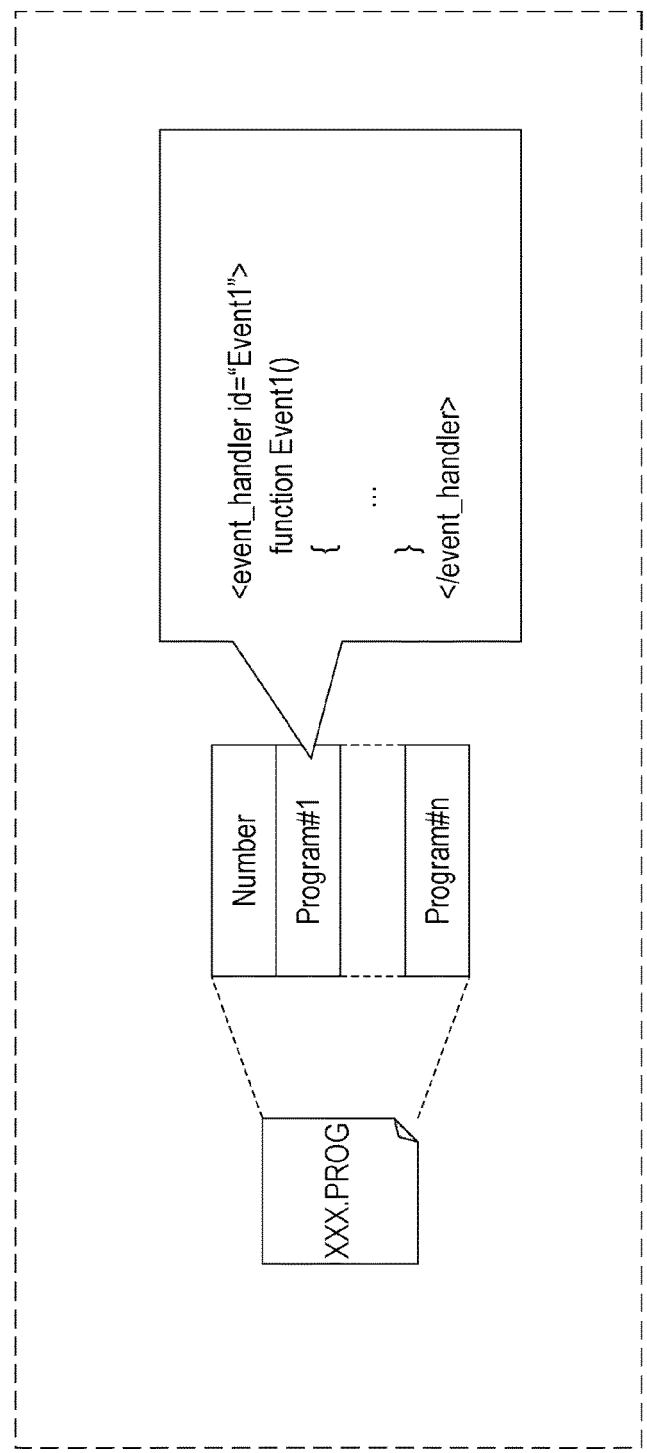
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist. The event handler table contains the number of event handlers/programs that are defined (Number), and individual event handlers/programs (Program#1 through Program#n).

The description within each of the event handlers/programs (Program#1 through Program#n) contains a definition of the start the event handler (an <event_handler> tag) and an event handler ID (event handler id) that is paired with the aforementioned event ID. Following this, the program is described between brackets { } after "function".

Figure 18:
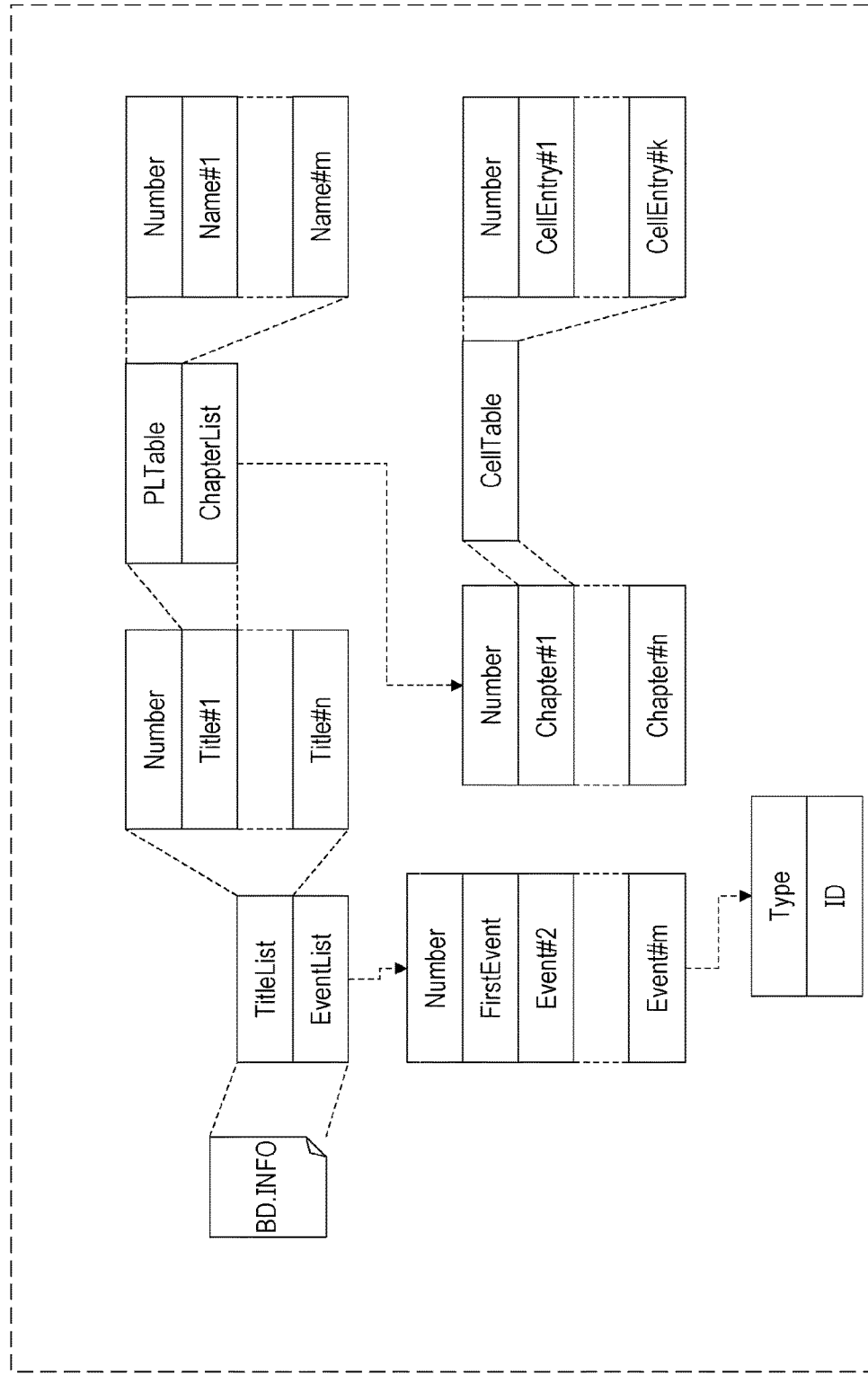
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information. The overall BD-ROM information is made up of a title list (TitleList) and event list (EventList) for global events.

The title list (TitleList) is made up of the number of titles in the disc (Number), and subsequently each title information (Title#1 through Title#n).

Each title information (Title#1 through Title#n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter#1 through Chapter#n). Each chapter information (Chapter#1 through Chapter#n) has a table of cells that this chapter includes (CellTable), the cell table (CellTable) being made up of the number of cells (Number) and entry information of each cell (CellEntry#1 through CellEntry#k).

Cell entry information (CellEntry#1 through CellEntry#k) is described as the playlist name containing this cell and the cell No. Within the playlist.

The event list (EventList) has the number of global events (Number) and information of each global event (Event#1 through Event#m). What is noteworthy here is that the global event that is defined first is called a first event (FirstEvent), and is the event that is executed first when the BD-ROM is inserted into the player.

Each global event information (Event#1 through Event#m) has only the event type (Type) and ID of the event (ID).

Figure 19:
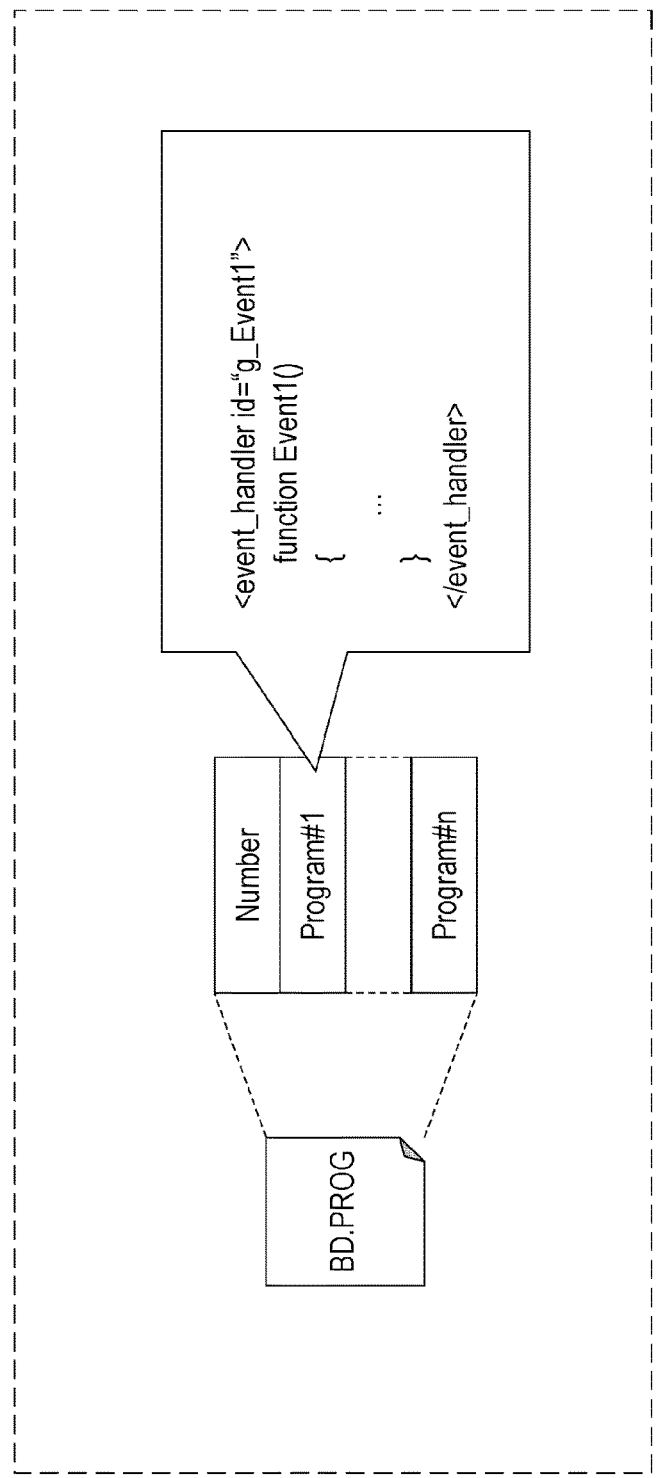
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
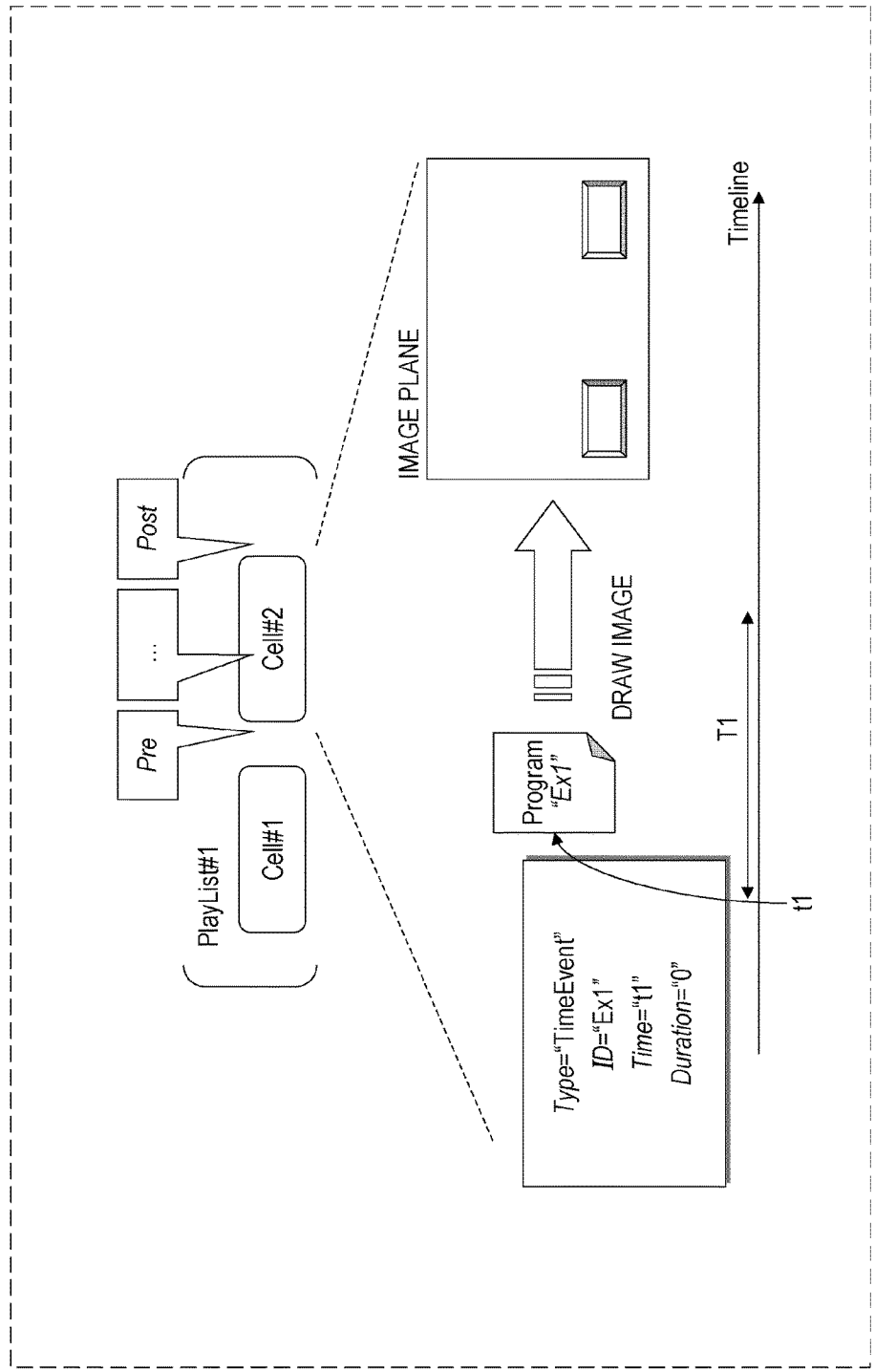
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL").

In a case of an event defined as a time event, i.e., event type (Type) is "TimeEvent", at the point of the event generation time ("t1"), a time event having the ID "Ex1" is output from the scenario processor 305 to the program processor 302. The program processor 302 searches for the handler that has the ID "Ex1", and executes the relevant event handler. For example, in the case of the present embodiment, a two-button image can be drawn, or the like.

Figure 21:
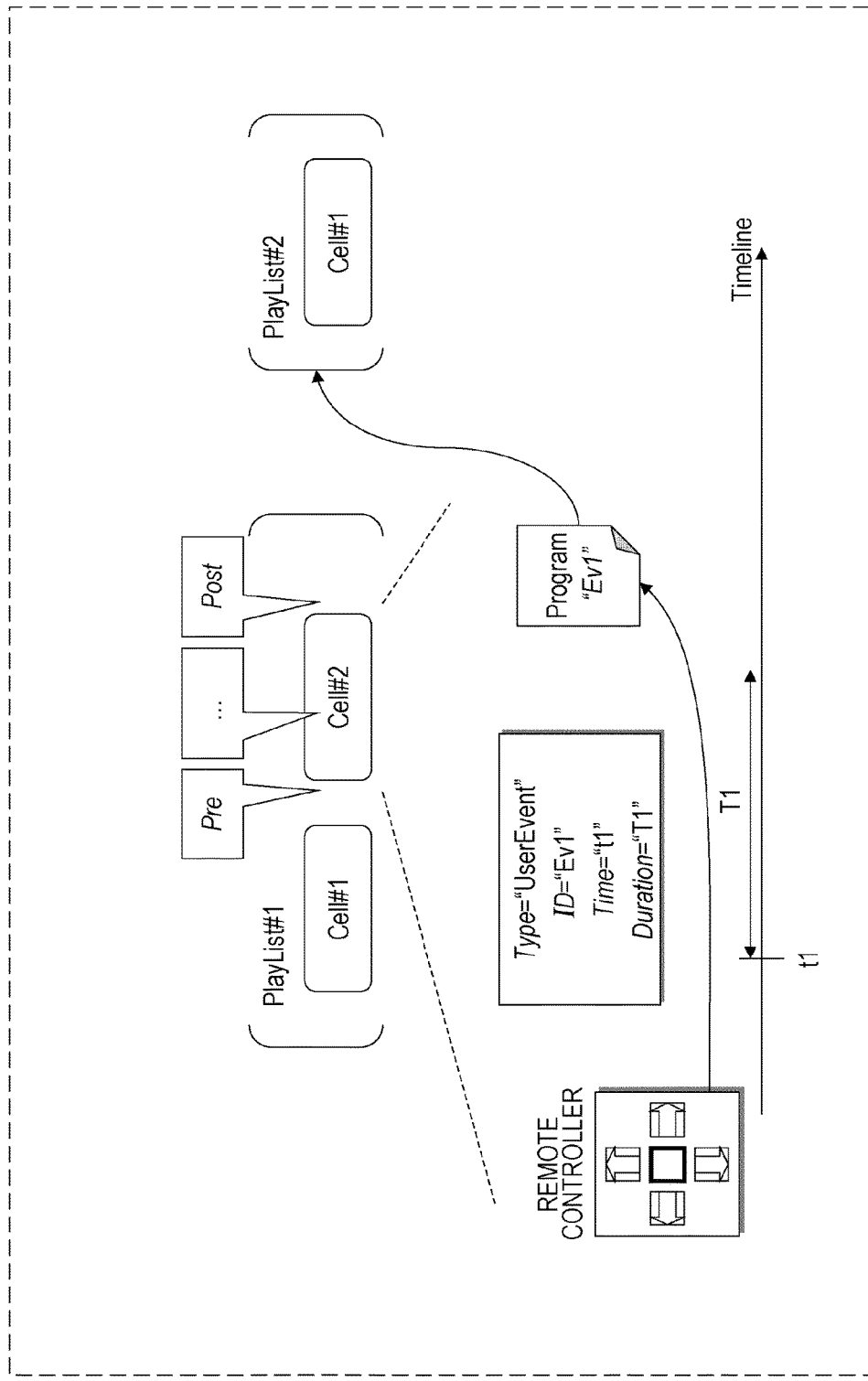
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX.PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("Ti") described in the valid period information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist#2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

Figure 22:
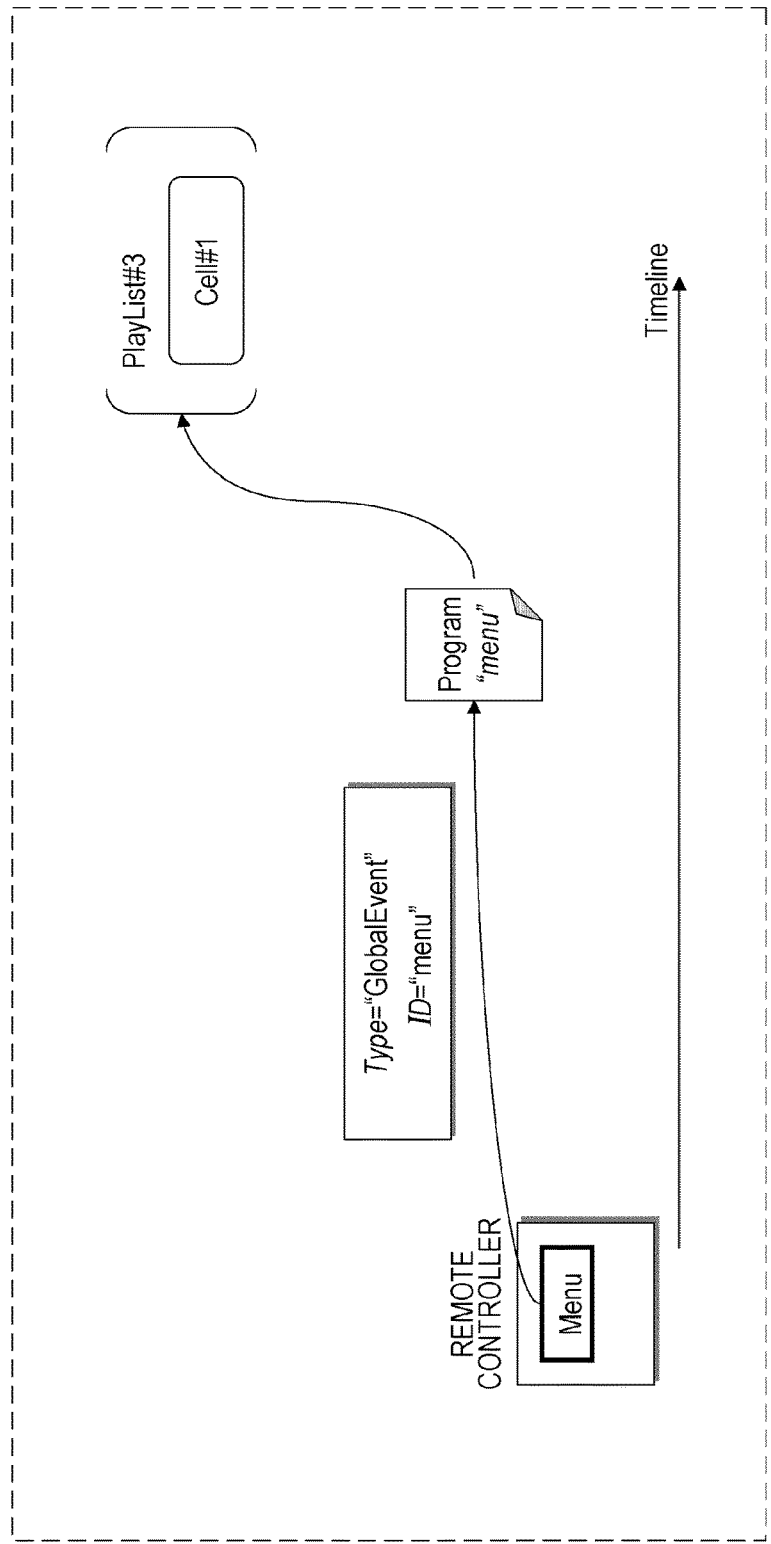
FIG. 22 is a diagram illustrating an example of a global event.

FIG. 22 is a diagram illustrating an example of a global event. As described earlier, a global event is defined in the event list (EventList) in the overall BD-ROM information ("BD.INFO"). An event defined as a global event, i.e., an event of which the event type (Type) is "GlobalEvent", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist#3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

Figure 23:
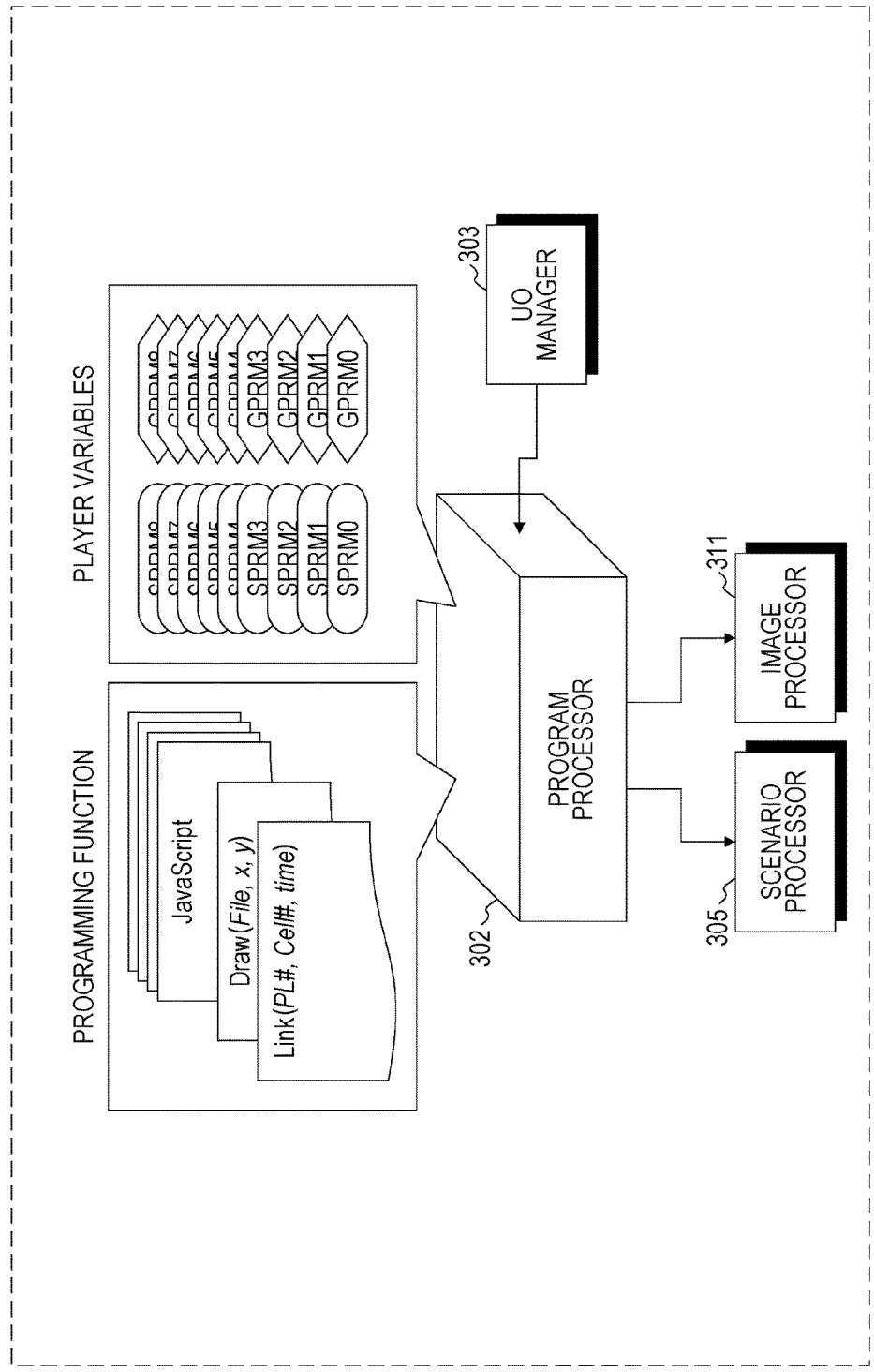
FIG. 23 is a diagram for describing the functional configuration of a program processor.

FIG. 23 is a diagram for describing the functional configuration of the program processor 302. The functional configuration of the program processor 302 will be described with reference to FIG. 23. The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programing functions and player variables. The player variables are stored and held in a register. The programming functions are based on JavaScript (registered trademark), and the following three functions are defined as BD-ROM-unique functions Link function: Stops the current playback, and starts playback from specified playlist, cell, and time.

Link (PL#, Cell#, time)
PL#: playlist name
Cell#: cell No.
Time: time in cell to start playback PNG drawing function: Draws specified PNG data on image plane 209.

Draw (File, X, Y)
File: PNG filename
X: X coordinate position
Y: Y coordinate position Image plane clear function: Clears specified region of image plane 209.

Clear (X, Y, W, H)
X: X coordinate position
Y: Y coordinate position
W: width in X direction
H: width in Y direction The player variables include system parameters (SPRM) indicating setting values and so forth of the player, and general parameters (GPRM) usable in general uses.

FIG. 24 is a diagram illustrating a list of system parameters (SPRM).

SPRM(0): Language code
SPRM(1): Audio stream No.
SPRM(2): Subtitle stream No.
SPRM(3): Angle No.
SPRM(4): Title No.
SPRM(5): Chapter No.
SPRM(6): Program No.
SPRM(7): Cell No.
SPRM(8): Selected key information
SPRM(9): Navigation timer
SPRM(10): playback time information
SPRM(11): Mixing mode for karaoke
SPRM(12): Country information for parental
SPRM(13): Parental level
SPRM(14): Player setting value (video)
SPRM(15): Player setting value (audio)
SPRM(16): Language code for audio stream
SPRM(17): Language code for audio stream (extended)
SPRM(18): Language code for subtitle stream
SPRM(19): Language code for subtitle stream (extended)
SPRM(20): Player region code
SPRM(21): reserved
SPRM(22): reserved
SPRM(23): Playback state
SPRM(24): reserved
SPRM(25): reserved
SPRM(26): reserved
SPRM(27): reserved
SPRM(28): reserved SPRM(29): reserved
SPRM(30): reserved
SPRM(31): reserved Note that in the present embodiment, the programing functions of the virtual player have been described as being based on JavaScript (registered trademark), Other programing functions may be used, such as B-Shell used in UNIX (registered trademark) OS or the like, Perl Script, and so forth, instead of JavaScript (registered trademark). In other words, the programing language in the present disclosure is not restricted to JavaScript (registered trademark).

Example of Program

Figure 25:
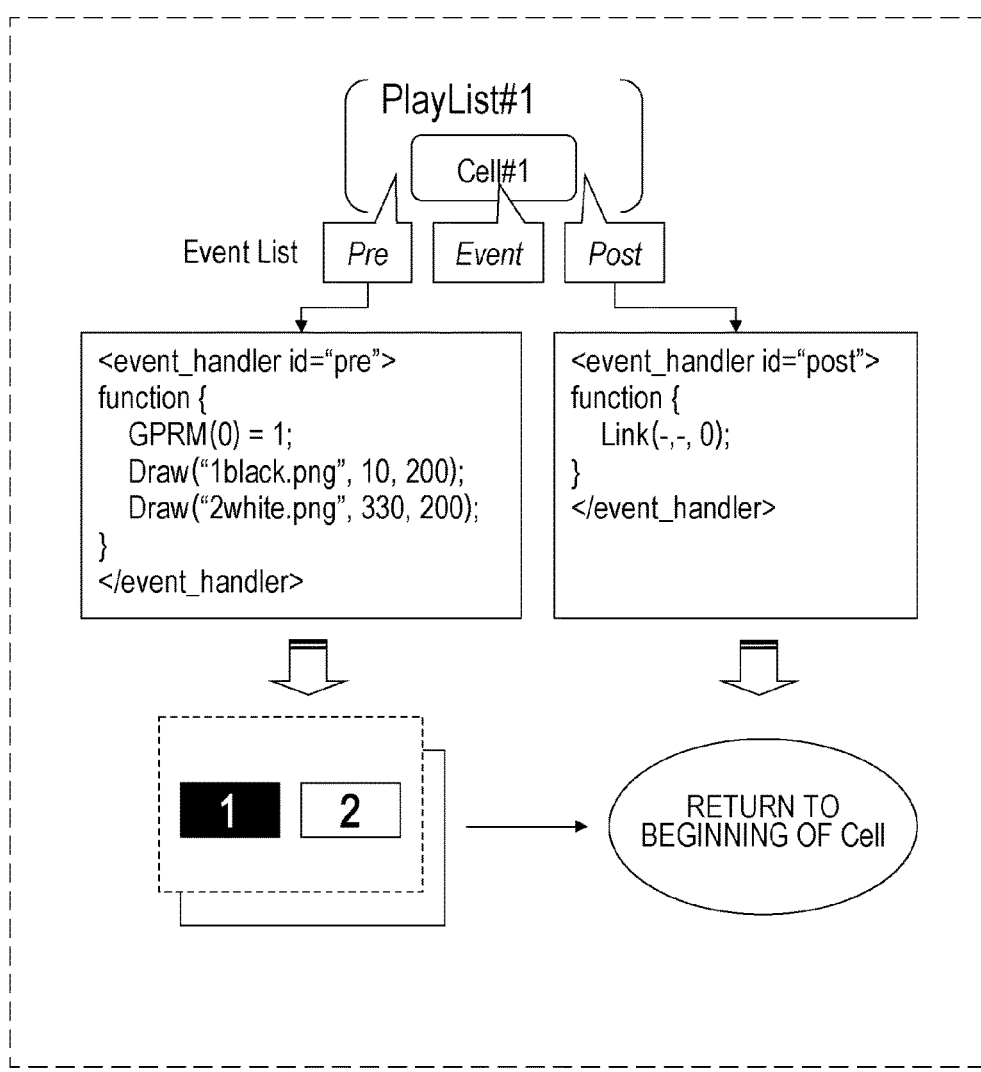
FIG. 25 is a diagram illustrating an example of a program in an event handler according to control of a menu screen having two selection buttons.
Figure 26:
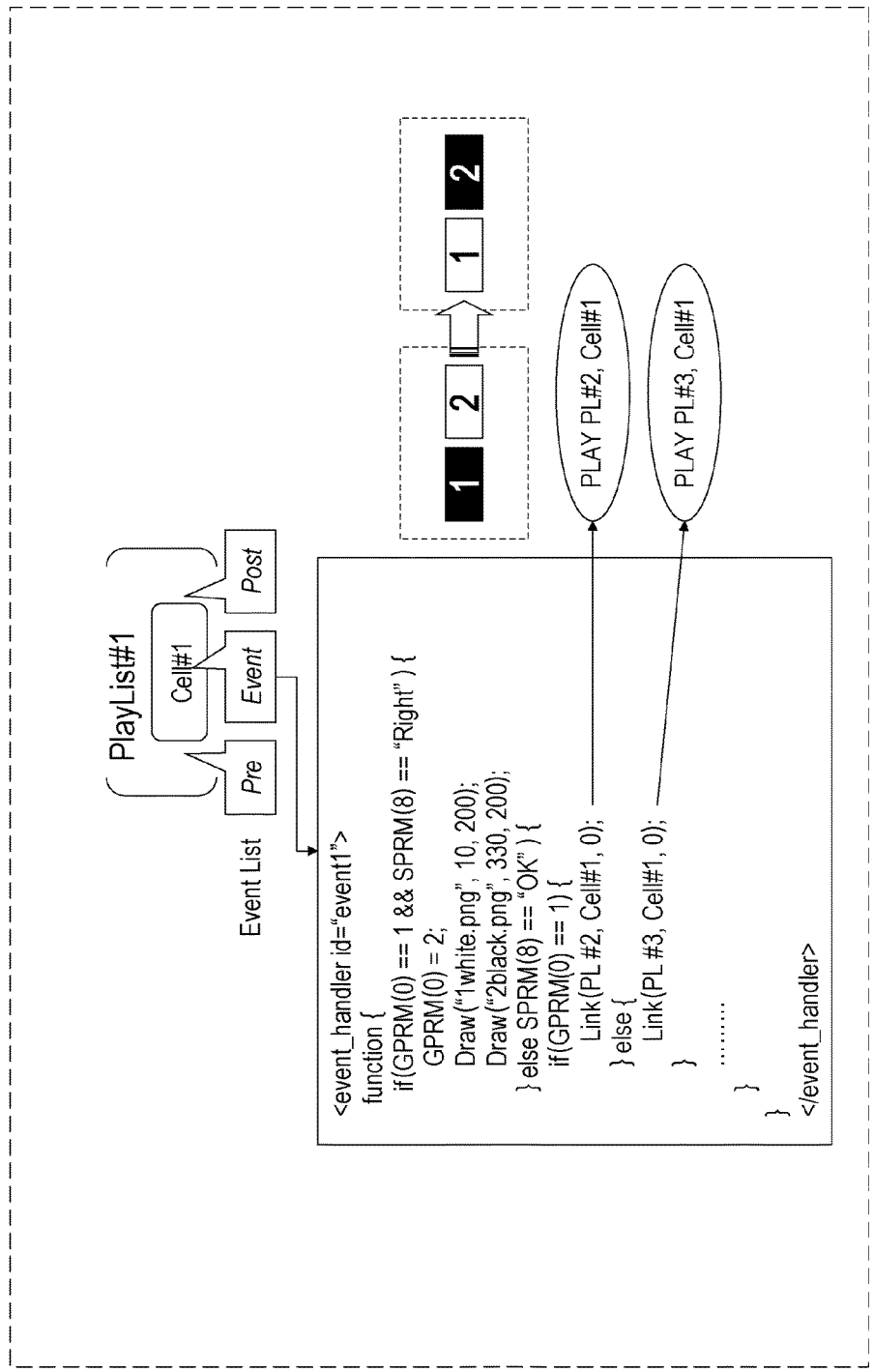
FIG. 26 is a diagram illustrating an example of a program in an event handler relating to a menu selection user event.

FIGS. 25 and 26 are diagrams illustrating an example of a program in the event handler. FIG. 25 is a diagram illustrating an example of a program in an event handler according to control of a menu screen having two selection buttons.

The program to the left side in FIG. 25 is executed using a time event at the beginning of cell (PlayList#1.Cell#1). "1" is set to GPRM(0) here first, which is one of the general parameters. GPRM(0) is used in this program to identify a button that is selected. A state where the button [1] situated on the left side has been selected is held as the initial state.

Next, drawing of a PNG is performed for each of button [1] and button [2] using "Draw", which is a drawing function. The button [1] is drawn as a PNG image "1black.png" with coordinates (10, 200) as the origin (upper left end). The button [2] is drawn as a PNG image "2white.png" with coordinates (330, 200) as the origin (upper left end).

At the end of this cell, the program to the right side in FIG. 25 is executed using a time event. A Link function is used here to instruct playing again from the beginning of this cell.

FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.

The following branching processing is performed by this event handler, using the value of GPRM(0) identifying the selected button, and SPRM(8) identifying the selected remote controller key.

Condition 1) Case where Button[1] is Selected, and the Selected Key is "Right" Key
    GPRM(0) is reset to 2, and the button in the selected state is changed to the button[2] at the right. The images of each of button[1] and button[2] are rewritten.
Condition 2) Case where the Selected Key is "OK" Key, and Button[1] is Selected
    Playback of playlist#2 is started.
Condition 3) Case where the Selected Key is "OK" Key, and Button[2] is Selected
    Playback of playlist#3 is started.

The program illustrated in FIG. 26 is interpreted and executed as described above.

Player Processing Flow

Figure 27:
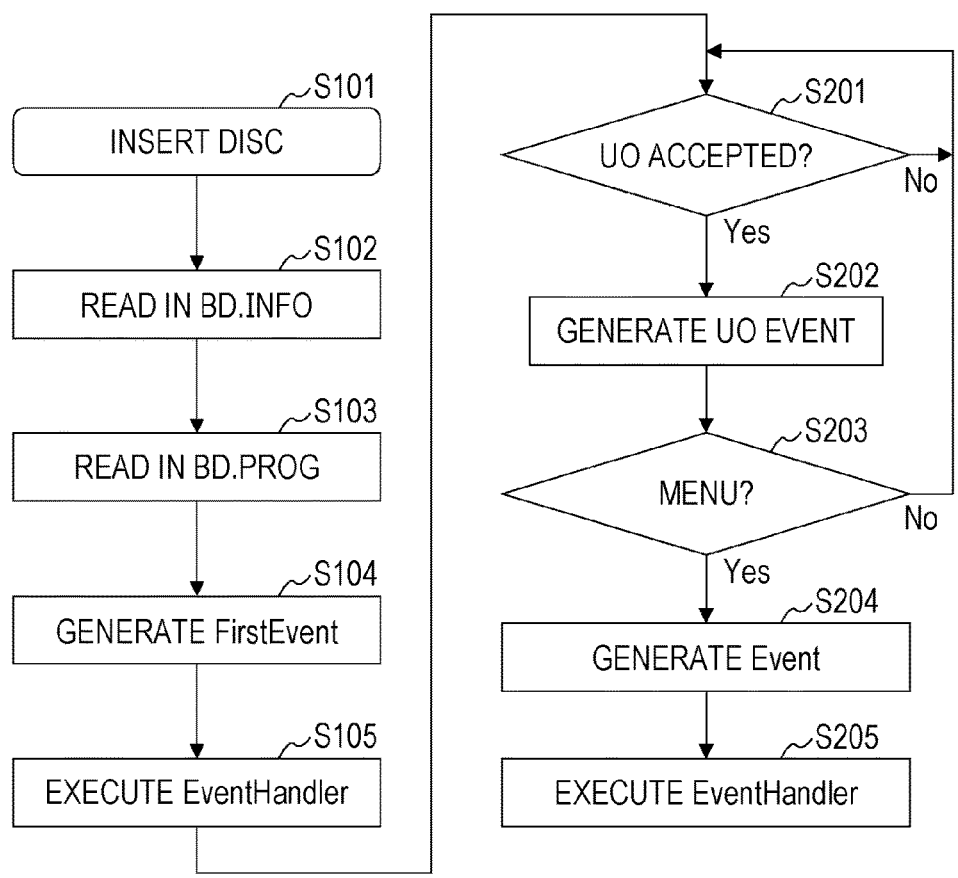
FIG. 27 is a flowchart illustrating the flow of basic processing for playback of AV data in a BD-ROM player.

The flow of processing at the player will be described with reference to FIGS. 27 through 30. FIG. 27 is a flowchart illustrating the basic flow of playback of AV data in a BD-ROM player. Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.

Next, the scenario processor 305 generates the first event, in accordance with the first event (FirstEvent) information in the "BD.INFO" file (S104). The generated first event is received by the program processor 302, which executes the event handler corresponding to this event (S105).

It is expected that the event handler corresponding to the first event will have recorded therein information specifying a playlist to play first. If no playlist to play first is instructed, the player has nothing to play, and simply awaits a user event to accept (No in S201).

Upon receiving a remote controller operation from the user (Yes in S201), the UO manager 303 generates a UO event for the program processor 302 (S202).

The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
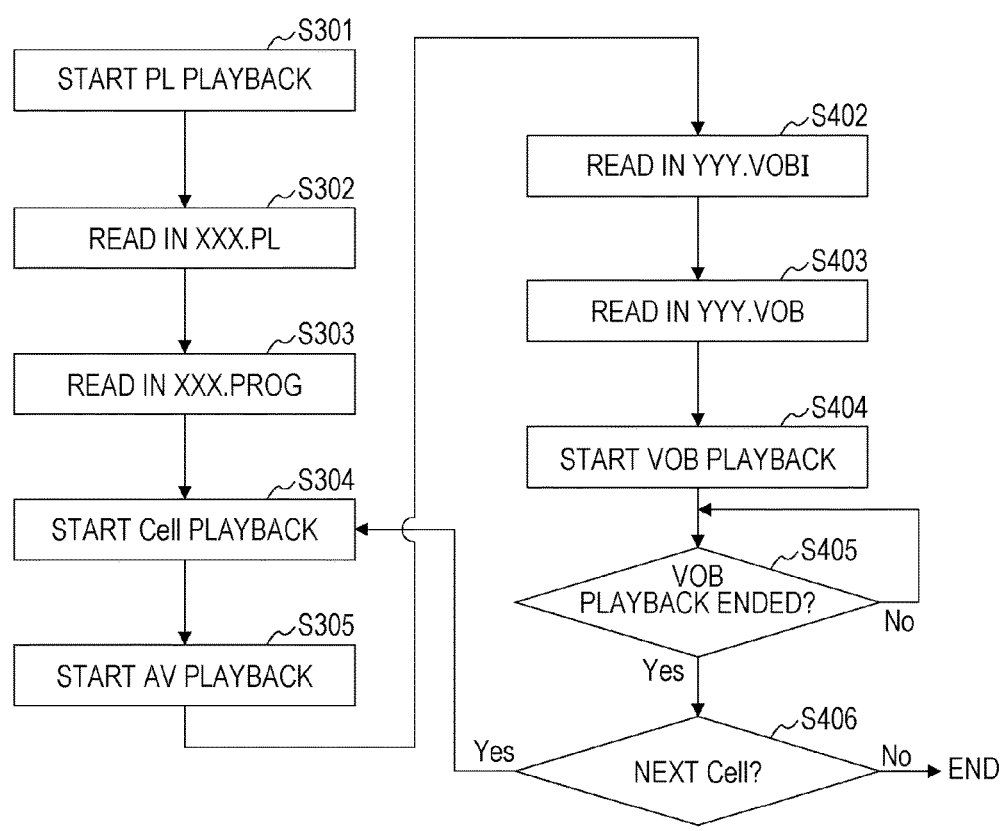
FIG. 28 is a flowchart illustrating the flow of processing in a BD-ROM player from starting to play a playlist until ending playing of the VOB.

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX.PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor 305 to the presentation controller 306, and the presentation controller 306 starts AV data playback (S305).

Once playback of AV data is started, the presentation controller 306 reads in the VOB information file "YYY.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

Figure 29B:
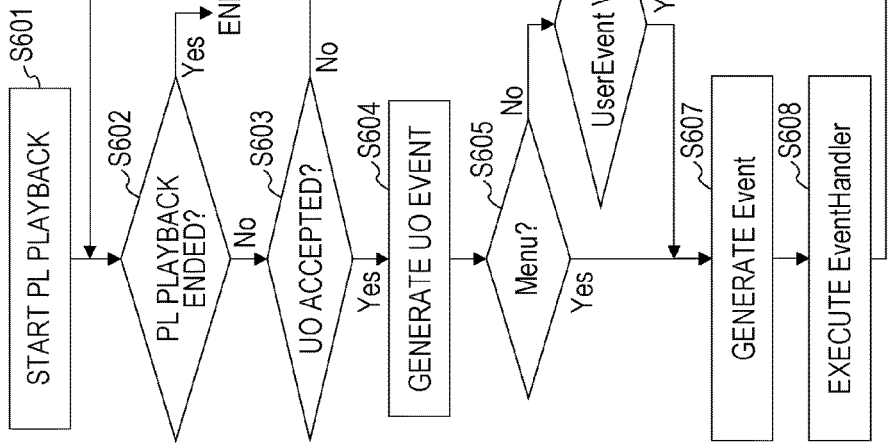
FIGS. 29A and 29B are flowcharts, where
Figure 29A:
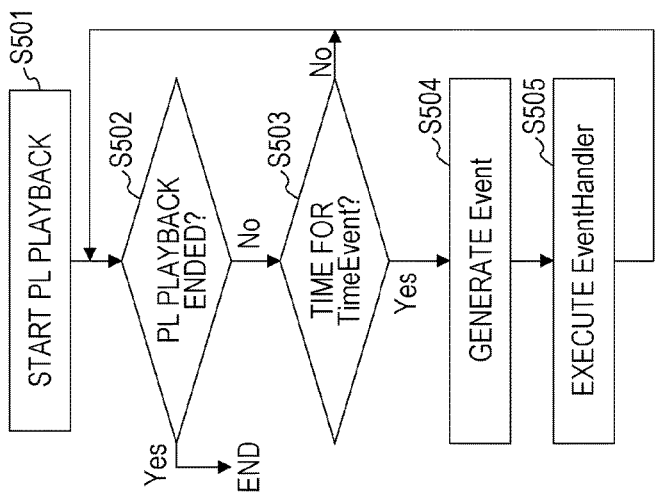

FIGS. 29A and 29B are flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of playlist playback is started at the BD-ROM player (S501), confirmation is made that playlist playback has not ended (S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of playlist playback is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

Figure 30:
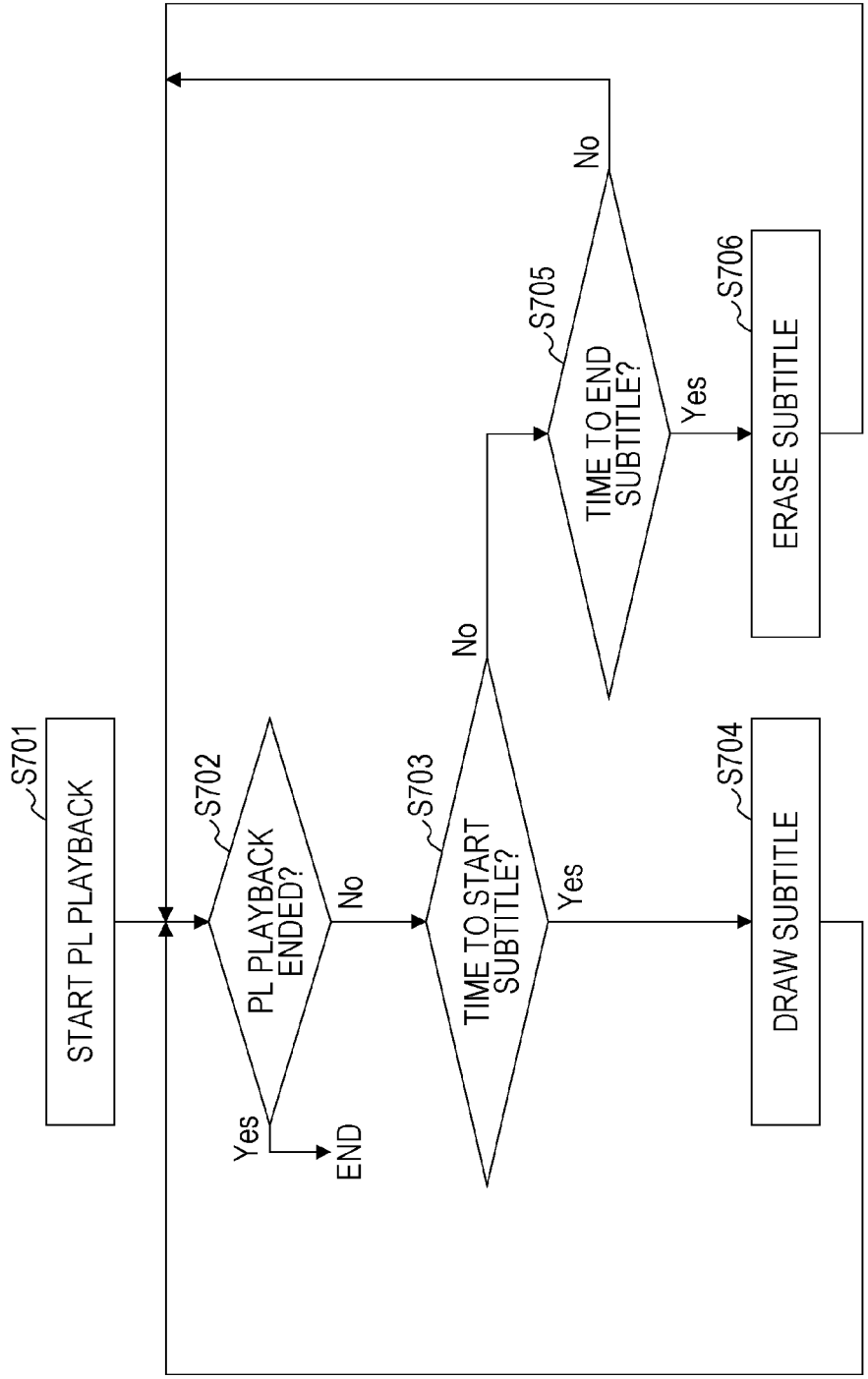
FIG. 30 is a flowchart illustrating the flow of processing subtitle data in a BD-ROM player.

FIG. 30 is a flowchart illustrating the flow of processing of subtitle data in the BD-ROM player. When playback of playlist playback is started at the BD-ROM player (S701), confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn, in accordance with the instruction (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment of the present disclosure will be described. The second embodiment relates to recording and playback of high-bitrate video information with a large-capacity optical disc such as a BD. Basically, this is based on the first embodiment, so expanded or different portions will be primarily described.

FIGS. 31A and 31B are diagrams for describing layouts of recording layers in large-capacity optical discs. Hereinafter, description will be made regarding a double-layer disc and triple-layer disc for a large-capacity optical disc (hereinafter referred to as "disc") with reference to FIGS. 31A and 31B.

A double-layer disc has the first (first layer) recording layer L0 at the side farther from the optical pickup, and the recording layer L1 that is the second layer on the closer side. Both recording layers have a circular recording region from the inner perimeter to the outer perimeter of the disc. In a case of reading data written to the disc at constant linear velocity (CLV), the closer toward the outer perimeter side of the disc from the inner perimeter side, the slower the rotation speed can be.

In a case of a triple-layer disc, an L2 layer which is a third recording layer is disposed closer to the optical pickup side than the L1. Large-capacity optical discs have increased recording density inside the recording layers, and have multiple recording layers, thereby realizing large capacity.

Figure 32A:
FIGS. 32A and 32B are diagrams, FIG. 32A illustrating logical addresses of a triple-layer disc, and FIG. 32B illustrating disc rotation speed corresponding to the logical addresses.
Figure 32B:
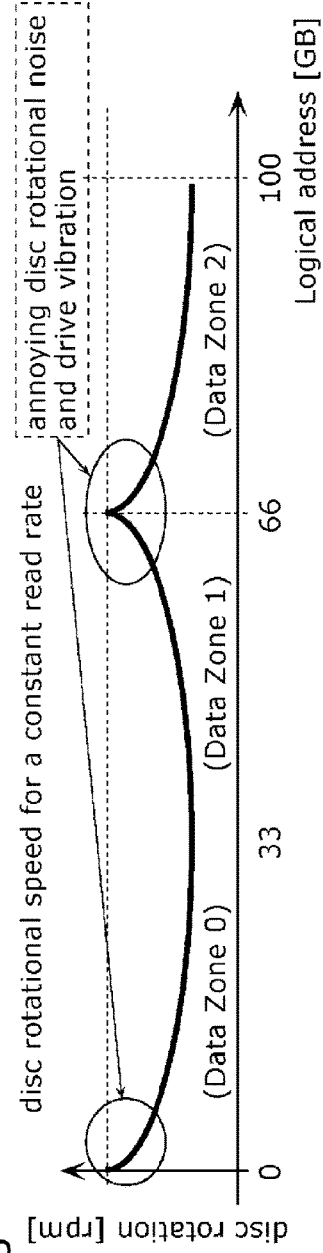

FIGS. 32A and 32B are diagrams, FIG. 32A illustrating logical addresses of a triple-layer disc, and FIG. 32B illustrating disc rotation speed corresponding to the logical addresses. Specifically, FIG. 32A is a diagram illustrating an example of the configuration of recording layers in a triple-layer disc, cut away in the radial direction. FIG. 32B is a diagram illustrating an example of rotational speed of a disc corresponding to logical addresses in the triple-layer disc.

Each recording layer is divided into three regions, so a triple-layer disc is made up of a total of nine recording regions. Each recording layer is configured with physical properties (recording capacity, etc.) of that layer described in a region called the Lead-in/Inner Zone, from the inner perimeter side as illustrated in FIGS. 32A and 32B, actual recorded information (video data and so forth) is recorded in a region called Data Zone, and a region called Outer Zone/Lead-out indicates the outer perimeter end of that layer.

The Data Zone that extends over the range of 24 mm, which is the distance from the center of the disc in the radial direction, to 58 mm, has logical addresses continuously assigned from the inner perimeter of the L0 layer in the direction toward the outer perimeter, next from the outer perimeter of the L1 layer toward the inner perimeter, and then from the inner perimeter of the L2 layer toward the outer perimeter, as illustrated in FIG. 32A. Physical addresses and logical addresses are correlated one on one, and stipulated so that which physical address a logical address is equivalent to can be easily found.

Now, in a case of recording the entirety of a fixed bitrate stream in this logical address space (which is as much as 100 GB in the case of a BD triple-layer disc, for example) by constant linear velocity (CLV format), when data is to be read in that has been recorded at logical addresses physically near the innermost perimeter (the two locations of 0 GB and 66 GB), the rotation speed of the disc is faster, as illustrated in FIG. 32B. Faster rotation speed of the disc causes loud wind noise by the rotation of the disc to occur, and the disk drive itself to vibrate due to the center of gravity of the disc being off-center, causing noise. If the disc is for watching a movie such as on a BD, this phenomenon drastically deteriorates the quality of the video viewing experience due to the abnormal noise from the drive, particularly in cases of playing quiet scenes. This can be reduced by covering the drive itself with a metal box, or making the drive heavier to prevent sympathetic vibration, but either of these is a trade-off with increased costs.

It is a major problem that playing a video stream with a high bitrate like 4K to provide high-quality video viewing experience results in bothersome noise generated at the drive while playing. A method for data layout on the disc to solve this problem will be described below.

Figure 33A:
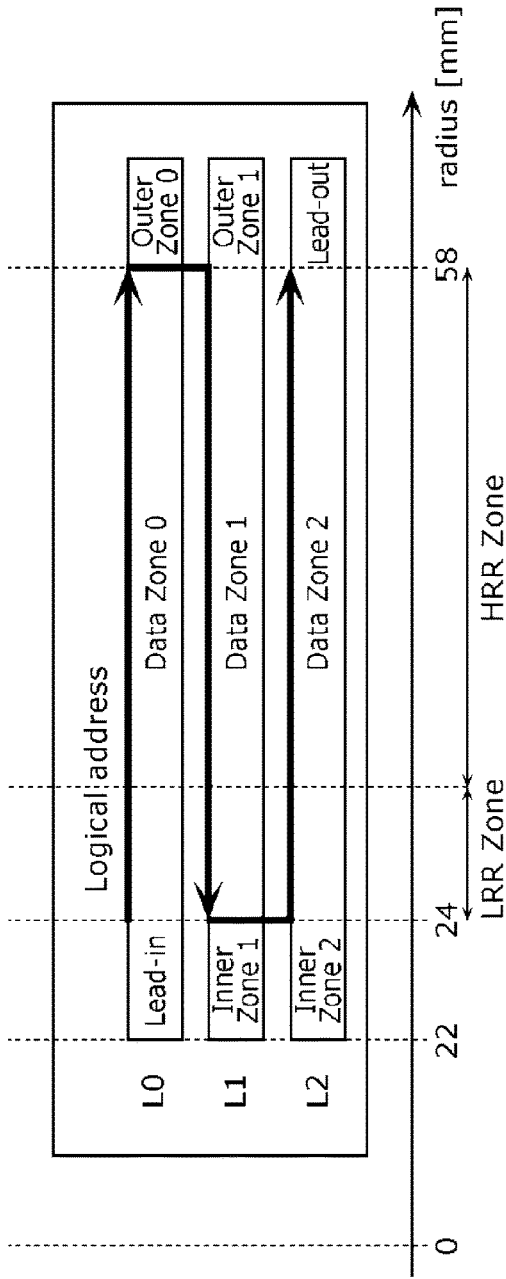
FIGS. 33A and 33B are diagrams for describing an example of a system of reading by switching the read rate from the disc.
Figure 33B:
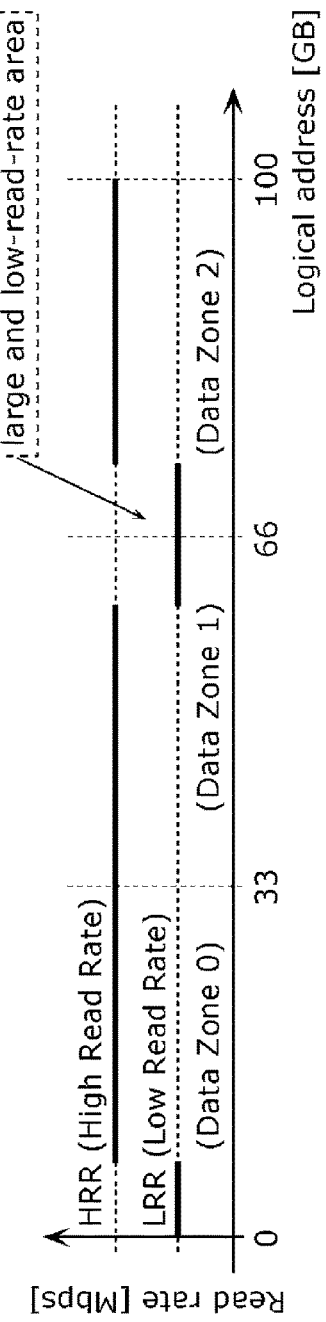

FIGS. 33A and 33B are diagrams for describing an example of a reading method where the reading rate from a disc is switched. Specifically, FIG. 33A is a diagram illustrating an example of the configuration of recording layers in a triple-layer disc, cut away in the radial direction, in a case where the reading rate is switched in playing. FIG. 33B is a diagram illustrating an example of the maximum reading rate corresponding to the logical addresses on a triple-layer disc in a case where the maximum reading rate is switched in playing. That is to say, FIG. 33B is a diagram illustrating how the maximum reading rate of the drive changes with regard to logical addresses.

A method can be conceived where two different read rates are set for the read rate from the disc, in accordance with the radial distance (or the maximum rotation speed of the disc), as illustrated in FIG. 33A. Logical addresses are assigned in the same way as in FIG. 32A. The maximum read rate of the drive region at the inner perimeter side of the Data Zone, recorded as an LRR (Low Read Rate) Zone, is denoted by LRR, and the maximum read rate of the drive region at the outer perimeter side of the Data Zone, described as an HRR (High Read Rate) Zone, is denoted by HRR. Note that HRR is a faster read rate than LRR.

As illustrated in FIGS. 33A and 33B, first there is an LRR region where the read rate is low in the LRR Zone of the L0 layer, and an HRR region where the read rate is high continues at the HRR Zone of the L0 layer and the HRR Zone of the L1 layer. Thereafter, an LRR region where the read rate is low continues at the LRR Zone of the L1 layer and the LRR Zone of the L2 layer. Finally, there is an HRR region where the read rate is high in the HRR Zone of the L2 layer.

There has been a problem in packaged distribution of movies, in that the maximum read rate of the drive drops around the 66 GB part of the disc in which the movie has been recorded, so the stream situated around the 66 GB part of the disc has to be encoded at a higher compression rate (lower bitrate) than other parts, making quality management difficult. Also, what part of the feature video would be permissible to be portions required to have encoding at a higher compression rate than other parts has to be predicted beforehand. This necessitates multiple encoding processes, resulting in much labor time and high costs for producing a disc. That is to say, the system where the rotation speed when reading in the inner perimeter side of the disc is reduced by providing the maximum reading rate from the disc simply in accordance with the radial direction of the disc causes other problems, and is not a realistic solution.

Next, a logical address setting method for solving this problem will be described with reference to FIGS. 34A and 34B. FIGS. 34A and 34B are diagrams for describing another example of a method where reading is performed while switching the reading rate from the disc. Specifically, FIG. 34A is a diagram illustrating another example of the configuration of recording layers in a triple-layer disc, cut away in the radial direction, in a case where the reading rate is switched in playing. FIG. 34B is a diagram illustrating another example of the maximum reading rate corresponding to the logical addresses on a triple-layer disc in a case where the maximum reading rate is switched in playing. That is to say, FIG. 34B is a diagram illustrating how the maximum reading rate of the drive changes with regard to logical addresses.

In the example illustrated in FIGS. 34A and 34B, the mapping of logical addresses is decided so that first, all LRR zones situated on the inner perimeter side of the multiple layers on the disc are connected, and thereafter all HRR zones situated on the outer perimeter side of the multiple layers are connected, in order to prevent the read rate from changing several times in accordance with the logical addresses. The mapping pattern information of logical addresses, the data size of the LRR Zone (number of sectors is SL), and the data size of the HRR Zone (number of sectors is SH), are each described in the Lead-in/Inner Zone. Accordingly, the drive can instantly recognize what sort of logical address layout pattern the information recorded in the disc has, and what reading rate should be used for reading, by reading in this information.

It can be seen from FIGS. 34A and 34B that first laying out just the LRR Zone in logical addresses enables just the HRR zone to be used to the end once the HRR zone is entered. Accordingly, laying out the feature video in just the HRR Zone as in the example in FIGS. 34A and 34B enables an efficient title production workflow the same as heretofore, under uniform encoding conditions.

The size of the LRR Zone and HRR Zone can be changed by registration values at the Lead-in/Inner Zone. Alternatively, multiple mapping patterns of logical addresses may be prepared, and identified by ID. For example, the logical address mapping pattern illustrated in FIGS. 33A and 33B may be stipulated as No. 1 and the logical address mapping pattern illustrated in FIGS. 34A and 34B as No. 2, and the No. of the mapping pattern recorded in the Lead-in/Inner Zone, thereby enabling the drive to recognize which mapping pattern is recorded in the disc.

Figure 35:
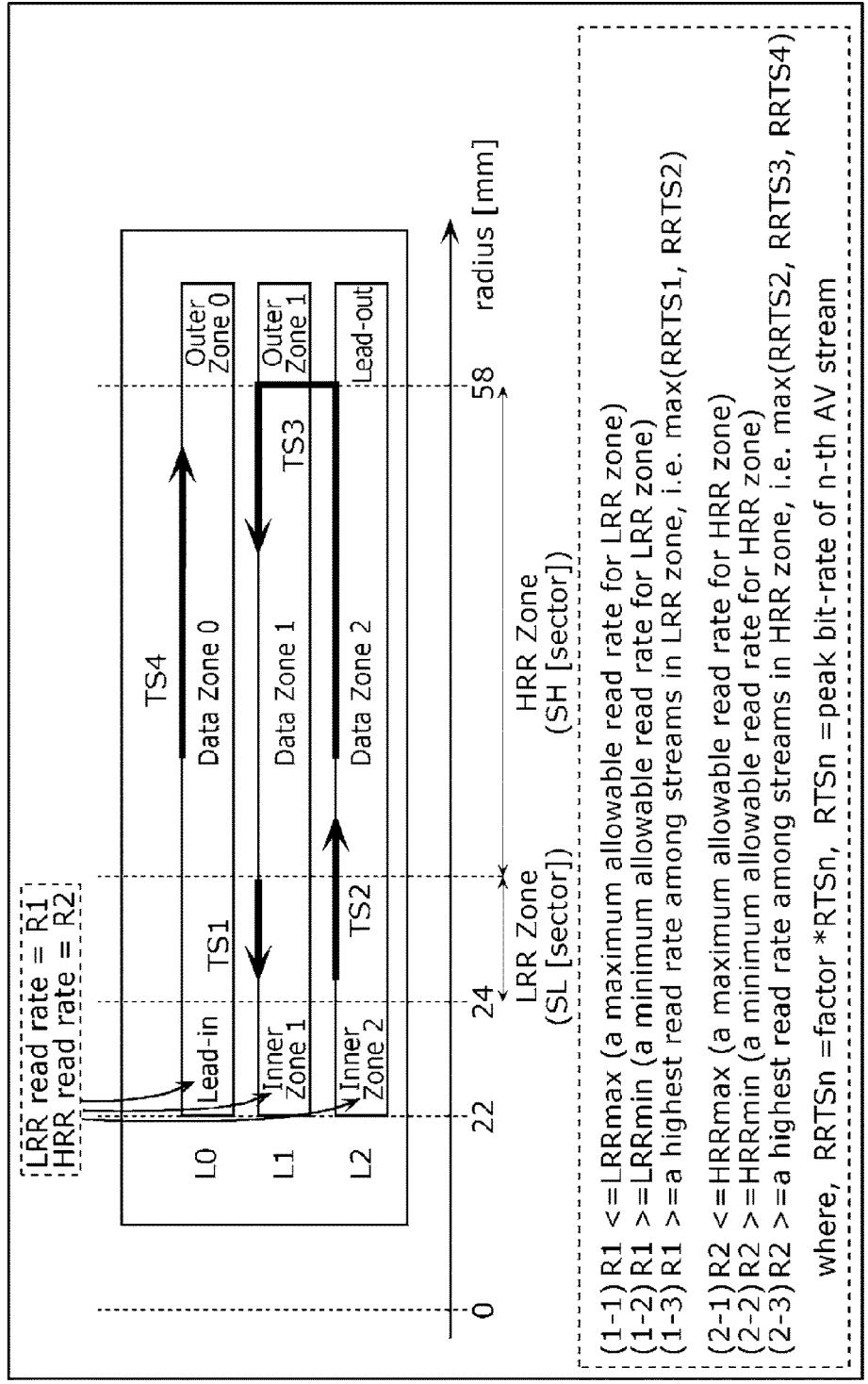
FIG. 35 is a diagram illustrating the relationship between the maximum read rate from the disc and stream rate.

FIG. 35 is a diagram illustrating the relationship between the maximum reading rate from the disc and the stream rate. Although FIG. 35 does not state the mapping pattern of logical addresses, this may be the pattern illustrated in FIGS. 33A and 33B, the pattern illustrated in FIGS. 34A and 34B, or another layout pattern.

With R1 denoting the maximum recording rate in the LRR Zone (the lowest read rate to which the drive should handle), R1 preferably satisfies the following conditions.

(1-1) R1 is the maximum reading rate stipulated for the LRR Zone or lower.

(1-2) R1 is the minimum reading rate stipulated for the LRR Zone or higher.

(1-3) R1 is the rate (RRTSn) necessary to read in, of the streams in the LRR zone (TS1 and TS2 in FIG. 35), the stream having the highest peak rate (RTSn), or higher.

Further, R1 may be stipulated as the smallest rate satisfying the conditions (1-1), (1-2), and (1-3) above, to reduce the necessary rotation speed of the disc as much as possible.

The "factor" in the RRTSn expression is a system margin factor necessary to take into consideration jumping or the like in seamless connection. In the case of BD for example, 54/48 (=1.125) is employed. Note that a seamless connection is a connection where, of a stream made up of multiple VOB sets, temporally continuous playback is enabled for two of the multiple VOBs making up the stream. Jumping is an operation where the reading operation of the optical pickup of the drive is temporarily stopped, and the pickup is moved to the next position to be read during that time. That is to say, a jump in a seamless connection is an operation where, if there are a first VOB and a second VOB that should be played in a temporally continuous manner, after reading the first VOB to the end, the read operation is temporarily stopped, the optical pickup is moved to the position where the second VOB is recorded, and the reading of the second VOB is started.

Also, RTSn that indicates the peak bitrate of each stream may be the peak bitrate of the entire stream described in the management information file corresponding to the stream, for each of the streams in the SysRate in FIG. 13, or may be the peak bitrate at partial regions of streams included in each of the LRR Zone and HRR Zone.

In the case of BD, a 4-byte timestamp is provided every 188-byte TS packet, so the peak bitrate for an MPEG-2 TS is a value obtained by multiplying RTSn by 188/192 times.

In the same way, with R2 denoting the maximum recording rate in the HRR Zone (the lowest read rate to which the drive should handle), R2 preferably satisfies the following conditions.

(2-1) R2 is the maximum reading rate stipulated for the HRR Zone or lower.

(2-2) R2 is the minimum reading rate stipulated for the HRR Zone or higher.

(2-3) R2 is the rate (RRTSn) necessary to read in, of the streams in the HRR zone (TS2, TS3, and TS4) in FIG. 35, the stream having the highest peak rate (RTSn), or higher.

Further, R2 may be stipulated as the smallest rate satisfying the conditions (2-1), (2-2), and (2-3) above, to reduce the necessary rotation speed of the disc as much as possible.

In the example in FIG. 35, the TS2 stream is situated straddling the LRR Zone to the HRR Zone. A stream straddling two zones with different reading rates in this way can be subjected to conditions where the R1 conditions and the R2 conditions are combined, as in the aforementioned (1-3) and (2-3).

The values for R1 and R2 obtained in this way are recorded in the Lead-in/Inner Zone as minimum read rates necessary for the drive to read the streams recorded in the LRR Zone and HRR Zone, respectively. Accordingly, the drive reads in the recorded R1 and R2 values, which can be used for drive control to suppress to the necessary rotations.

Figure 36:
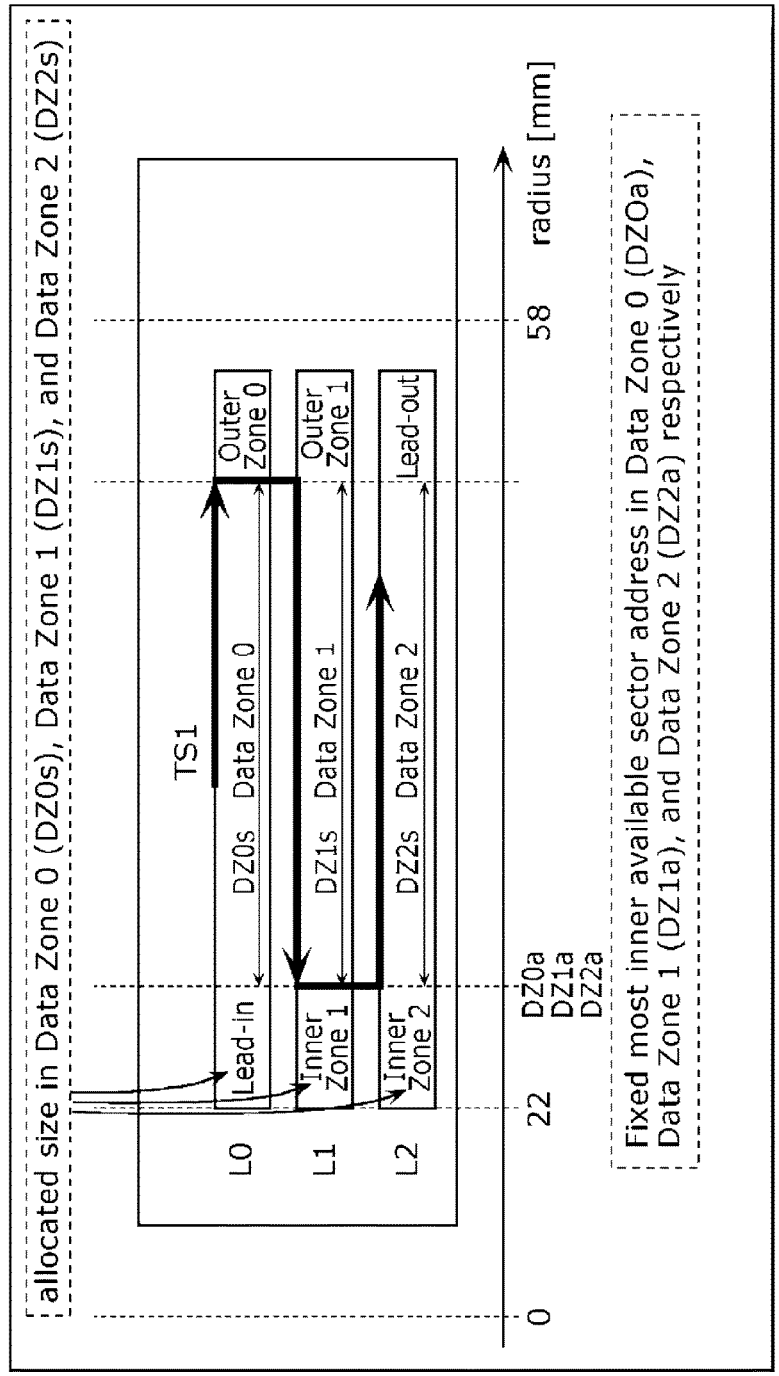
FIG. 36 is a diagram for describing conventional assignment location of user data regions.

FIG. 36 is a diagram for describing a conventional usage method of user data regions. The Data Zones in the L0 layer, L1 layer, and L2 layer respectively use DZ0s, DZ1s, and DZ2s sectors (or clusters) from DZ0a, DZ1a, and DZ2a addresses (addresses of sectors or clusters) at the innermost perimeter, as illustrated in FIG. 36. The DZ0a, DZ1a, and DZ2a addresses are addresses on the innermost perimeter within the Data Zone, adjacent to the Lead-in/Inner Zone. The reason why recording is started from the inner perimeter and recording is completed with a read-out at the point of completing recording of data in this way is to make the time for writing to recording media such as BD-R and BD-RE more efficient. However, this is an undesirable layout from the perspective of how low the rotation speed for reading a high bitrate stream can be made, which is the problem to be solved by the present disclosure, since recorded data is concentrated on the inner perimeter side.

Figure 37:
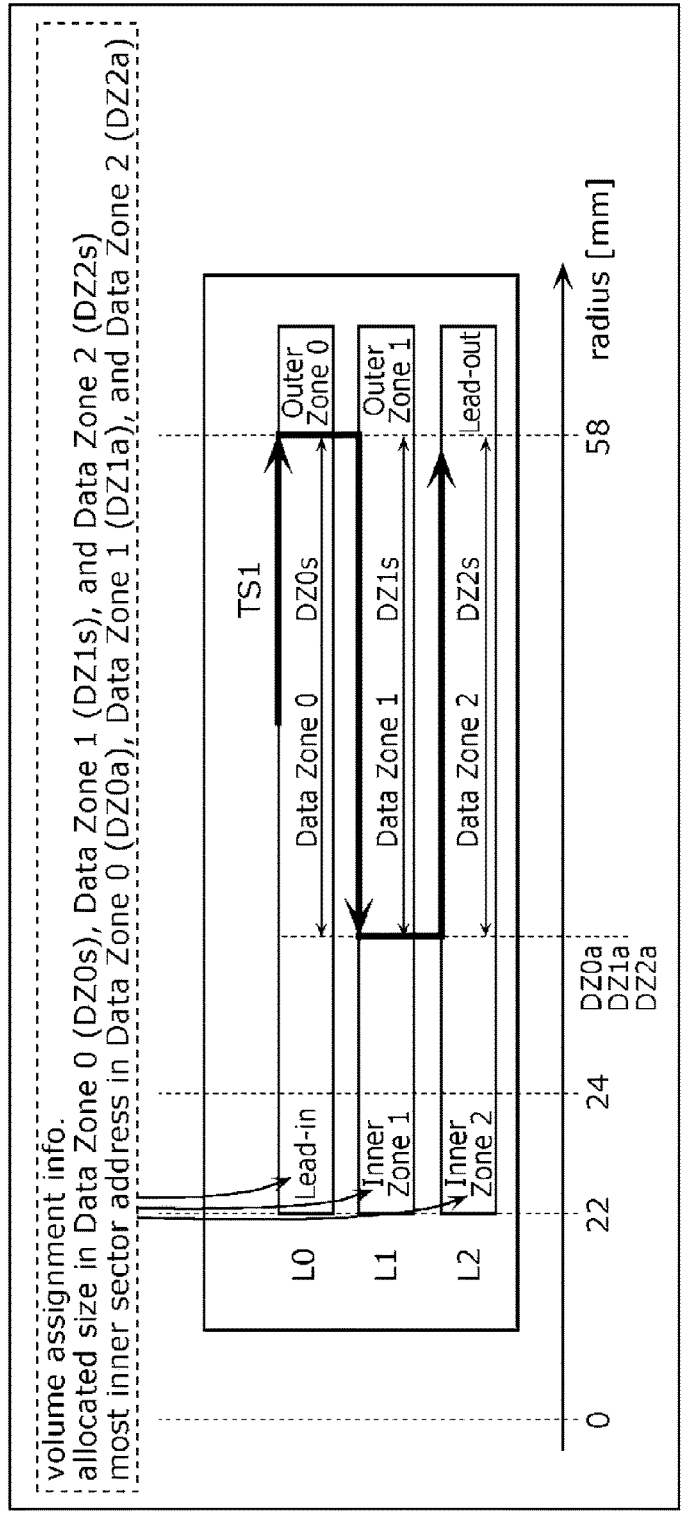
FIG. 37 is a diagram for describing assignment location of user data regions according to the present disclosure.

FIG. 37 is a diagram for describing a new usage method of user data regions. The Data Zones in the L0 layer, L1 layer, and L2 layer respectively use DZ0s, DZ1s, and DZ2s sectors (or clusters) from DZ0a, DZ1a, and DZ2a addresses (addresses of sectors or clusters) at the innermost perimeter, as illustrated in FIG. 37. The DZ0a, DZ1a, and DZ2a addresses do not have to be adjacent to the Lead-in/Inner zone in FIG. 37, and the stream is adjusted to be situated on the outer perimeter side of the disc, so that the rotation speed for reading a high bitrate stream can be made as slow as possible. In order to recognize the usage form of such user data regions, recorded in the Lead-in/Inner Zone are configuration information of the recording regions of the disc, recording start addresses (DZ0a, DZ1a, and DZ2a) of each recording layer, recording end addresses, recordable sizes (DZ0s, DZ1s, and DZ2s), and so forth.

Figure 38:
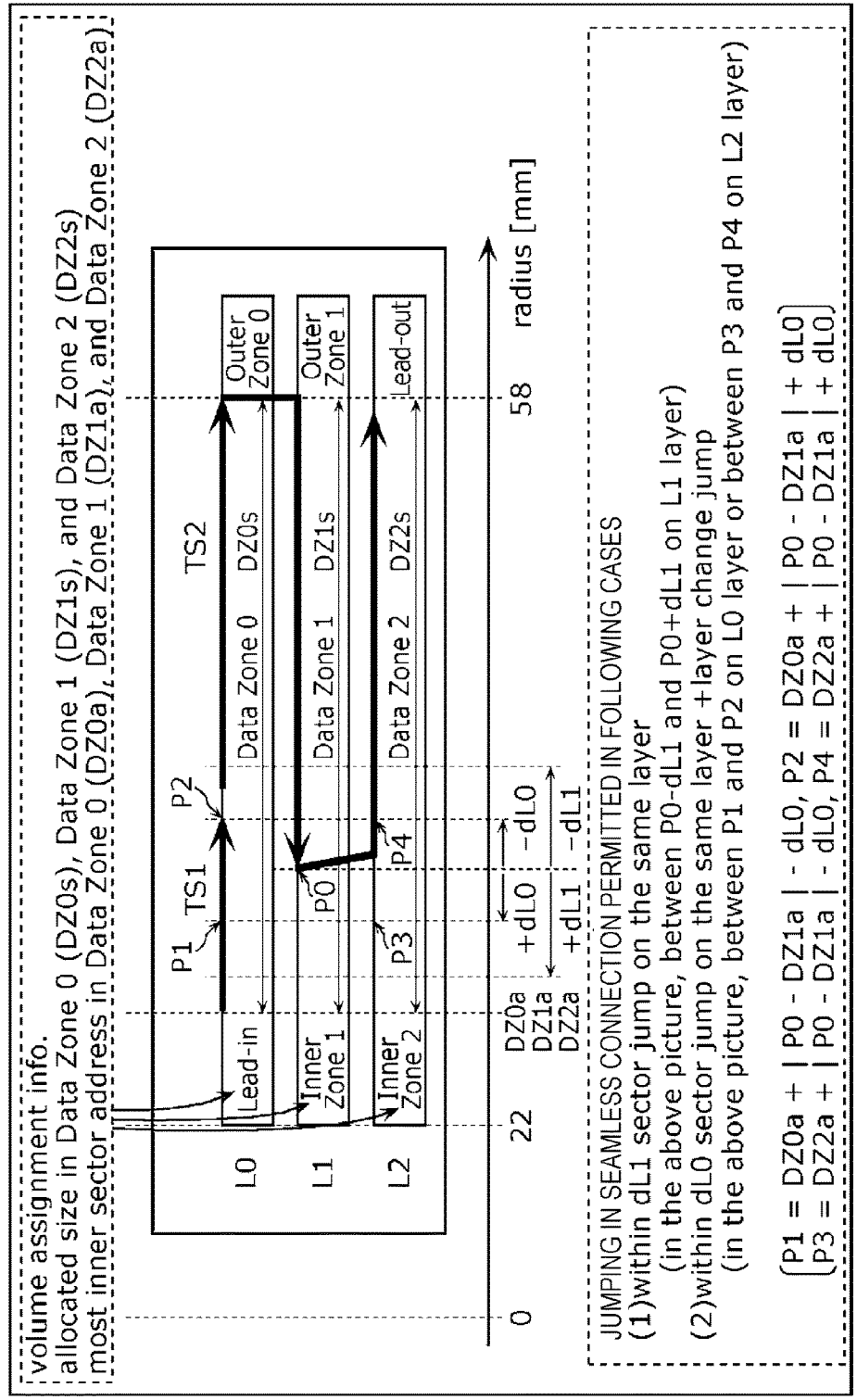
FIG. 38 is a diagram for describing jumping in seamless connection according to the present disclosure.

FIG. 38 is a diagram for describing jumping in seamless connection. Specifically, FIG. 38 is a diagram for describing the relationship between the seek distance of the optical pickup of the drive at the time of performing seamless connection within the same recording layer, and the seek distance at the time of performing seamless connection involving switching recording layers.

Jump rules need to be stipulated to enable continuous playback even if branching in multiple angles while playing the video or switching between recording layers or the like occurring. Time during jumping is time when data reading cannot be performed, so the bitstream consumed during that time needs to be buffered beforehand. Accordingly, the size of memory for buffering and so forth cannot be designed in the player unless there is an assumption of a predetermined maximum jump time (and maximum bitrate of the stream).

Jumping in seamless connection is permitted in cases such as indicated by (1) and (2) in FIG. 38. Specifically, stipulation is made in (1) in FIG. 38 that jumping in seamless connection within the same recording layer is permitted to a sector within ±dL1 sectors in the radial direction from the position of the sector where the jump is started. Stipulation is made in (2) in FIG. 38 that jumping in seamless connection to a different recording layer is permitted to a position indicated by radial distance (P0±dL0) in a sector within ±dL0 sectors in the radial direction from the position of the sector where the jump is started, which is a position in a sector in the adjacent recording layer (any one of P1, P2, P3, and P4).

The physical address and Logical address are correlated in a one on one manner as described above, so once the jump start address P0 on the L1 layer is determined, the logical/physical addresses of positions P1 and P2 on the L0 layer and positions P3 and P4 on the L2 layer can be uniquely found as shown in the following (Expression 3)

$$\begin{cases} P1 = DZ0a + ABS(P0 - DZ1a) - dL0 \\ P2 = DZ0a + ABS(P0 - DZ1a) + dL0 \\ P3 = DZ2a + ABS(P0 - DZ1a) - dL0 \\ P4 = DZ2a + ABS(P0 - DZ1a) + dL0 \end{cases} \quad \text{(Expression 3)}$$

where ABS( ) is a function that returns an absolute value of the computation results.

When considering the fact that jumping to change to a different recording layer in a seamless connection (layer jumping) normally takes 100 msec, the number of sectors that can be jumped in seamless connection within the same recording layer (the number of sectors arrayed in the radial direction) can be increased by an equivalent amount. Accordingly, the relationship of dL1>dL0 in the example in FIG. 38 holds.

That is to say, in the BD (recording medium) in this case, part of the video stream (TS2) is recorded up to a first recording position (P0) on a first recording layer (L1 layer) of the multiple recording layers, and a remaining part of the video stream is recorded from a second recording position (a position somewhat returning toward the center direction of the disc from P4 in FIG. 38) of a second recording layer (L2 layer) adjacent to the first recording layer (L1 layer). This video stream (TS2) is seamlessly connected between the first recording position (P0) and the second recording position (a position somewhat returning toward the center direction of the disc from P4). A first maximum distance (dL0) between the first recording position (P0) and the second recording position (a position somewhat returning toward the center direction of the disc from P4) in the radial direction of the BD is smaller than a second maximum distance (dL1) in the radial direction regarding which a jump is permitted in seamless connection within a same recording layer. Also, the first recording position (P0) is in a region, of recording regions of the BD, that is on an outer side of an innermost perimeter of a Data Zone by a predetermined sector (dL0) or more.

The BD illustrated in FIG. 38 has three layers of recording layers, in which the first recording (L1 layer) layer where the first recording position (P0) exists is a second layer recording layer of the three layers of recording layers, the second recording layer (L2 layer) where the second recording position (a position somewhat returning toward the center direction of the disc from P4) exists is a third layer recording layer of the three layers of recording layers.

The video stream (TS2) in FIG. 38 is recorded from an inner perimeter side toward the outer perimeter side in a first layer recording layer (L0 layer) of the three layers of recording layers, recorded from the outer perimeter side toward the inner perimeter side in the second layer recording layer (L1 layer) of the three layers of recording layers, and recorded from the inner perimeter side toward the outer perimeter side in the third layer recording layer (L2 layer) of the three layers of recording layers.

The video stream (TS2) in FIG. 38 is recorded in regions situated on the outer side in the radial direction excluding an innermost perimeter region of the Data Zone in the first layer recording layer (L0 layer), second layer recording layer (L1 layer), and the third layer recording layer (L2 layer).

In this way, a high-bitrate video stream (TS2) is recorded by being connected to a different recording layer at positions at a larger radial distance than DZ0a, DZ1a, DZ2a, and so forth (P0 in FIG. 38), thereby avoiding the high-bitrate stream from being situated at the inner perimeter portion of the disc, and the rotation speed of the disc can be reduced. In this drawing, the video stream (TS2) jumps an extremely large number of sectors in terms of logical address space, but the overall jump time is reduced by suppressing the seek distance in the radial direction when performing layer jumping as illustrated, so the buffer amount can be reduced, which greatly benefits playback device and drive design and development. The drive can read also the disc at a lower rotation speed, so noise generated from the drive can be reduced. Accordingly, the user can have a viewing experience of high-bitrate high-quality video without being troubled by drive noise.

Although the mapping pattern of logical addresses has been described in FIG. 38 assuming the mapping pattern in FIGS. 33A and 33B, this is not restrictive. That is to say, even when the mapping pattern in FIGS. 34A and 34B or other mapping patterns are used, jumping is necessary for seamless connecting, so good seamless connection can be realized in mapping patterns other than the mapping pattern in FIGS. 33A and 33B as well, by providing the same stipulations as those in FIG. 38.

In a case where seamless connection can be efficiently made to a different recording layer as well, as introduced in FIG. 38, the high-bitrate stream may be recorded at a recording region equal to or farther than the predetermined radial distance in accordance with the peak bitrate (RTSn) thereof. The radial distance can be specified by physical address, or logical address in the case where the mapping pattern of logical addresses is known, at each recording layer.

This may be realized as a playback device or a playback method to play the video stream recorded in the BD described above. In this case, the playback device includes a reading unit that reads out a video stream recorded in a disc-shaped recording medium, and a playback unit that plays the video stream that has been read out. The reading unit jumps from the first recording position in the first recording layer to the second recording position in the second recording layer and reads out the video stream. The playback unit seamlessly plays the video stream recorded in the multiple recording layers.

The playback method reads out a video stream recorded in a disc-shaped recording medium, and plays the video stream that has been read out. In the reading, a jump is performed from the first recording position in the first recording layer to the second recording position in the second recording layer and the video stream is read out. In the playing, the video stream recorded in the multiple recording layers is seamlessly played.

Third Embodiment

Next, a third embodiment of the present disclosure will be described. The third embodiment is content relating to the recording format of information to the recording medium having two regions described in the second embodiment where reading is performed at different read rates from each other, in accordance with file attributes. This basically is based on the first and second embodiments, so description will be primarily made regarding extended or different portions.

Figure 39:
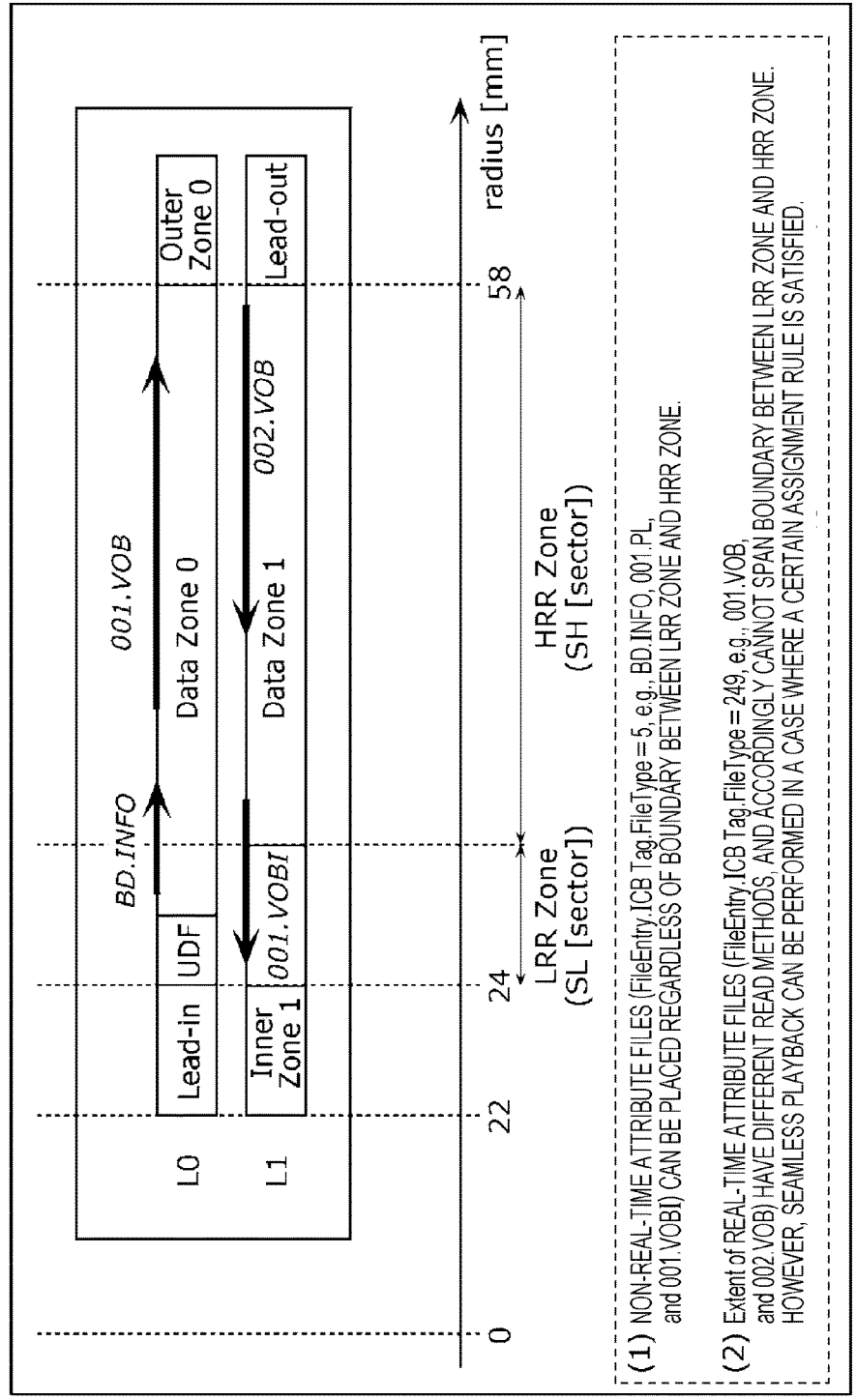
FIG. 39 is a diagram for describing file placement in accordance with file attributes according to the present disclosure.

FIG. 39 is a diagram illustrating a file placement format in a disc where read rates differ by recording region in the radial direction of the disc. A double-layer disc is assumed here, where in the same way as in the second embodiment, the LRR Zone is a first recording region of a low read rate provided at the first half of the L0 layer and second half of the L1 layer, and the HRR Zone is a second recording region of a high read rate, provided at the second half of the L0 layer and first half of the L1 layer. That is to say, the recording region of the recording medium jas the first recording region read at a first read rate and a second recording region read at a second read rate that is faster than the first read rate. Accordingly, the recording medium has different rotational speeds and read methods between the first recording region and the second recording region when reading. For example, reading is performed in the first recording region at a constant angular speed, and reading is performed in the second recording region at a constant linear speed.

In a case of continuously reading from a recording region with a low read rate (LRR Zone) to a recording region with a high read rate (HRR Zone), drive control processing where the rotation speed of the disc is instantaneously changed, and also the output intensity of the laser is raised, needs to be performed at the instant that the recording region changes. However, such drive control processing requires time in the order of hundreds of milliseconds, and is not the sort of processing that can be performed at the same time while reading a digital stream recorded in the disc. There also is a problem that using a motor capable of handling high torque, that can withstand the driving processing where the rotational speed of the disc is instantaneously changed, will raise the implementation cost of the drive device.

Accordingly, it is conceived here to separate into files that have real-time attributes where continuous reading needs to be maintained at a specified bitrate such as a digital stream file like 001.VOB, and files having non-real-time attributes that are management files such as BD.INFO and have no particular requisites regarding read time, and to perform recording management of these in recording regions with different read rates.

Whether a file has real-time attributes or not is specified by the file system. That is to say, data recorded in a disc includes a digital stream that has real-time attributes in the file system of the data. The data also includes data files having non-real-time attributes in the file system of the data. That is to say, the data recorded in the disc is classified into digital streams having real-time attributes and data files having non-real-time attributes in the file system of the data.

For example, in a case where the file system is Universal Disk format (UDF), if the value of the FileType field in the ICB Tag in the File Entry is 5, the file is a non-real-time attribute file, and if the value of this field is 249, the file is a real-time attribute file.

A file of which the FileType is 5 (non-real-time attributes, e.g., BD.INFO and 001.VOBI, etc., in FIG. 39) has no read rate conditions, and thus can be recorded regardless of recording regions with different read rates. That is to say, it is permitted for one of the data files having non-real-time attributes to be continuously recorded spanning the boundary of the LRR Zone and HRR Zone. Specifically, with data files, one file may be continuously recorded spanning the boundary of the LRR Zone and HRR Zone, or may be continuously recorded in just one of the LRR Zone or HRR Zone.

On the other hand, a file of which the FileType is 249 (real-time attributes, 001.VOB and 002.VOB, etc., in FIG. 39) is continuously recorded so as to not span recording regions with different read rates. That is to say, with regard to files having real-time attributes, no one file is recorded continuously spanning the boundary between the LRR Zone and HRR Zone.

Accordingly, the read rate of the digital stream can be fixed while playing the digital stream, without instantaneously changing the rotational speed of the disc at the boundary of recording regions and changing the output intensity of the laser, so particular implementation difficulties and increased costs can be avoided. However, in this case, the digital stream is recorded only in the HRR Zone in FIG. 39, so there remains a problem that the capacity of the disc is not 100% used. This problem will further be solved below.

Figure 40:
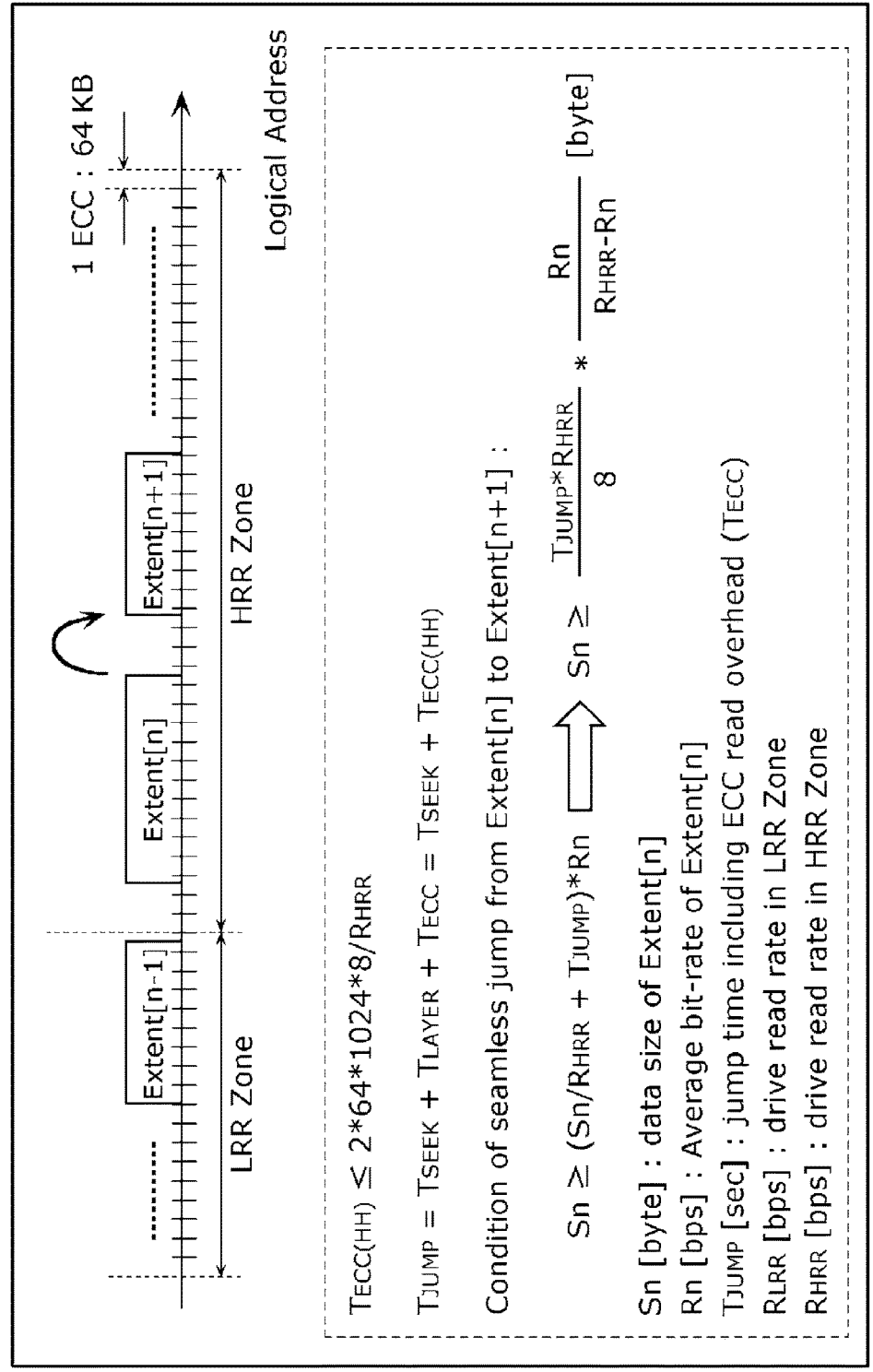
FIG. 40 is a diagram for describing jumping in seamless connection.

FIG. 40 is a diagram for describing a jump model in seamless connection in the HRR Zone of the disc. Note that hereinafter, a section where a digital stream has been recorded continuously on logical addresses of the disc will be referred to as an Extent.

A case will be considered in FIG. 40 where an Extent[n] indicating the n'th Extent is recorded in the HRR Zone, and playback is performed seamlessly (hereinafter referred to as "seamless playback") without interruption by jumping to Extent[n+1] indicating the n+1'th Extent also recorded in the HRR Zone. Such seamless playback can be performed by reading all of an ECC block including the final data of Extent[n] at a read rate R_HRR that is the read rate for reading data recorded in the HRR Zone, and jumping (seeking) to an ECC block including the start data of Extent [n+1], and it is sufficient for data already read into the buffer still remaining at the timing of starting to read Extent [n+1] at the R_HRR rate.

That is to say, processing is performed where the digital stream is read in and stored in the buffer while playing the digital stream, and the digital stream stored in the buffer is sequentially played. Accordingly, Extent[n+1] can be read in even if a jump is performed as long as all of the digital stream stored in the buffer has not been consumed by the processing of playing while jumping from Extent[n] to Extent[n+1], and seamless playback can be continuously performed since the digital stream stored in the buffer is never exhausted.

Now, reading from the Blu-ray disc is performed in ECC increments, one ECC being 64 KB. A worst-case scenario is a case where an ECC block that has been read in only contains 1 byte of actual data. More specifically, a case is conceivable where only 1 byte of the final data of Extent[n] is included in the final ECC block of Extent[n], and only 1 byte of start data of Extent[n+1] is included in the start ECC block of Extent[n+1]. That is to say, if these 1 bytes are disregarded (assumed to be 0 bytes), a time during which the digital stream cannot be read in due to the ECC-increment reading processing will conceivably occur, equal to an amount of time T_ECC(HH) indicated in the following Expression 4.

$$T\_ECC \le \frac{2*64*1024*8[bit]}{R\_HRR[bps]} \quad \text{(Expression 4)}$$

T_ECC(HH) is the amount of time relating to the read processing of the ECC in a case where a jump is performed in seamless connection in the HRR Zone. Furthermore, the total time that the digital stream cannot actually be read from the disc during the jump from Extent[n] to Extent[n+1], expressed as T_JUMP, is the sum of time relating to seek processing (T_SEEK), time relating to changing recording layers (T_LAYER), and the above-described time relating to read processing in ECC increments (T_ECC). Accordingly, T_JUMP can be calculated as indicated by Expression 5 below in the case in FIG. 40.

$$T\_JUMP = T\_SEEK + T\_ECC(HH) \quad \text{(Expression 5)}$$

Assuming that reading of the stream is started from Extent[n] at the read rate of R_HRR, that playback of the stream is started at the same time with reading, and that the average rate of the stream of Extent[n] is R_n and the data size of Extent[n] is S_n, the buffer will not be exhausted during the jump from Extent[n] to Extent[n+1] as long as the following Expression 6 is satisfied, and the digital stream can be played without interruption.

$$S\_n \geq (S\_n/R\_HRR + T\_JUMP) * R\_n \quad \text{(Expression 6)}$$

Reordering this Expression 6 by S_n yields the following Expression 7.

$$S\_n \geq \frac{T\_JUMP * R\_HRR}{8} * \frac{R\_n}{R\_HRR - R\_n} [\text{byte}] \quad \text{(Expression 7)}$$

It can be seen that a size S_n that satisfies this is necessary for Extent[n].

Figure 41:
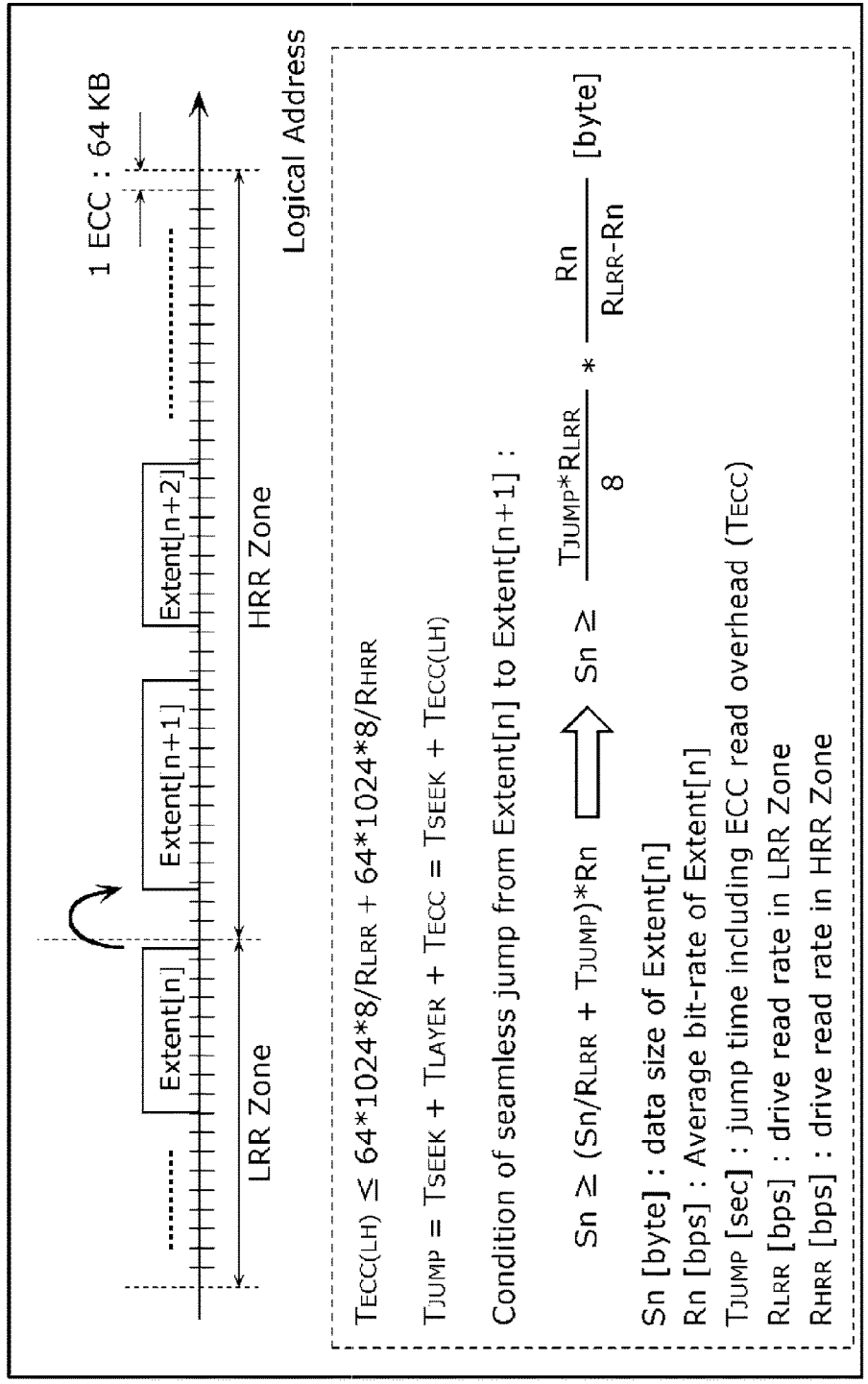
FIG. 41 is a diagram for describing file placement conditions for seamless connection.

FIG. 41 is a diagram for describing a jump model of a seamless connection from Extent[n] recorded in the LRR Zone of the disc to Extent[n+1] recorded in the HRR Zone. Note that the necessary T_ECC(LH) and S_n size are each expressed as in Expression 8, by performing calculation the same as in FIG. 40.

$$T\_ECC(LH) \leq (64 * 1024 * 8 / R\_LRR) + \quad \text{(Expression 8)}$$
$$(64 * 1024 * 8 / R\_HRR)[\text{sec.}]$$
$$S\_n \geq \frac{T\_JUMP * R\_LRR}{8} * \frac{R\_n}{R\_LRR - R\_n} [\text{byte}]$$

T_ECC(LH) is the amount of time taken for read processing of the ECC in a case where a jump is performed in seamless connection from the Extent[n] in the LRR Zone of the disc to Extent[n+1] in the HRR Zone.

Figure 42:
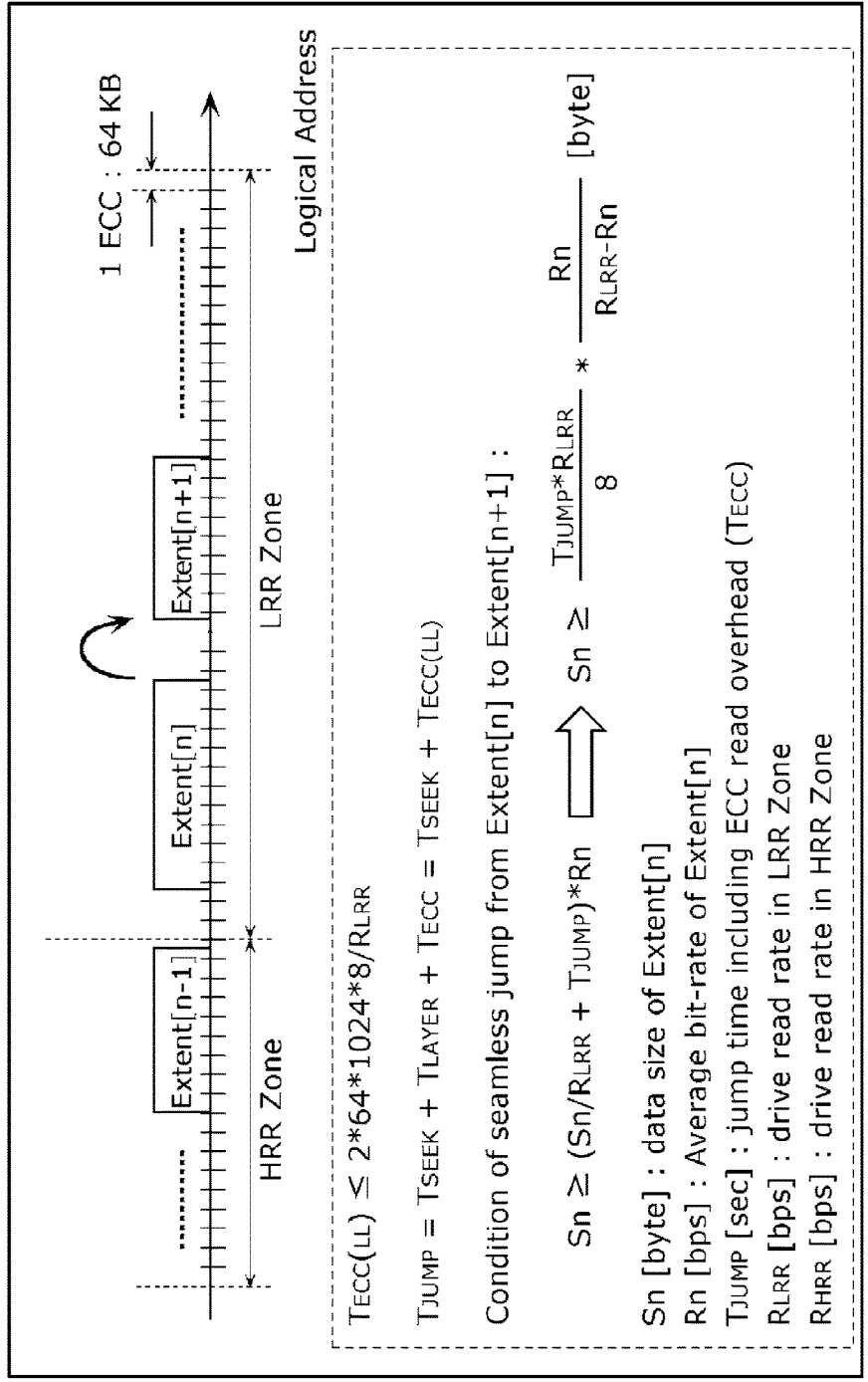
FIG. 42 is a diagram for describing file placement conditions for seamless connection.

FIG. 42 is a diagram for describing a jump model in seamless connection from Extent[n] recorded in the LRR Zone of the disc to Extent[n+1] recorded in the LRR Zone. Note that the necessary T_ECC(LL) and S_n size are each expressed as in Expression 9, by performing calculation the same as in FIG. 40.

$$T\_ECC(LL) \leq 2 * (64 * 1024 * 8 / R\_LRR)[\text{sec.}] \quad \text{(Expression 9)}$$
$$S\_n \geq \frac{T\_JUMP * R\_LRR}{8} * \frac{R\_n}{R\_LRR - R\_n} [\text{byte}]$$

T_ECC(LL) is the amount of time taken for read processing of the ECC in a case where a jump is performed in seamless connection in the LRR Zone.

Figure 43:
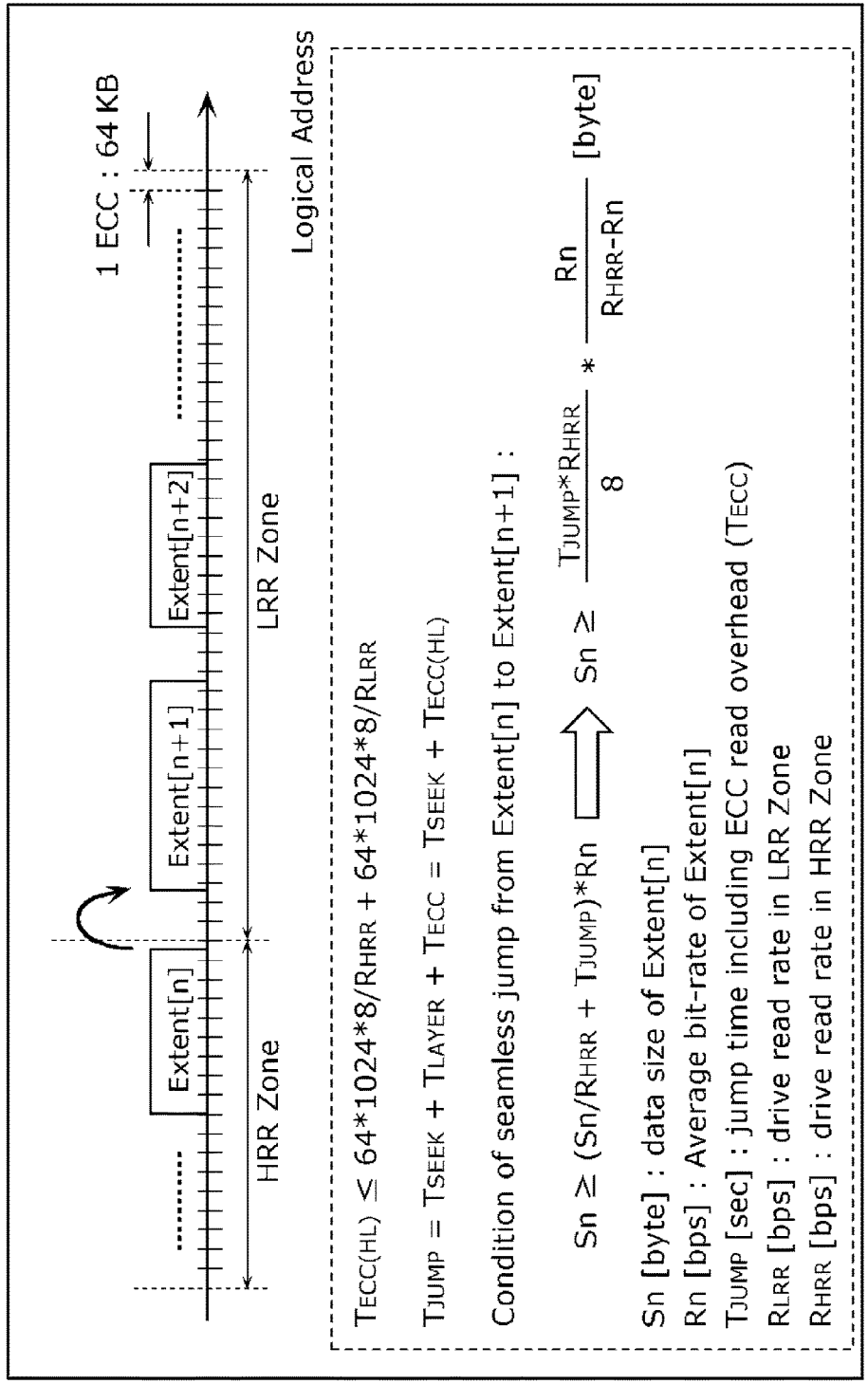
FIG. 43 is a diagram for describing file placement conditions for seamless connection.

FIG. 43 is a diagram for describing a jump model of a seamless connection from Extent[n] recorded in the HRR Zone of the disc to Extent[n+1] recorded in the LRR Zone. Note that the necessary T_ECC(HL) and S_n size are each expressed as in Expression 10, by performing calculation the same as in FIG. 40.

$$T\_ECC(HL) \leq (64 * 1024 * 8 / R\_HRR) + \quad \text{(Expression 10)}$$
$$(64 * 1024 * 8 / R\_LRR)[\text{sec.}]$$
$$S\_n \geq \frac{T\_JUMP * R\_HRR}{8} * \frac{R\_n}{R\_HRR - R\_n} [\text{byte}]$$

T_ECC(HL) is the amount of time taken for read processing of the ECC in a case where a jump is performed in seamless connection from the Extent[n] in the HRR Zone of the disc to Extent[n+1] in the LRR Zone.

Figure 44:
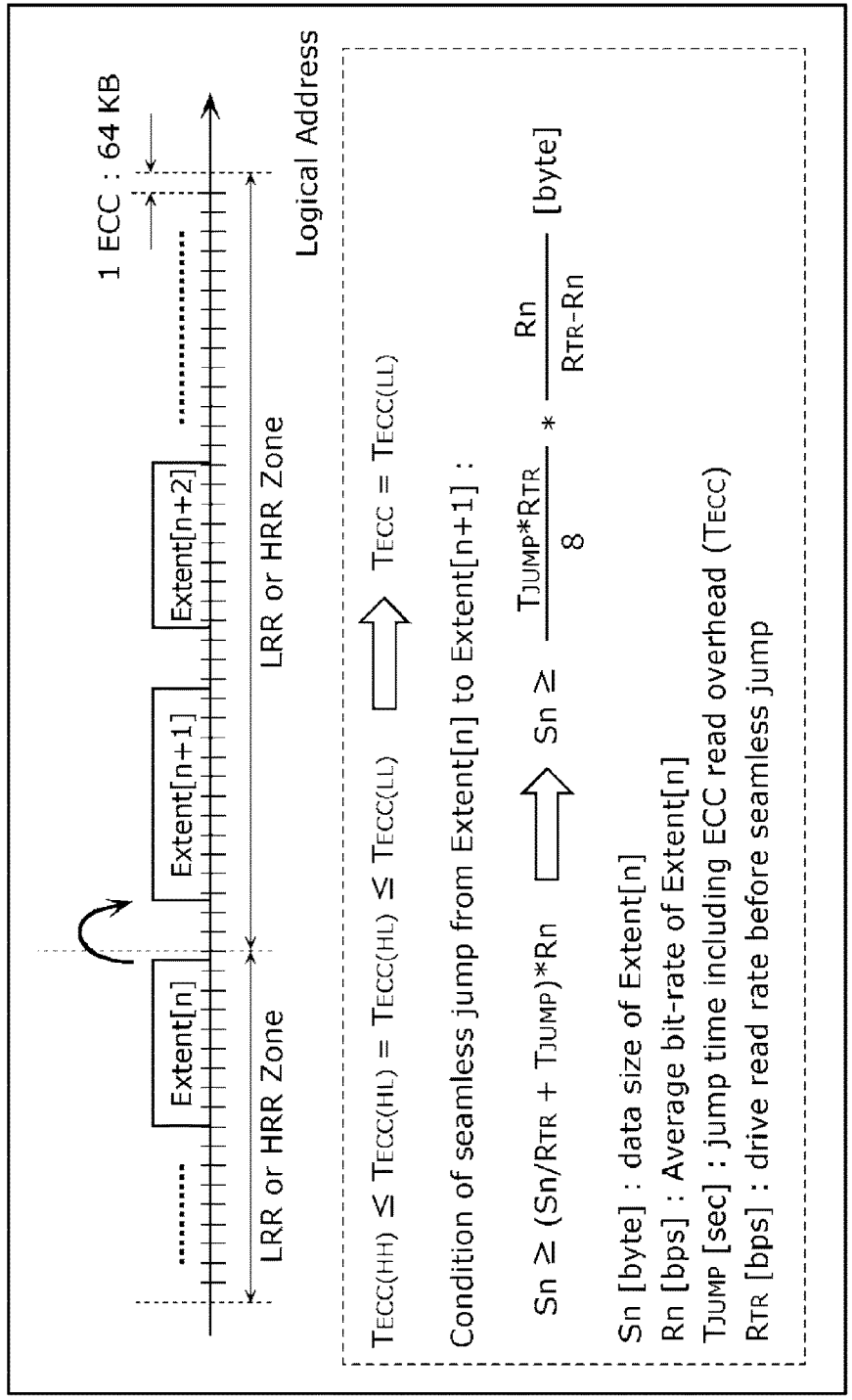
FIG. 44 is a diagram for describing file placement conditions for seamless connection.

FIG. 44 is a diagram for describing unifying conditions of the jump modes in seamless connection described from FIGS. 40 through 43. In the actual authoring task of placing a main feature movie in a disc, it is handier to use the same conditional expression if there is no significant difference among each of the conditions, rather than using different conditions in accordance with individual conditions as illustrated in FIGS. 40 through 43. T_ECC that is the processing time of an ECC block is a value with little real difference in the examples from FIGS. 40 through 43, and is a small time in comparison with T_SEEK and T_LAYER, so a worst-case scenario T_ECC(LL) can be applied to all cases. Thus, T_ECC can be calculated as one fixed value, so the model can be simplified. That is to say, T_ECC can be expressed as in Expression 11 in all cases.

$$T\_ECC = T\_ECC(LL) \text{ seconds} \quad \text{(Expression 11)}$$

Also, in a seamless jump from Extent[n] to Extent[n+1], calculation can be performed as in Expression 12 with the read rate of the recording region containing Extent[n] immediately prior to the seamless jump as R_TR.

$$S\_n \geq \frac{T\_JUMP * R\_TR}{8} * \frac{R\_n}{R\_TR - R\_n} [\text{byte}] \quad \text{(Expression 12)}$$

Figure 45:
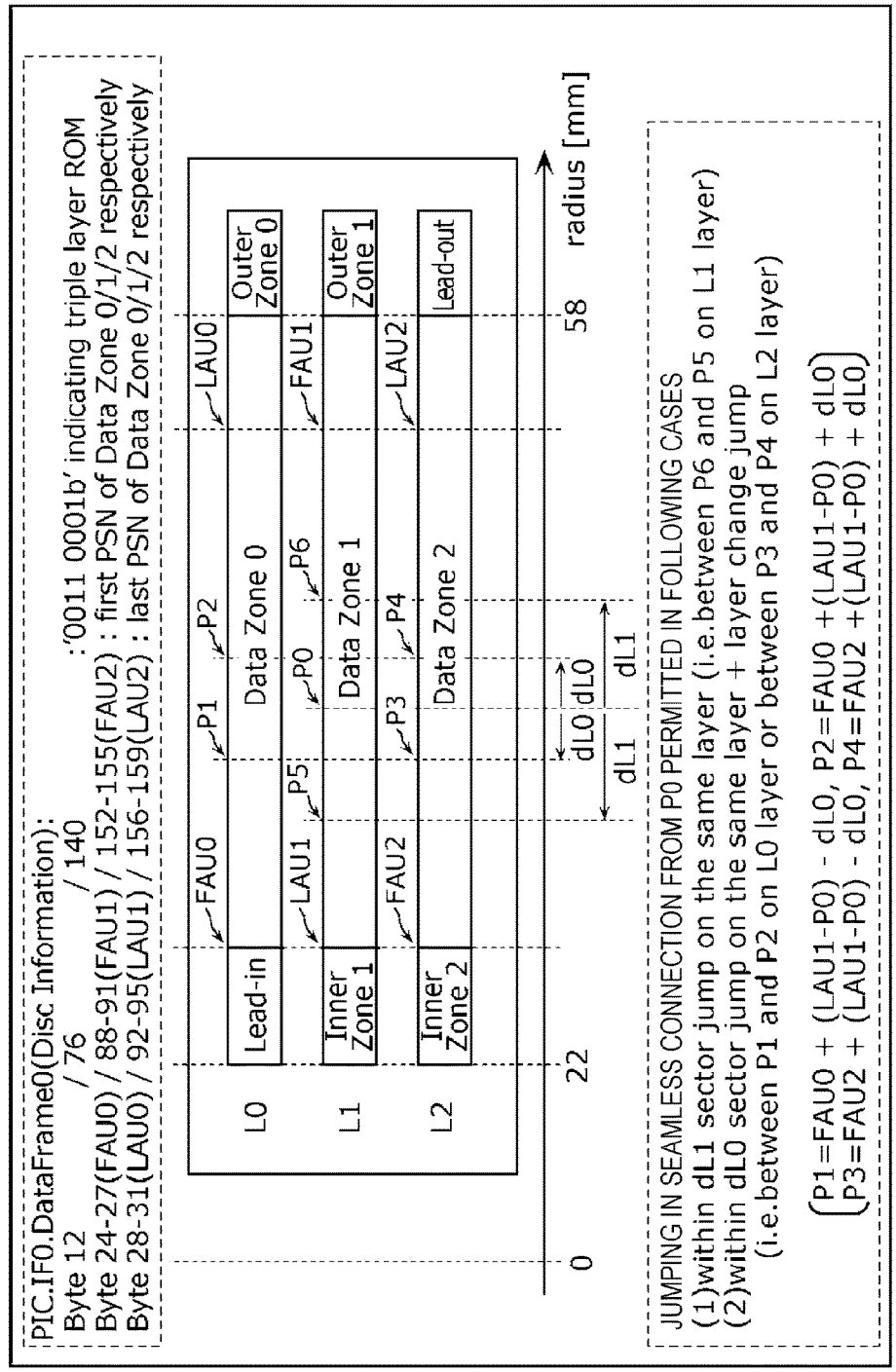
FIG. 45 is a diagram for describing a jump model in seamless connection according to the present disclosure.

FIG. 45 is a diagram for describing the relationship between disc information recorded in Lead-in/Inner Zone 1/Inner Zone 2, called Disc Information, and seamless jumping. In a case of a triple-layer disc, there is data storing disc information called PIC (Permanent Information and Control data), in the Lead-in/Inner Zone 1/Inner Zone 2 at the inner circumferential side of each recording layer. The PIC has five data storage regions called Info Fragments, with the Disc Information being stored in Data Frame 0, which is the start position of the first Info Fragment 0 (IF0).

Recorded in the Disc Information is information regarding the number of recording layers in the disc (information stored in the 12th byte, the 76th byte, and the 140th byte from the start of each of L0/L1/L2), information indicating that the recording layer is ROM (information stored in the 12th byte, the 76th byte, and the 140th byte from the start of each of L0/L1/L2), information indicating the first and last physical sector addresses (PSN: Physical Sector Number) of the valid recording regions of Data Zones of L0/L1/L2 (information stored in the 24th through 31st byte, the 88th through 95th byte, and the 152nd byte through 159th byte from the start of each of L0/L1/L2, using four bytes each), and so forth.

The physical addresses are disposed in order from the Lead-in to Outer Zone 0 of the L0 layer, then from the Outer Zone 1 to the Inner Zone 1 of the L1 layer, and then from the Inner Zone 2 to the Lead-out of the L2 layer. The logical addresses are disposed in order from the inner circumferential side of the Data Zone 0 (FAU0) to the outer circumferential side (LAU0), then from the outer circumferential side of the Data Zone 1 (FAU1) to the inner circumferential side (LAU1), and then from the inner circumferential side of the Data Zone 2 (FAU2) to the outer circumferential side (LAU2). Here, the start physical address of the user data in the L0 layer recorded and managed as Disc Information of the PIC is FAU0, the last physical address is LAU0, the start physical address of the user data in the L1 layer is FAU1, the last physical address is LAU1, the start physical address of the user data in the L2 layer is FAU2, and the last physical address is LAU2.

The range in which jumping in seamless connection from position P0 can be performed is the range indicated by the following (1) and (2).

(1) Seamless jumping within the same recording layer can be performed to a sector within ±dL1 sectors from position P0 in the radial direction (equivalent to range from P6 to P5 in FIG. 45).

(2) Seamless jumping to a different recording layer can be performed from position P0 the position of a sector in an adjacent recording layer at a position indicated by the same radial distance (P0±dL0) as a sector within ±dL0 sectors from position P0 in the radial direction (equivalent to range P1 to P2 of the L0 layer or range P3 to P4 of the L2 layer in FIG. 45).

Now, expressing the positions P1, P2, P3, P4, P5, and P6 in FIG. 45 using the above physical addresses, these can be uniquely yielded as in the following Expression 13.

$$\begin{cases} P1 = FAU0 + (LAU1 - P0) - dL0 \\ P2 = FAU0 + (LAU1 - P0) + dL0 \\ P3 = FAU2 + (LAU1 - P0) - dL0 \\ P4 = FAU2 + (LAU1 - P0) + dL0 \\ P5 = P0 + dL1 \\ P6 = P0 - dL1 \end{cases} \quad \text{(Expression 13)}$$

Although expression has been made here using the physical address information described in the Disc Information, the physical addresses and logical addresses are in a on-on-one fixed relationship as described above, so description can be made in the same way using logical addresses. Expressing the positions P1 through P6 expressed above as physical addresses using logical addresses, P1' through P6' that respectively correspond to P1 through P6 and are expressed using logical addresses are as in the following Expression 14 where the logical address of FAU0 is 0.

$$\begin{cases} P1' = (LAU1 - P0) - dL0 \\ P2' = (LAU1 - P0) + dL0 \\ P3' = (LAU0 + 1 - FAU0) + \left(\dfrac{LAU1 +}{1 - FAU1}\right) + (LAU1 + 1 - P0) - dL0 \\ P4' = (LAU0 + 1 - FAU0) + \left(\dfrac{LAU1 +}{1 - FAU1}\right) + (LAU1 + 1 - P0) + dL0 \\ P5' = (LAU0 + 1 - FAU0) + (P0 + 1 - FAU1) + dL1 \\ P6' = (LAU0 + 1 - FAU0) + (P0 + 1 - FAU1) - dL1 \end{cases} \quad \text{(Expression 14)}$$

FIGS. 46A and 46B are diagrams describing the relationship between the jump distance within the same recording layer (dL1) and seek time (T_SEEK) relating to this. FIG. 46A is a diagram describing the relationship between the jump distance indicated by the number of sectors, and the seek time relating thereto. FIG. 46B is a diagram describing the relationship between the jump distance indicated by stroke, and the seek time relating thereto.

Note that a full stroke (one stroke) is the distance of the optical pickup of the drive moving in the radial direction of the disc, from one of the innermost position of the Data Zone and outermost position, to the other.

The longer the jump distance is, the longer the seek time relating to it is, as illustrated in FIGS. 46A and 46B. For example, the seek time for jumping a radial distance equivalent to 3,000 sectors is 0.2 seconds, but the seek time for jumping a radial distance equivalent to 25,000 sectors is 0.6 seconds. In a case of switching recording layers, the layer jump time (T_LAYER, several 100 milliseconds) is further added to the T_JUMP illustrated in FIG. 44, so the actual jump distance that is (dL0/dL1 in FIG. 45) possible in seamless connection can be obtained from this T_JUMP time. For example, in a system having drive control capabilities of T_LAYER=0.4 seconds and T_ECC=0.01 seconds, and in a case where up to 0.8 seconds is permitted as T_JUMP for jumping in seamless connection, the maximum jump distance within the same recording layer (dL1) is found from the tables in FIGS. 46A and 46B to be $$T\_SEEK \leq T\_JUMP - T\_ECC = 0.8 - 0.01 = 0.79 \text{ seconds}$$

so dL1=50,000 sectors Is found from FIGS. 46A and 46B.

In the same way, the maximum jump distance to a different recording layer (dL0) is found to be $$T\_SEEK \leq T\_JUMP - T\_LAYER - T\_ECC = 0.8 - 0.4 - 0.01 = 0.39 \text{ seconds},$$

so dL0=10,000 sectors.

In this way, the seamless jump model in FIG. 38 can be expressed using the address information stipulated in the Disc Information. This may also be realized as playback device or playback method to play the video stream recorded in the BD described above. In this case, the playback device has a reading unit that reads data recorded in the recording medium, and a playback unit that plays the data that has been read. The reading unit reads the digital stream without changing the read rate. In the playback method, the data recorded in the recording medium is read, and the data that has been read is played. Reading of the digital stream is performed without changing the read rate.

Fourth Embodiment

Next, a fourth embodiment of the present disclosure will be described. The fourth embodiment is the recording medium having the high-bitrate video information recorded therein, that was described with the second embodiment and the third embodiment, having different regions where reading is performed at mutually different read rates, and relates to access to multiple files recorded in the recording medium (disc) having multiple recording layers at the same time. Basically, this is based in the first through third embodiments, so expanded or different portions will be primarily described.

Figure 47:
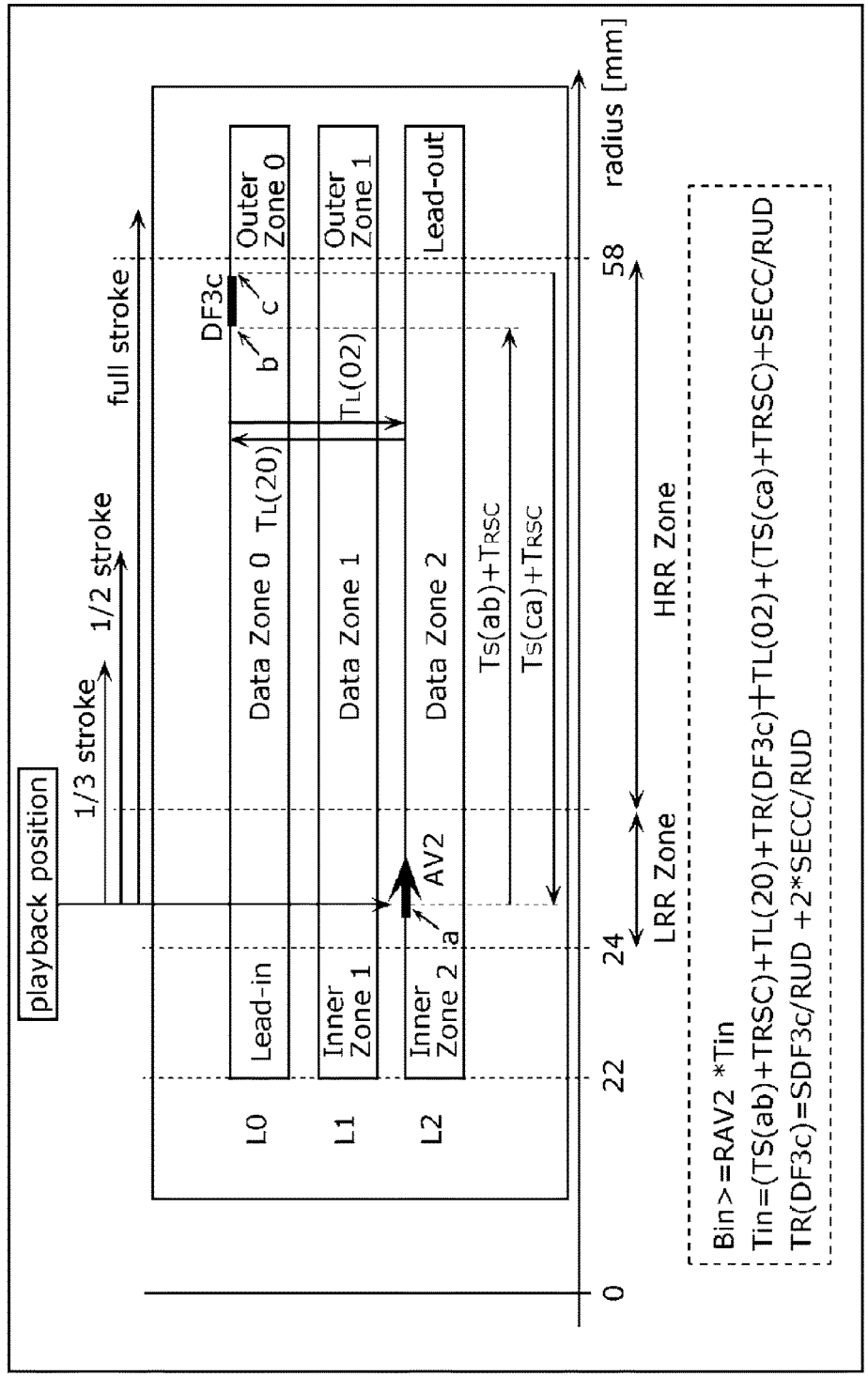
FIG. 47 is a diagram for describing time required to access a data file while playing an AV stream.

FIG. 47 is a diagram for describing the time required to access a different data file while playing an AV stream (also referred to as "digital stream", digital stream file", or "AV stream file"). FIG. 47 illustrates time necessary to access a different data file (DF3c) at the HHR zone in layer L0 while playing an AV stream (AV2) in the LRR zone in layer L2 (hereinafter also referred to as "same-time access).

The current playback point in the AV stream (AV2) will be referred to as a, the start point of the data file (DF3c) to be accessed at the same time while playing the AV stream (AV2) as b, and the end point as c. In this case, the amount of required time (Tin) to read in the separate file (CF3c) during playback of the AV stream (AV2) and return to the playback point can be calculated as in the following Expression 15

$$Tin = (T\_S(ab) + T\_RSC) + T\_L(20) + T\_R(DF3c) + T\_L(02) + T\_S(ca) + T\_RSC + S\_ECC/R\_LRR \quad \text{(Expression 15)}$$

where T_S(ab)+T_RSC is seek time from current playback point (a) to start point of data file (b), T_L(20) is spherical aberration correction time from L2 recording layer to L0 recording layer, T_R(DF3c) is read-in time for data file (DF3c) (including ECC overhead), T_L(02) is spherical aberration correction time from L0 recording layer to L2 recording layer, T_S(ca)+T_RSC is seek time from end point (c) to current playback point (a), and S_ECC/R_LRR is ECC overhead time to start reading next sector after current playback point (a).

Now, the read-in time of the data file (DF3c) (including ECC overhead) is expressed as in the following Expression 16.

$$T\_R(DF3c) = DF3c \text{ size}(S\_DF3c)/\text{read-in rate} (R\_HRR) + 2*ECC \text{ size}(S\_ECC)/\text{read-in rate} (R\_HRR) \quad \text{(Expression 16)}$$

T_RSC is the amount of time required to change the read method, in a case where the read method changes between the LRR Zone and HRR Zone, from angular speed constant to linear speed constant, for example.

When reading on the data file (DF3c) during playback of the AV stream (AV2), reading of the AV stream (AV2) stops for the amount of time Tin represented in Expression 15. That is to say, in order for underflow to not occur at the read buffer of the AV stream (the FIFO buffer at the frontend side, hereinafter written as "Bin"), the following Expression 17 needs to be satisfied where the bitrate of the AV stream (AV2) is R_AV2.

$$Bin \geq R\_AV2 * Tin \quad \text{(Expression 17)}$$

Now, time required for large seeks exceeding ½ stroke, such as T_S(ab) and T_S(ca) exceeds the time required for a full stroke (3.0 seconds in the example in FIG. 46B). Also, the amount of time required for a two-layer jump such as indicated by T_L(20) and T_L(02) normally requires twice the time as compared to a single-layer jump. This is because time is required to adjust the collimating lens of the optical pickup. There also are cases where the read strategy and disc rotations of the drive are markedly changed due to straddling the LRR Zone and HRR Zone, so the amount of time necessary to change the read-in method indicated by T_RSC is in the order of 100 milliseconds, which is not negligible.

As described above, in a situation where a low-torque motor is being used to rotate a disc at high speed (momentum is extremely high) as in a normal drive installation, a relatively great amount of time is necessary for large seeks in the radial direction of the disc, large change in the recording layer (focal distance direction), and great change in read strategy or disc rotation speed. As a result, an extremely large read buffer (Bin) needs to be installed, and only same-time access with poor response could be realized when performing same-time access where a data file is read in during playback of an AV stream.

For example, in a case where a Java (registered trademark) program of a Blu-Ray disc attempts to read in a JPEG file (data file) along with a certain scene in the main feature and superimpose on the video screen while the AV stream of the main feature is being played, the above-described Tin is in the order of several seconds to several tens of seconds, so performing this processing in real-time has been quite difficult.

Figure 48:
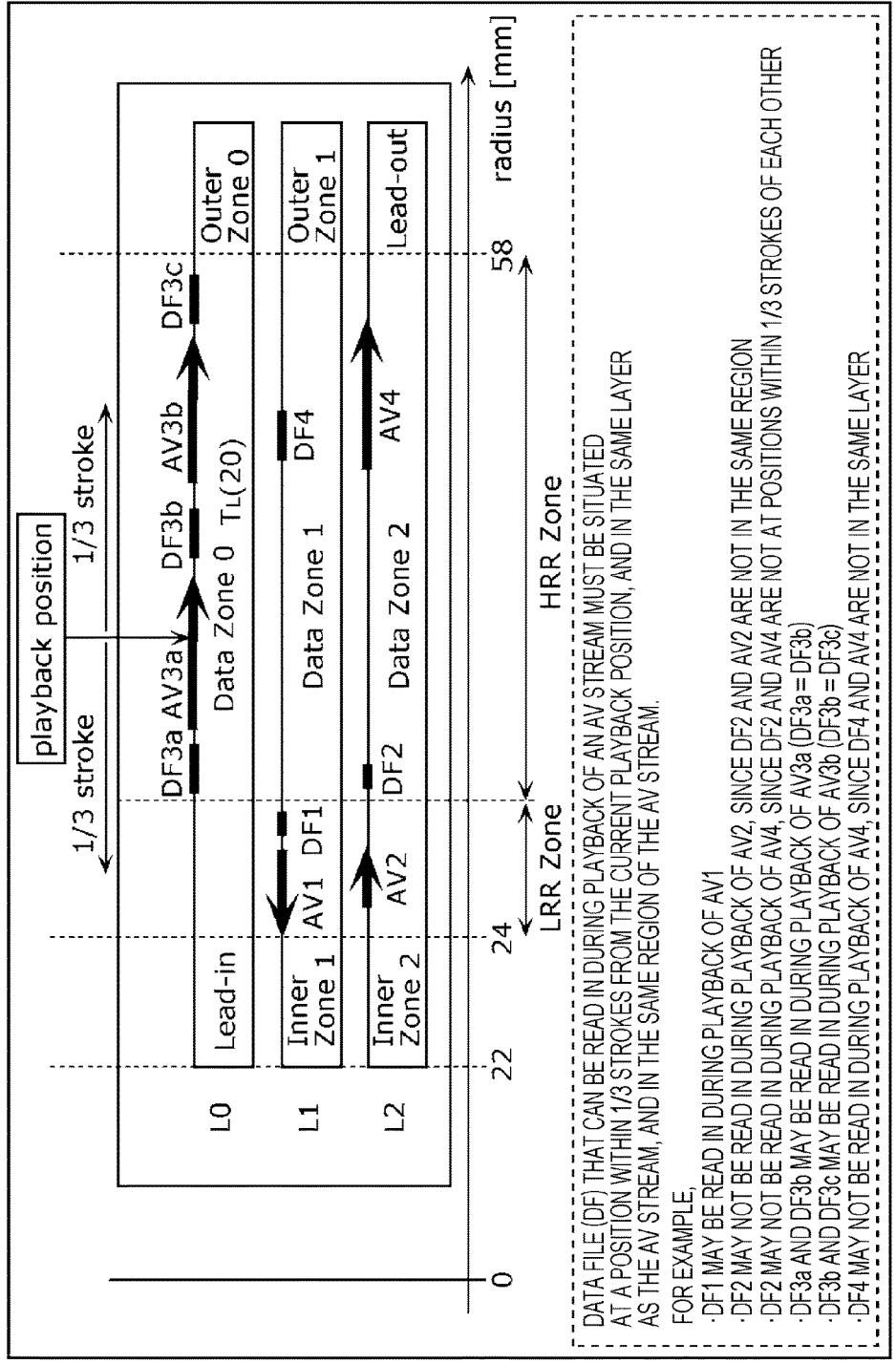
FIG. 48 is a diagram for describing correlation in the recording position of AV stream files and data files accessed at the same time.

FIG. 48 is a diagram for describing correlation in the recording position of AV stream files and data files accessed at the same time. As illustrated in FIG. 48, situating the data file that is to be accessed at the same time as the AV stream file being played so as to be near the AV stream file being played (within ⅓ stroke here) and in the same recording layer, and within the same zone, can realize high-speed same-time access to the data file. That is to say, the data file to be read in during playback of the AV stream file is recorded in, of the LRR Zone and HRR Zone, the same recording region as the recording region where the AV stream file being played is recorded. Further, the data file read in during playback of the AV stream file is recorded in a region within ⅓ strokes from the recording region where the AV stream file being played is recorded (the position where the AV stream file is being played). Also, the data file read in during playback of the AV stream file is further recorded in the same recording layer as the recording layer where the AV stream file being played is recorded.

The reason why the AV stream file and the data file to be accessed at the same time as the playback of the AV stream file are recorded in the same recording layer is to prevent occurrence of time required to change the recording layer for same-time access of the data file (several hundreds of milliseconds).

Also, the reason why the AV stream file and the data file to be accessed at the same time as the playback of the AV stream file are recorded in the same recording region is to prevent occurrence of time required to change the read strategy and rotations for same-time access of the data file (T_RSC, several hundreds of milliseconds).

Also, the reason why the data file to be accessed at the same time as the playback of the AV stream file is restricted to being within ⅓ strokes from the region where the AV stream file being played is recorded, is to keep time required for seek of the data file (several hundreds of milliseconds to several seconds) within a predetermined amount of time.

By arranging the AV stream and data file on the disc under such restrictions, access to the data file (DF1) corresponding to the AV stream (AV1) during playback of the AV stream (AV1), access to the data file (DF3a) and/or data file (DF3b) corresponding to the AV stream (AV3a) during playback of the AV stream (AV3a), and access to the data file (DF3b) and/or data file (DF3c) corresponding to the AV stream (AV3b) during playback of the AV stream (AV3b), can be realized with a buffer size that is sufficiently realistic for installation.

Also, in this example, the AV stream (AV2) and data file (DF2) are recorded in recording regions with mutually different read-in rates, same-time access to the data file (DF2) during playback of the AV stream (AV2) is either forbidden or in a layout that cannot be guaranteed. In the same way, the AV stream (AV4) and data file (DF4) are recorded in recording layers with mutually different read-in rates, same-time access to the data file (DF4) during playback of the AV stream (AV4) is either forbidden or in a layout that cannot be guaranteed.

Further, an arrangement is conceivable where conditions are set so that a data file of a predetermined size is finished being read within a predetermined time, and stipulating the drive read-in rate (R_UD) regarding how high an average bitrate AV stream can be handled.

In the same way, jumping in seamless connection described in the second embodiment requires a relatively large switchover time for spherical aberration correction from the L0 recording layer to L2 recording layer. Accordingly, even if the jump within the recording region at the same read in rate is being performed, seamless connection involving jumping that skips one layer, from the L0 layer to the L2 layer, or from the L2 layer to the L0 layer in a three-layer disc, may be forbidden or unguaranteed.

This may also be realized as a playback device or playback method to playback the video stream recorded in the BD described above. In this case, the playback device includes a readout unit that reads out data recorded in the recording medium, and a playback unit that plays the data that has been read out. The readout unit reads out data without changing the read rate for when reading out the digital stream and when reading out the data file. The readout unit also reads out the data file by moving the optical pickup by a distance within ⅓ strokes during playback of the digital stream. The readout also reads out data without changing the recording layer (without changing spherical aberration) for when reading out the digital stream and when reading out the data file.

Also, the playback method reads out data recorded in the recording medium, and plays the data that has been read out. In the readout, data is read out without changing the read rate for when reading out the digital stream and when reading out the data file. In the readout, the data file is read by moving the optical pickup by a distance within ⅓ strokes during playback of the digital stream. In the readout, data is also read out without changing the recording layer (without changing spherical aberration) for when reading out the digital stream and when reading out the data file.

Note that BD is also written as BD disc in the above embodiments. In the above embodiments, the components may be realized by a dedicated hardware configuration, or by executing a software program suitable for the components. The components may be realized by a program executing unit such as a CPU or processor reading out and executing a software program recorded in a recording medium such as a hard disk or semiconductor memory or the like.

Although the recording medium, playback device, and playback method according to one or multiple forms has been described by way of embodiments, the present disclosure is not restricted to these embodiments. Embodiments of various modifications conceivable by one skilled in the art, and forms configured by combining components in different embodiments, and so forth, may be included in the scope of one or multiple forms without departing from the essence of the present disclosure.

Note that the above description is only exemplary, and that one skilled in the art can make various applications.

The present disclosure is useful as an optical disc such as a BD that can enable same-time access of a data file during playback of a digital stream without employing an extremely large read buffer, even in a case where there are two recording regions read at different read rates, and a playback device and playback method of applying the optical disc, and so forth.

What is claimed is:

1. A non-transitory recording medium, in which is recorded data including a digital stream file obtained by encoding video information,
wherein a recording region of the non-transitory recording medium has a first recording region where reading is performed at a first read rate, and a second recording region where reading is performed at a second read rate that is faster than the first read rate,
wherein the data includes a digital stream file having real-time attributes and a data file having non-real-time attributes,
and wherein the data file to be read in during playback of the digital stream file is recorded in, of the first recording region and the second recording region, the same recording region where the digital stream file being played is recorded.

2. The non-transitory recording medium according to claim 1,
wherein the data file to be read during playback of the digital stream file is further recorded in a region within ⅓ strokes from the recording region where the digital stream file being played is recorded.

3. The non-transitory recording medium according to claim 1,
wherein the data file to be read during playback of the digital stream file is further recorded in a same recording layer where the digital stream file being played is recorded.

4. The non-transitory recording medium according to claim 1,
wherein the file system of the data is UDF (Universal Disk Format),
and the digital stream file is a file where a value of a file type field of the digital stream file is 249.

5. The non-transitory recording medium according to claim 2,
wherein the data file to be read during playback of the digital stream file is further recorded in a same recording layer where the digital stream file being played is recorded.

* * * * *